US012273556B2

(12) United States Patent
Ikai et al.

(10) Patent No.: US 12,273,556 B2
(45) Date of Patent: Apr. 8, 2025

(54) MOTION VECTOR GENERATION DEVICE, A VIDEO DECODING DEVICE AND A VIDEO CODING DEVICE

(71) Applicant: SHARP KABUSHIKI KAISHA, Sakai (JP)

(72) Inventors: Tomohiro Ikai, Sakai (JP); Tomoyuki Yamamoto, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 18/615,547

(22) Filed: Mar. 25, 2024

(65) Prior Publication Data

US 2024/0267556 A1    Aug. 8, 2024

Related U.S. Application Data

(63) Continuation of application No. 18/202,910, filed on May 27, 2023, now Pat. No. 11,979,602, which is a
(Continued)

(30) Foreign Application Priority Data

Feb. 8, 2016    (JP) .................................. 2016-022248

(51) Int. Cl.
  *H04N 19/533*    (2014.01)
  *H04N 19/105*    (2014.01)
  (Continued)

(52) U.S. Cl.
  CPC ......... *H04N 19/533* (2014.11); *H04N 19/105* (2014.11); *H04N 19/176* (2014.11); *H04N 19/513* (2014.11)

(58) Field of Classification Search
  CPC .. H04N 19/533; H04N 19/105; H04N 19/176; H04N 19/513
  (Continued)

(56) References Cited

U.S. PATENT DOCUMENTS

2004/0252766 A1    12/2004    Lee et al.
2006/0126741 A1*   6/2006    Saito ..................... H04N 5/145
                                                              375/E7.113
(Continued)

FOREIGN PATENT DOCUMENTS

JP        H06-189291 A    7/1994
JP        H09-051536 A    2/1997
(Continued)

OTHER PUBLICATIONS

Video/JVET, "Algorithm Description of Joint Exploration Test Model 1 (JEM 1)", International Organization for Standardization Organisation Internationale De Normalisation, ISO/IEC JTC1/SC29/WG11 Coding of Moving Pictures and Audio, ISO/IEC JTC1/SC29/WG11/N15790, Oct. 2015, Geneva, CH.
(Continued)

*Primary Examiner* — Allen C Wong
(74) *Attorney, Agent, or Firm* — ScienBiziP, P.C.

(57) ABSTRACT

To improve a coding efficiency. There are included a PU level search unit configured to search for a motion vector for each prediction block by using a matching process. and a sub-block level search unit configured to search for a motion vector of each of sub-blocks in the prediction block, wherein a precision of a local search by the PU level search unit is lower than a precision of a local search by the sub-block level search unit.

3 Claims, 26 Drawing Sheets

Related U.S. Application Data continuation of application No. 17/473,576, filed on Sep. 13, 2021, now Pat. No. 11,722,690, which is a continuation of application No. 16/076,278, filed as application No. PCT/JP2017/003637 on Feb. 1, 2017, now Pat. No. 11,153,600.

(51) Int. Cl.
 *H04N 19/176* (2014.01)
 *H04N 19/513* (2014.01)

(58) Field of Classification Search
 USPC .................................................. 375/240.12
 See application file for complete search history.

(56) References Cited

U.S. PATENT DOCUMENTS

| | | | | |
|---|---|---|---|---|
| 2007/0076964 | A1* | 4/2007 | Song | H04N 19/18 |
| | | | | 382/238 |
| 2009/0092188 | A1* | 4/2009 | Lee | H04N 19/11 |
| | | | | 375/E7.123 |
| 2010/0157162 | A1 | 6/2010 | Oshikiri et al. | |
| 2015/0229954 | A1 | 8/2015 | Kim et al. | |
| 2018/0234697 | A1 | 8/2018 | Jang et al. | |

FOREIGN PATENT DOCUMENTS

| | | |
|---|---|---|
| JP | 2005-167721 A | 6/2005 |
| JP | 2011-130265 A | 6/2011 |

OTHER PUBLICATIONS

Non-Final Office Action issued on Feb. 2, 2021 for U.S. Appl. No. 16/076,278.
Notice of Allowance and Fees Due issued on Jun. 14, 2021 for U.S. Appl. No. 16/076,278.
Notice of Allowance and Fees Due issued on Mar. 23, 2023 for U.S. Appl. No. 17/473,576.
Notice of Allowance and Fees Due issued on Jan. 19, 2024 for U.S. Appl. No. 18/202,910.

* cited by examiner

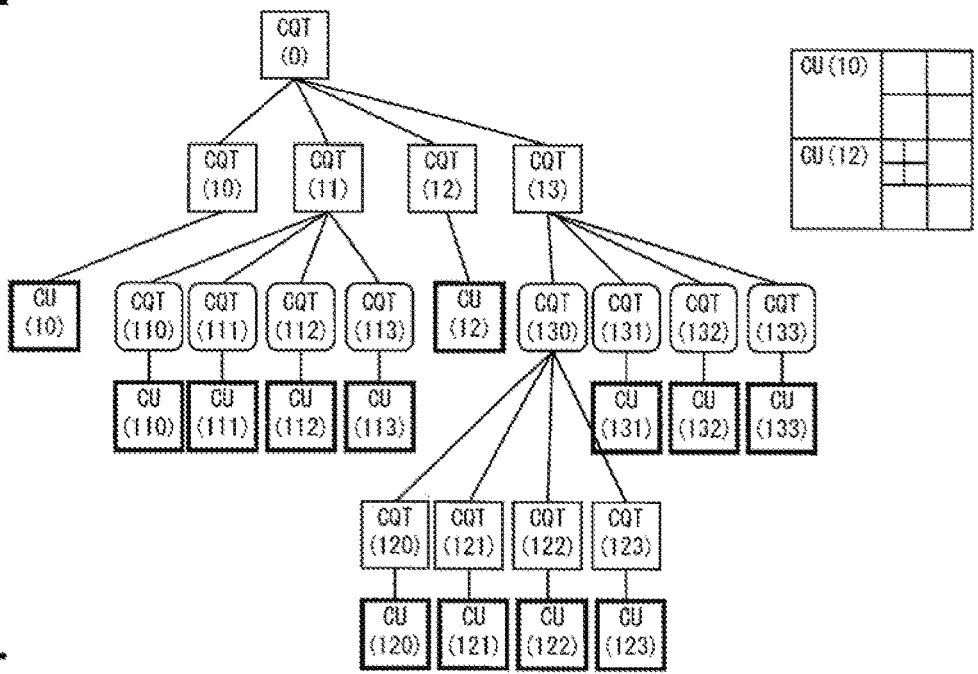

FIG. 2A
2Nx2N
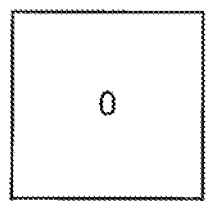
FIG. 2B
2NxN
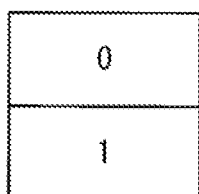
FIG. 2C
2NxnU
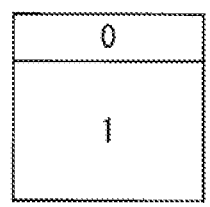
FIG. 2D
2NxnD
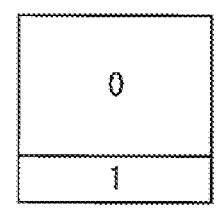
FIG. 2E
Nx2N
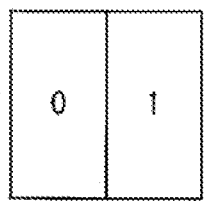
FIG. 2F
nLx2N
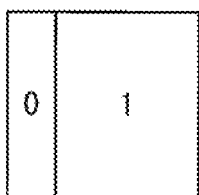
FIG. 2G
nRx2N
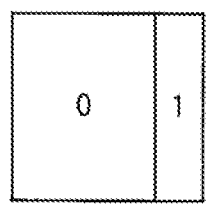
FIG. 2H
NxN
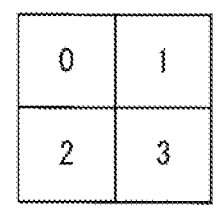
refIdxLX
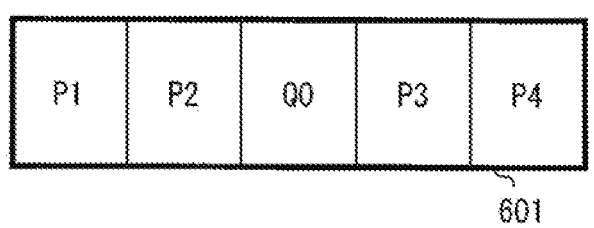
FIG. 3

FIG. 19A DIAMOND SEARCH

FIG. 19D CROSS SEARCH

MOTION VECTOR GENERATION DEVICE, A VIDEO DECODING DEVICE AND A VIDEO CODING DEVICE

TECHNICAL FIELD

An embodiment of the disclosure relates to a motion vector generation device, a prediction image generation device, a video decoding device, and a video coding device.

BACKGROUND ART

In order to efficiently transmit or record a video, there have been used a video coding device which generates coded data by coding a video, and a video decoding device which generates a decoded image by decoding the coded data.

Specific examples of a video coding scheme include schemes proposed in H.264/MPEG-4. AVC or High-Efficiency Video Coding (HEVC).

In such a video coding scheme, images (pictures) constituting a video are managed by a hierarchical structure including slices obtained by diving the images, units of coding (also referred to as Coding Units) obtained by dividing the slices, and prediction units (PUs) and transform units (TUs) which are blocks obtained by dividing the coding units, and each block is coded/decoded.

In such a video coding scheme, generally, an input image is coded/decoded to obtain a local decoded image, based on which local decoded image a prediction image is generated, the prediction image is subtracted from the input image (original image) to obtain a prediction residual (also referred to as a "difference image" or a "residual image"), and the prediction residual is coded. Examples of a method for generating a prediction image include inter-prediction, and intra-prediction.

One of video coding and decoding technologies in recent year is disclosed in NPL 1. NPL 1 discloses a technology in which a motion vector is searched for through matching in a coding device and a decoding device to reduce a code amount for motion vector transmission.

CITATION LIST

Non Patent Literature

NPL 1: Video/JVET, "Algorithm Description of Joint Exploration Test Model 1 (JEM 1)", INTERNATIONAL ORGANIZATION FOR STANDARDIZATION ORGANISATION INTERNATIONALE DE NORMALISATION ISO/IEC JTC1/SC29/WG11 CODING OF MOVING PICTURES AND AUDIO, ISO/IEC JTC1/SC29/WG11/N15790, October 2015, Geneva, CH.

SUMMARY

Technical Problem

In the video coding and decoding technologies in recent years, a code amount of coded data has increased as a first problem. A matching technique disclosed in NPL 1, a process amount of motion vector search required for generating a prediction image has increased as a second problem.

An object of the disclosure is to provide an image decoding device, an image coding device, and a prediction image generation device capable of solving at least any of the above first and second problems.

Solution to Problem

In order to solve the above problems, a motion vector generation device according to an aspect of the disclosure is a motion vector generation device for generating a motion vector to be referred to for generating a prediction image used to code or decode a video, the motion vector generation device including a first motion vector search unit configured to search for a motion vector for each prediction block by using a matching process, and a second motion vector search unit configured to refer to a motion vector selected by the first motion vector search unit to search for a motion vector for each of multiple sub-blocks included in the prediction block, wherein the first motion vector search unit searches for an initial vector for the prediction block, and thereafter, performs local search to search for the motion vector, the second motion vector search unit searches for an initial vector for the sub-block, and thereafter, performs local search to search for the motion vector, and a precision of the local search by the first motion vector search unit is lower than a precision of the local search by the second motion vector search unit.

In order to solve the above problems, a motion vector generation device according to an aspect of the disclosure is a motion vector generation device for generating a motion vector to be referred to for generating a prediction image used to code or decode a video, the motion vector generation device including a first motion vector search unit configured to search for a motion vector for each prediction block by using a matching process, and a second motion vector search unit configured to refer to a motion vector selected by the first motion vector search unit to search for a motion vector for each of multiple sub-blocks included in the prediction block, wherein the first motion vector search unit searches for an initial vector for the prediction block, and thereafter, performs a first local search with a first precision to search for the motion vector, the second motion vector search unit performs a second local search with a second precision, and thereafter, performs a third local search with a third precision to search for the motion vector, and the first precision and the second precision are lower than the third precision.

In order to solve the above problems, a motion vector generation device according to an aspect of the disclosure is a motion vector generation device for generating a motion vector to be referred to for generating a prediction image used to code or decode a video, the motion vector generation device including a first motion vector search unit configured to search for a motion vector for each prediction block using a matching process, and a second motion vector search unit configured to refer to a motion vector selected by the first motion vector search unit to search for a motion vector for each of multiple sub-blocks included in the prediction block, wherein the first motion vector search unit searches for an initial vector for the prediction block, and thereafter, performs local search to search for the motion vector, the second motion vector search unit searches for an initial vector for the sub-block, and thereafter, performs local search to search for the motion vector, and the search for the initial vector by the second motion vector search unit is performed in unit of integer pixel or in unit of half pixel.

Advantageous Effects of Invention

According to the above configuration, at least any of the above first and second problems can be solved.

BRIEF DESCRIPTION OF DRAWINGS

FIGS. 1A to 1F are diagrams illustrating a hierarchical structure of data of a coded stream according to the present embodiment.

FIGS. 2A to 2H are diagrams illustrating patterns for a PU partition mode. FIGS. 2A to 2H respectively illustrate partition shapes in cases that the PU partition mode is 2N×2N, 2N×N, 2N×nU, 2N×nD, N×2N, nL×2N, nR×2N, and N×N.

FIG. 3 is a conceptual diagram illustrating an example of a reference picture list.

FIGS. 19A to 19D illustrate motion search patterns when applying diamond search according to the present embodiment.

FIG. 27A illustrates the transmission device equipped with the image coding device, and FIG. 27B illustrates the reception device equipped with image decoding device.

FIG. 28A illustrates the recording device equipped with the image coding device, and FIG. 28B illustrates the reproducing device equipped with the image decoding device.

DESCRIPTION OF EMBODIMENTS

First Embodiment

Hereinafter, embodiments of the disclosure are described in detail with reference to the drawings.

Figure 15:
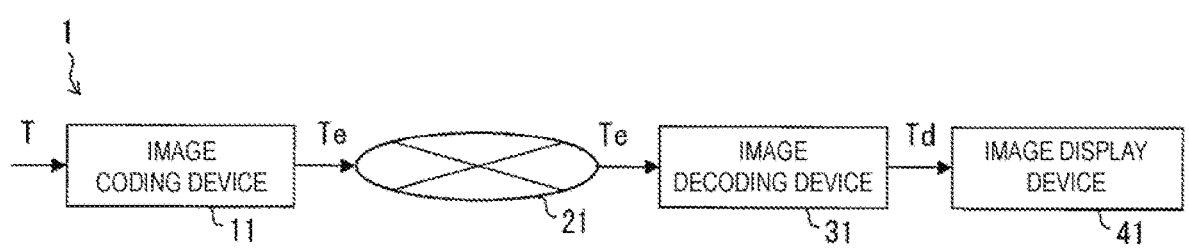
FIG. 15 is a schematic diagram illustrating a configuration of an image transmission system according to the present embodiment.

FIG. 15 is a schematic diagram illustrating a configuration of an image transmission system 1 according to the present embodiment.

The image transmission system 1 is a system in which a code obtained by coding a coding target image is transmitted and the image obtained by decoding the transmitted code is displayed. The image transmission system 1 is configured to include an image coding device (video coding device) 11, a network 21, an image decoding device (video decoding device) 31, and an image display device 41.

Signals T representing an image of a single layer or multiple layers are input to the image coding device 11. A layer is a concept used to distinguish multiple pictures in a case that a certain time period is constituted by one or more pictures. For example, scalable coding applies in a case that the same picture is coded in multiple layers which are different in an image quality or resolution, and view scalable coding applies in a case that pictures different in a viewpoint are coded in multiple layers. In a case that prediction is performed between pictures of multiple layers (inter-layer prediction, inter-view prediction), the coding efficiency is highly improved. In a case also that prediction is not performed (simulcast), the coded data can be collected.

The network 21 transmits a coded stream Te generated by the image coding device 11 to the image decoding device 31. The network 21 includes the Internet, a Wide Area Network (WAN), or a Local Area Network (LAN), or a combination thereof. The network 21 is not necessarily limited to a bidirectional communication network, but may be a unidirectional or bidirectional communication network transmitting broadcast waves such as digital terrestrial broadcasting and satellite broadcasting. The network 21 may be substituted by a storage medium in which the coded stream Te is recorded such as a Digital Versatile Disc (DVD) and a Blue-ray Disc (BD).

The image decoding device 31 decodes each coded stream Te transmitted by the network 21, and generates one or multiple-layer decoded images Td (decoded layer images Td, decoded viewpoint images Td).

The image display device 41 displays all or some of one or multiple decoded layer images Td generated by the image decoding device 31. For example, in the view scalable coding, in the case of displaying all, a three-dimensional image (stereoscopic image) or free-viewpoint image is displayed, and in the case of displaying some, a two-dimensional image is displayed. The image display device 41 includes a display device, for example, a liquid crystal display and an organic Electro-luminescence (EL) display. In spatial scalable coding and SNR scalable coding, the image decoding device 31 and the image display device 41 display an enhancement layer image which is higher in an image quality in a case of having high processing capability. The image display device 41 display a base layer image for which processing capability and display capability are required not so much high as the enhancement layer in a case that the image decoding device 31 and the image display device 41 have only lower processing capability.

Structure of Coded Stream Te

Before describing in detail, the image coding device 11 and the image decoding device 31 according to the present embodiment, a description is given of a data structure of the coded stream Te which is generated by the image coding device 11 and decoded by the image decoding device 31.

FIGS. 1A to 1F are diagrams illustrating a hierarchical structure of data in the coded stream Te. The coded stream Te exemplarily contains a sequence and multiple pictures constituting the sequence. FIGS. 1A to 1F are diagrams respectively illustrating a sequence layer specifying a sequence SEQ, a picture layer specifying a picture PICT, a slice layer specifying a slice S, a slice data layer specifying slice data, a coded tree layer specifying a coded tree unit included in the slice data, and a coded unit layer specifying a Coding Unit (CU) included in the coding tree.

Sequence Layer

The sequence layer specifies a set of data to which the image decoding device 31 refers in order to decode the sequence SEQ to be processed (hereinafter, also referred to as a target sequence). The sequence SEQ contains, as illustrated in FIG. 1A, a Video Parameter Set, a Sequence Parameter Set (SPS), a Picture Parameter Set (PPS), a picture PICT, and Supplemental Enhancement Information (SEI). Here, a value following "#" indicates a layer ID. FIGS. 1A to 1F illustrate an example in which there is coded data of #0 and #1, that is, a layer 0 and a layer 1, but types of layer and the number of layers are not limited thereto.

The video parameter set VPS specifies, for a video configured with multiple layers, set of coding parameters common to multiple videos and a set of coding parameters associated with multiple layers and individual layers contained in the video.

The sequence parameter set SPS specifies a set of coding parameters to which the image decoding device 31 refers in order to decode the target sequence. For example, a width and height of a picture are specified. There may be multiple SPSs. In this case, any of multiple SPSs is selected from the PPS.

The picture parameter set PPS specifies a set of coding parameters to which the image decoding device 31 refers in order to decode pictures in the target sequence. For example, the PPS includes a reference value of a quantization width (pic_init_qp_minus26) used to decode the picture and a flag indicating that a weighted prediction is applied (weighted_pred_flag). There may be multiple PPSs. In this case, any of multiple PPSs is selected from the pictures in the target sequence.

Picture Layer

The picture layer specifies a set of data to which the image decoding device 31 refers in order to decode a picture PICT to be processed (hereinafter, also referred to as a target picture). The picture PICT contains slices S0 to SNS-1 (NS represents the total number of slices contained in the picture PICT) as illustrated in FIG. 1B.

Hereinafter, the slices S0 to SNS-1 may be expressed with their suffixes omitted in a case of being not necessary to be distinguished from each other. The same holds for other data with a suffix which is contained in the coded stream Te described below.

Slice Layer

The slice layer specifies a set of data to which the image decoding device 31 refers in order to decode a slice S to be processed (also referred to as a target slice). The slice S contains a slice header SH and slice data SDATA, as illustrated in FIG. 1C.

The slice header SH contains a coding parameter group to which the image decoding device 31 refers in order to determine a method of decoding a target slice. Slice type specifying information specifying a slice type (slice type) is an example of the coding parameter contained in the slice header SH.

Examples of the slice type specifiable by the slice type specifying information include (1) I slice that is coded using intra prediction only, (2) P slice that is coded using unidirectional prediction or intra-prediction, and (3) B slice that is coded using unidirectional prediction, bidirectional prediction, or intra prediction.

The slice header SH may include reference to the picture parameter set PPS (pic_parameter_set_id) which is contained in the above sequence layer.

Slice Data Layer

The slice data layer specifies a set of data to which the image decoding device 31 refers in order to decode slice data SDATA to be processed. The slice data SDATA contains a Coded Tree Block (CTB) as illustrated in FIG. 1D. The CTB is a block having a fixed size (e.g., 64×64) constituting a slice, and may be also referred to as a Largest Cording Unit (LCU) or a Coded Tree Unit (CTU).

Coding Tree Layer

The coded tree layer specifies a set of data to which the image decoding device 31 refers in order to decode a coded tree block to be processed as illustrated in FIG. 1E. The coded tree block is partitioned by recursive quadtree partitioning. A node of a tree structure obtained by the recursive quadtree partitioning is called a coding tree. An intermediate node of the quadtree is a Coded Quad Tree (CQT) and the coded tree block itself is specified as a top CQT. The CQT contains a split flag (split_flag), and is partitioned into four coded tree units CQTs in a case that split_flag is 1. In a case that split_flag is 0, the coded tree unit CQT is not partitioned and has one Coded Unit (CU) as a node. The coded unit CU is a terminal node of the coded tree layer and is not partitioned any further in this layer. The coding unit CU is a basic unit for coding processing.

In a case that a size of the coded tree block CTB is 64×64 pixel, a size of the coded unit may be any of 64×64 pixel, 32×32 pixel, 16×16 pixel, and 8×8 pixel.

Coded Unit Layer

The coded unit layer specifies a set of data to which the image decoding device 31 refers in order to decode a coded unit to be processed, as illustrated in FIG. 1F. Specifically, the coding unit includes a coding tree, a prediction tree, a transform tree, and a CU header CUF. The coding tree specifies a split flag, a division pattern, a prediction mode, and the like.

The prediction tree specifies prediction information (reference picture index, motion vector, and the like) of each of prediction blocks which are obtained by partitioning the coded unit into one or multiple pieces. In other words, the prediction block/blocks is/are one or multiple non-overlapping areas which constitute the coding unit. The prediction tree includes one or multiple prediction blocks which are obtained by the above partitioning. Hereinafter, a unit of prediction obtained by further partitioning the prediction block is called a "sub-block". The sub-block (prediction block) is configured with one or multiples pixel. In a case that a size of the prediction block is equal to a size of the sub-block, the number of sub-blocks in the prediction block is one. In a case that a size of the prediction block is larger than a size of the sub-block, the prediction block is partitioned into the sub-blocks. For example, in a case that a size of the prediction block is 8×8 and a size of the sub-block is 4×4, the prediction block is partitioned horizontally into two and vertically into two to be partitioned into four sub-blocks.

Prediction processing is performed for each of these prediction blocks (sub-blocks). Hereinafter, the prediction block as a unit of prediction is also referred to as a prediction unit (PU).

A type of partition for the prediction tree is roughly classified into two for a case of the intra prediction and a case of the inter prediction. The intra prediction is prediction within an identical picture, and the inter prediction is prediction processing performed between pictures different from each other (e.g., between display times, between layer images).

In the case of the intra prediction, a partition method includes methods using 2N×2N (the same size as the coding unit) and N×N.

In the case of the inter prediction, a partition method includes coding in a PU partition mode (part_mode) in the coded data, and includes methods using 2N×2N (the same size as the coding unit), 2N×N, 2N×nU, 2N×nD, N×2N, nL×2N, nR×2N, and N×N. Note that 2N×nU indicates that a 2N×2N coding unit are partitioned into two areas, 2N×0.5N and 2N×1.5N, in this order from the upside. 2N×nD indicates that a 2N×2N coding unit is partitioned into two areas, 2N×1.5N and 2N×0.5N, in this order from the upside. nL×2N indicates that a 2N×2N coding unit is partitioned into two areas, 0.5N×2N and 1.5N×2N, in this order from the left. nR×2N indicates that a 2N×2N coding unit is partitioned into two areas, 1.5N×2N and 0.5N×1.5N, in this order from the left. The number of partitions is any of 1, 2, or 4, and thus, the number of PUs included in the CU is 1 to 4. These PUs are expressed as PU0, PU1, PU2, and PU3 in this order.

Each of FIGS. 2A to 2H specifically illustrates a boundary location of PU partitioning in the CU for each partition type.

FIG. 2A illustrates a PU partition mode for 2N×2N in which the CU is not partitioned.

FIGS. 2B, 2C and 2D illustrate respectively partition shapes in cases that the PU partition modes are 2N×N, 2N×nU, and 2N×nD. Hereinafter, the partitions in the cases that the PU partition modes are 2N×N, 2N×nU, and 2N×nD are collectively referred to as a horizontally-long partition.

FIGS. 2E, 2F and 2G illustrate respectively partition shapes in the cases that the PU partition modes are N×2N, nL×2N, and nR×2N. Hereinafter, the partitions in the case that the PU partition types are N×2N, nL×2N, and nR×2N are collectively referred to as a vertically-long partition.

The horizontally-long partition and the vertically-long partition are collectively referred to as a rectangular partition.

FIG. 2H illustrates a partition shape in a case that the PU partition mode is N×N. The PU partition modes in FIGS. 2A and 2H are also referred to as square partitioning based on their partition shapes. The PU partition modes in FIGS. 2B to 2G are also referred to as non-square partitioning.

In FIGS. 2A to 2H, the number assigned to each area indicates an identification number of the area, and the areas are processed in an order of the identification number. To be more specific, the identification number represents a scan order for partitioning.

In FIGS. 2A to 2H, assume that an upper left corner is a base point (origin) of the CU.

In the transform tree, the coding unit is partitioned into one or multiple transform blocks, and a location and size of each transform block is specified. In other words, the transform block/blocks is/are one or multiple non-overlapping areas which constitute the coding unit. The transform tree includes one or multiple transform blocks which are obtained by the above partitioning.

Partitioning in the transform tree includes that performed by allocating an area having the same size as the coding unit as a transform block, and that performed by the recursive quadtree partitioning similar to the partitioning of the tree block described above.

Transform processing is performed for each of these transform blocks. Hereinafter, the transform block as a unit of transform is also referred to as a transform unit (TU).

Prediction Parameter

A prediction image in a prediction unit is derived according to a prediction parameter associated with the prediction unit. The prediction parameter includes a prediction parameter for intra prediction or a prediction parameter for inter prediction. Hereinafter, the prediction parameter for inter prediction (inter-prediction parameter) is described. The inter-prediction parameter includes prediction list utilization flags predFlagL0 and predFlagL1, reference picture indices refIdxL0 and refIdxL1, and vectors mvL0 and mvL1. The prediction list utilization flags predFlagL0 and predFlagL1 are flags respectively indicating whether or not reference picture lists called L0 list and L1 list are used, and in a case that a value of each thereof is 1, the corresponding reference picture list is used. Here, assume that in a case that an expression "a flag indicating whether or not XX" is used herein, "1" corresponds to a case of XX and "0" corresponds to a case of not XX, and "1" represents true and "0" represents false in logical NOT, logical AND or the like (the same applies hereinafter). However, other values may be used as a true value or a false value in actual device or methods. A case that two reference picture lists are used, that is, a case of predFlagL0=1 and predFlagL1=1, corresponds to bi-prediction. A case that one reference picture list is used, that is, a case of (predFlagL0, predFlagL1)=(1, 0) or (predFlagL0, predFlagL1)=(0, 1), corresponds to uni-prediction. Information on the prediction list utilization flag can be expressed by an inter-prediction flag inter_pred_idc described below. In general, a prediction image generation unit (prediction image generation device) 308 and prediction parameter memory 307 which are described below use the prediction list utilization flag. A prediction image generation unit (prediction image generation device) 308 and prediction parameter memory 307 which are described below, uses the inter-prediction flag inter_pred_idc in a case that information concerning which reference picture list is used or not is decoded from the coded data.

Examples of a syntax element for deriving the inter-prediction parameter included in the coded data include a partition mode part_mode, a merge flag merge_flag, a merge index merge_idx, an inter-prediction flag inter_pred_idc, a reference picture index refIdxLX, a prediction vector index mvp_LX_idx, and a difference vector mvdLX, for example.

Example of Reference Picture List

Figure 5:
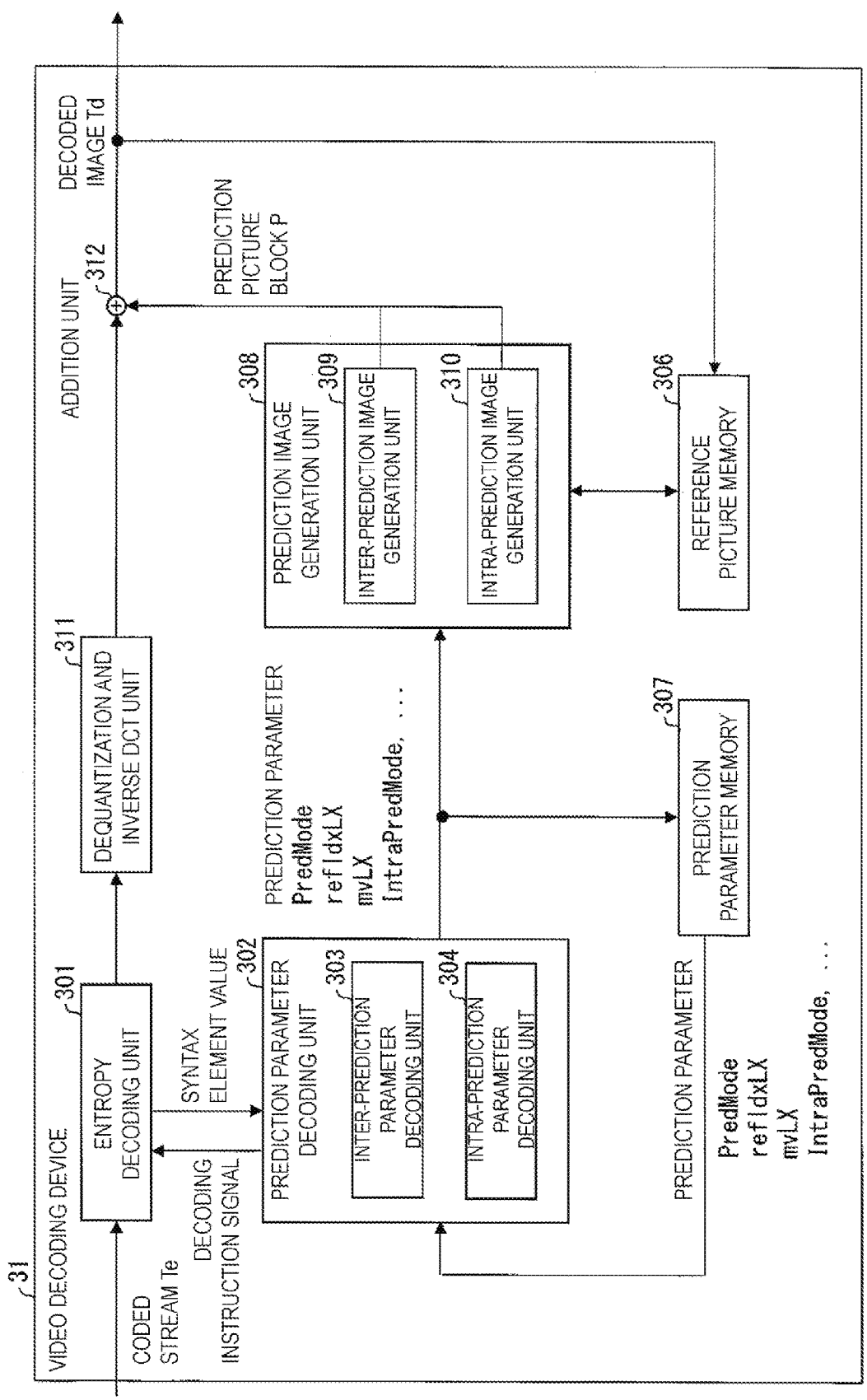
FIG. 5 is a schematic diagram illustrating a configuration of an image decoding device according to the present embodiment.

Next, a description is given of an example of the reference picture list. The reference picture list is a row constituted by the reference pictures stored in a reference picture memory 306 (FIG. 5). FIG. 3 is a conceptual diagram illustrating an example of the reference picture list. In a reference picture list 601, each of five rectangles horizontally aligned represents a reference picture. Signs P1, P2, Q0, P3, and P4 indicated from a left end to the right are signs representing corresponding reference pictures. The character "P" of P1 or the like represents a viewpoint P, and the character "Q" of Q0 represents a viewpoint Q different from the viewpoint P. A suffix of P or Q indicates a picture order count POC. A downward arrow immediately under "refIdxLX" represents that the reference picture index refIdxLX is an index for referring to a reference picture Q0 in the reference picture memory 306.

Example of Reference Pictures

Figure 4:
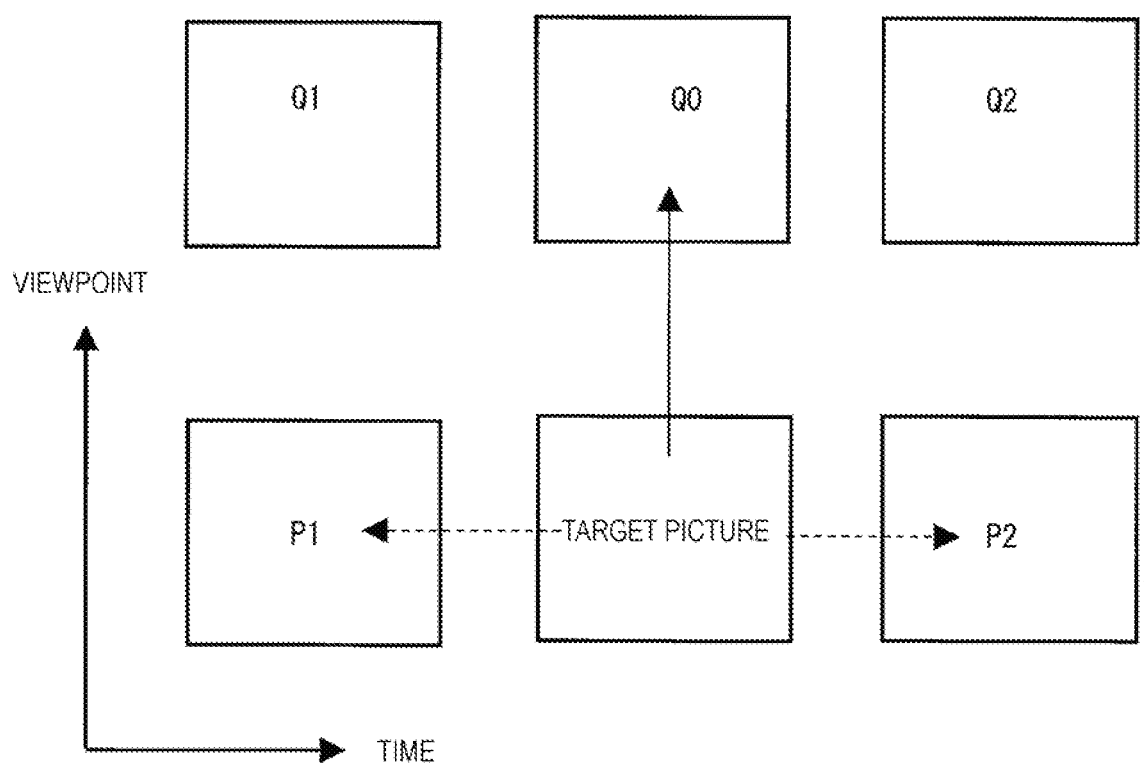
FIG. 4 is a conceptual diagram illustrating an example of reference pictures.

Next, a description is given of an example of the reference pictures which is used to derive a vector. FIG. 4 is a conceptual diagram illustrating an example of the reference pictures. In FIG. 4, a horizontal axis represents a display time and a vertical axis represents a viewpoint. Two rows and three columns of rectangles (six in total) illustrated in FIG. 4 represent pictures. The rectangle on a lower row and the second column from the left among six rectangles represents a decoding target picture (target picture) and the other five rectangles represent the reference pictures. The reference picture Q0 indicated by an upward arrow from the target picture is a picture the same as the target picture in a display time but different in a viewpoint. The reference picture Q0 is used in displacement prediction in which the target picture is used as a reference. The reference picture P1 indicated by a leftward arrow from target picture is the same as the target picture in a viewpoint and is a previous picture. The reference picture P2 indicated by a rightward arrow from the target picture is the same as the target picture in a viewpoint and is a future picture. The reference picture P1 or P2 is used in motion prediction in which the target picture is used as a reference.

Inter-Prediction Flag and Prediction List Utilization Flag

A relationship between the inter-prediction flag and the prediction list utilization flags predFlagL0 and predFlagL1 is mutually transformable as below. Therefore, the prediction list utilization flag may be used as the inter-prediction parameter or inter-prediction flag may be used instead. In the following description, in determination using the prediction list utilization flag, the inter-prediction flag may be alternatively used. In contrast, in determination using the inter-prediction flag, the prediction list utilization flag may be alternatively used.

```
Inter-prediction flag = (predFlagL1<<1) + predFlagL0
predFlagL0 = inter-prediction flag & 1
predFlagL1 = inter-prediction flag >> 1
where ">>" represents right shift and "<<" represents left shift.
```

Merge Prediction and AMVP Prediction

A prediction parameter decoding (coding) method includes a merge prediction (merge) mode and an Adaptive Motion Vector Prediction (AMVP) mode. A merge flag merge_flag is a flag identifying these modes. In both the merge prediction mode and the AMVP mode, a prediction parameter for an already processed block is used to use prediction parameter for a target PU. The merge prediction mode is a mode in which a prediction list utilization flag predFlagLX (or inter-prediction flag inter_pred_idc), a reference picture index refIdxLX, and a motion vector mvLX are not included in the coded data, and the prediction parameter already derived for a neighboring PU is used as it is. The AMVP mode is a mode in which the inter-prediction flag inter_pred_idc, the reference picture index refIdxLX, and the motion vector mvLX are included in the coded data. The motion vector mvLX is coded as a prediction vector index mvp_LX_idx identifying the prediction vector mvpLX and as a difference vector mvdLX.

The inter-prediction flag inter_pred_idc is data indicating types and the number of the reference pictures, and has a value Pred_L0, Pred_L1, or Pred_Bi. Pred_L0 and Pred_L1 indicate that the reference pictures stored in the reference picture lists called L0 list and L1 list, respectively, are used, and indicate that one reference picture is used (uni-prediction). The predictions using L0 list and L1 list are called L0 prediction and L1 prediction, respectively. Pred_Bi indicates that two reference pictures are used (bi-prediction), and indicates that two reference pictures stored in L0 list and L1 list are used. The prediction vector index mvp_LX_idx is an index indicating a prediction vector, and the reference picture index refIdxLX is an index indicating a reference picture stored in the reference picture list. "LX" is a description method used in a case that the L0 prediction and the L1 prediction are not distinguished from each other, and a parameter for L0 list and a parameter for L1 list are distinguished by replacing "LX" with "L0" or "L1". For example, refIdxL0 is a reference picture index used for the L0 prediction, refIdxL1 is a reference picture index used for the L1 prediction, and refIdx (refIdxLX) is an expression used in a case that refIdxL0 and refIdxL1 are not distinguished from each other.

The merge index merge_idx is an index indicating that whether any prediction parameter is used as a prediction parameter for the decoding target block, among prediction parameter candidates (merge candidate) derived from the block on which the processing is completed.

The "target block" may be a prediction block higher by one hierarchy than multiple prediction blocks, or may be a coded unit including the multiple prediction blocks.

Motion Vector and Displacement Vector

The motion vector mvLX can be also separated into a motion vector in a narrow sense (narrow-sense motion vector) indicating a displacement amount between the blocks on two pictures which are different in times, and a displacement vector (disparity vector, parallax vector) indicating a displacement amount between two blocks which are the same in a time. In the following description, the motion vector and the displacement vector are not distinguished from each other, and merely referred to as the motion vector mvLX. The prediction vector and difference vector for the motion vector mvLX are called respectively a prediction vector mvpLX and a difference vector mvdLX. Whether the motion vector mvLX or the difference vector mvdLX is a motion vector or a displacement vector is identified using the reference picture index refIdxLX associated with the vector.

Configuration of Image Decoding Device

Next, a description is given of a configuration of an image decoding device 31 according to the present embodiment. FIG. 5 is a schematic diagram illustrating the configuration of the image decoding device 31 according to the present embodiment. The image decoding device 31 is configured to include an entropy decoding unit 301, a prediction parameter decoding unit (prediction image generation device) 302, a reference picture memory (reference image storage unit, frame memory) 306, a prediction parameter memory (prediction parameter storage unit, frame memory) 307, a prediction image generation unit 308, a dequantization and inverse DCT unit 311, and an addition unit 312 and a residual storage unit 313 (residual recording unit).

The prediction parameter decoding unit 302 is configured to include an inter-prediction parameter decoding unit (motion vector derivation unit) 303 and an intra-prediction parameter decoding unit 304. The prediction image generation unit 308 is configured to include an inter-prediction image generation unit 309 and an intra-prediction image generation unit 310.

The entropy decoding unit 301 performs entropy decoding on the coded stream Te input from outside to demultiplex and decode individual codes (syntax elements). Examples of the demultiplexed codes include the prediction information for generating the prediction image and residual information for generating the difference image.

The entropy decoding unit 301 outputs some of the demultiplexed codes to the prediction parameter decoding unit 302. Some of the demultiplexed codes are, for example, a prediction mode PredMode, partition mode part_mode, merge flag merge_flag, merge index merge_idx, inter-prediction flag inter_pred_idc, reference picture index refIdxLX, prediction vector index mvp_LX_idx, and difference vector mvdLX. Control on which code is to be decoded is based on an instruction from the prediction parameter decoding unit 302. The entropy decoding unit 301 outputs quantized coefficients to the dequantization and inverse DCT unit 311. The quantized coefficients are coefficients obtained by performing Discrete Cosine Transform (DCT) on the residual signal and quantization in the coding processing.

The inter-prediction parameter decoding unit 303 refers to the prediction parameter stored in the prediction parameter memory 307, based on the code input from the entropy decoding unit 301 to decode the inter-prediction parameter.

The inter-prediction parameter decoding unit 303 outputs the decoded inter-prediction parameter to the prediction image generation unit 308 and stores the parameter in the prediction parameter memory 307. The inter-prediction parameter decoding unit 303 is described in detail later.

The intra-prediction parameter decoding unit 304 refers to the prediction parameter stored in the prediction parameter memory 307, based on the code input from the entropy decoding unit 301 to decode the intra-prediction parameter. The intra-prediction parameter is a parameter used for processing to predict the picture block within one picture, for example, an intra-prediction mode IntraPredMode. The intra-prediction parameter decoding unit 304 outputs the decoded intra-prediction parameter to the prediction image generation unit 308 and stores the parameter in the prediction parameter memory 307.

The intra-prediction parameter decoding unit 304 may derive an intra-prediction mode different in luminance and color difference. In this case, the intra-prediction parameter decoding unit 304 decodes a luminance prediction mode IntraPredModeY as a prediction parameter for luminance, and a color difference prediction mode IntraPredModeC as a prediction parameter for color difference. The luminance prediction mode IntraPredModeY includes 35 modes, which correspond to planar prediction (0), DC prediction (1), and angular predictions (2 to 34). The color difference prediction mode IntraPredModeC uses any of the planar prediction (0), the DC prediction (1), the angular predictions (2 to 34), and LM mode (35). The intra-prediction parameter decoding unit 304 decodes a flag indicating whether or not IntraPredModeC is the same mode as the luminance mode. The intra-prediction parameter decoding unit 304 assigns IntraPredModeC equal to IntraPredModeY in a case that the flag indicates the same mode as the luminance mode. The intra-prediction parameter decoding unit 304 may decode the planar prediction (0), the DC prediction (1), the angular predictions (2 to 34), and the LM mode (35) as IntraPredModeC in a case that the flag indicates a mode different from the luminance mode.

The reference picture memory 306 stores a block (reference picture block) of the reference pictures generated by the addition unit 312 in a predefined location for each decoding target picture and block.

The prediction parameter memory 307 stores the prediction parameters in a predefined location for each decoding target picture and block. To be more specific, the prediction parameter memory 307 stores the inter-prediction parameter decoded by the inter-prediction parameter decoding unit 303, the intra-prediction parameter decoded by the intra-prediction parameter decoding unit 304, and the prediction mode predMode demultiplexed by the entropy decoding unit 301. Examples of the stored inter-prediction parameter include the prediction list utilization flag predFlagLX (inter-prediction flag inter_pred_idc), the reference picture index refIdxLX, and the motion vector mvLX.

Input to the prediction image generation unit 308 are the prediction mode predMode which is input from the entropy decoding unit 301 and the prediction parameters from the prediction parameter decoding unit 302. The prediction image generation unit 308 reads out the reference picture from the reference picture memory 306. The prediction image generation unit 308 uses the input prediction parameters and the read out reference picture to generate a prediction picture block P (prediction image) in the prediction mode indicated by the prediction mode predMode.

Here, in a case that the prediction mode predMode indicates the inter-prediction mode, the inter-prediction image generation unit 309 uses the inter-prediction parameter input from the inter-prediction parameter decoding unit 303 and the read out reference picture to generate prediction picture block P by the inter-prediction. The prediction picture block P corresponds to the prediction unit PU. The PU corresponds to a part of a picture configured with multiple pixels as a unit for the prediction processing, that is, a decoding target block on which the prediction processing is performed in one time, as described above.

The inter-prediction image generation unit 309 reads out from the reference picture memory 306 a reference picture block at a location which is indicated by the motion vector mvLX with reference to the decoding target block. The reference picture block is a reference picture indicated by the reference picture index refIdxLX with respect to the reference picture list having the prediction list utilization flag predFlagLX of 1 (L0 list or L1 list). The inter-prediction image generation unit 309 performs prediction on the read out reference picture block to generate the prediction picture block P. The inter-prediction image generation unit 309 outputs the generated prediction picture block P to the addition unit 312.

In a case that the prediction mode predMode indicates the intra-prediction mode, the intra-prediction image generation unit 310 uses the intra-prediction parameter input from the intra-prediction parameter decoding unit 304 and the read out reference picture to perform the intra-prediction. To be more specific, the intra-prediction image generation unit 310 reads out from the reference picture memory 306 the reference picture block in a predefined range from the decoding target block in the already decoded blocks of the decoding target picture. The predefined range is, for example, any of left, upper left, upper, and upper right neighboring blocks in a case that the decoding target block sequentially moves in an order of a so-called raster scan, and depends on the intra-prediction mode. The order of the raster scan is an order of sequentially moving from a left end to a right end of each row from an upper end to a bottom end in each picture.

The intra-prediction image generation unit 310 performs prediction on the read out reference picture block in the prediction mode indicated by the intra-prediction mode IntraPredMode to generate the prediction picture block. The intra-prediction image generation unit 310 outputs the generated prediction picture block P to the addition unit 312.

In a case that the intra-prediction parameter decoding unit 304 derives the intra-prediction mode different in luminance and color difference, the intra-prediction image generation unit 310 generates a luminance prediction picture block by any of the planar prediction (0), the DC prediction (1), and the angular predictions (2 to 34) depending on the luminance prediction mode IntraPredModeY. The intra-prediction image generation unit 310 generates a color difference prediction picture block by any of the planar prediction (0), the DC prediction (1), the angular predictions (2 to 344), and the LM mode (35) depending on the color difference prediction mode IntraPredModeC.

The dequantization and inverse DCT unit 311 dequantizes the quantized coefficients input from the entropy decoding unit 301 to find DCT coefficients. The dequantization and inverse DCT unit 311 performs Inverse Discrete Cosine Transform (inverse DCT) on the found DCT coefficients to compute a decoded residual signal. The dequantization and inverse DCT unit 311 outputs the computed decoded residual signal to the addition unit 312 and the residual storage unit 313.

The addition unit 312 adds the prediction picture blocks P input from the inter-prediction image generation unit 309 and intra-prediction image generation unit 310 and a signal value of the decoded residual signal input from the dequantization and inverse DCT unit 311 for each pixel to generate a reference picture block. The addition unit 312 stores the generated reference picture block in the reference picture memory 306, and outputs, to outside, a decoded layer image Td in which the generated reference picture blocks are integrated for each picture.

Configuration of Inter-Prediction Parameter Decoding Unit

Next, a description is given of a configuration of the inter-prediction parameter decoding unit 303.

Figure 6:
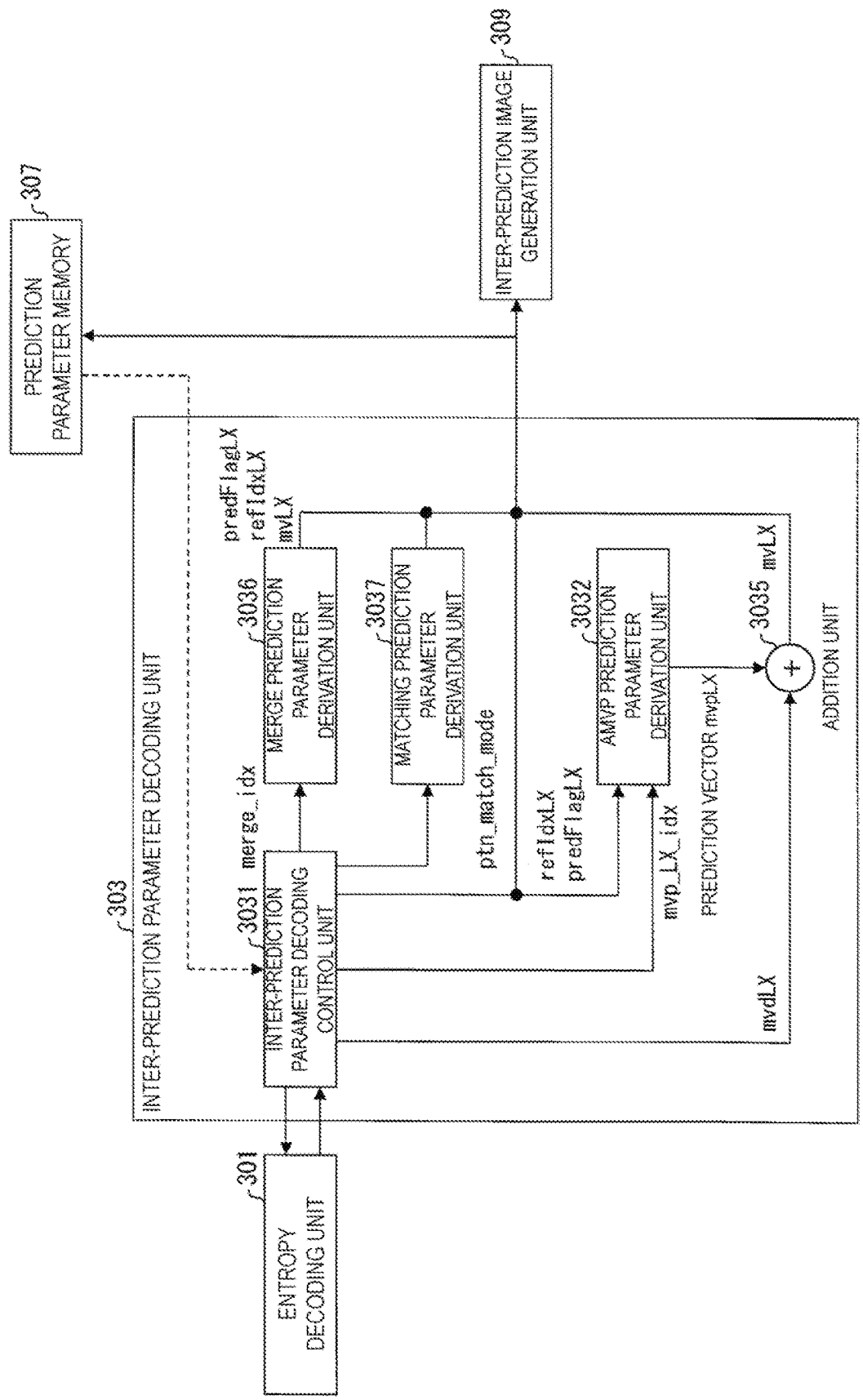
FIG. 6 is a schematic diagram illustrating a configuration of an inter-prediction parameter decoding unit according to the present embodiment.

FIG. 6 is a schematic diagram illustrating a configuration of the inter-prediction parameter decoding unit 303 according to the present embodiment. The inter-prediction parameter decoding unit 303 is configured to include an inter-prediction parameter decoding control unit (motion vector derivation unit) 3031, an AMVP prediction parameter derivation unit 3032, an addition unit b, and a merge prediction parameter derivation unit 3036.

The inter-prediction parameter decoding control unit 3031 instructs the entropy decoding unit 301 to decode the code (syntax element) associated with the inter-prediction to extract the code (syntax element) included in the coded data, for example, the partition mode part_mode, the merge flag merge_flag, the merge index merge_idx, the inter-prediction flag inter_pred_idc, the reference picture index refIdxLX, the prediction vector index mvp_LX_idx, and the difference vector mvdLX.

The inter-prediction parameter decoding control unit 3031 first extracts the merge flag. An expression that the inter-prediction parameter decoding control unit 3031 extracts a certain syntax element means instructing the entropy decoding unit 301 to decode a code of a certain syntax element to read the syntax element from the coded data. Here, in a case that the merge flag indicates a value of 1, that is, the merge prediction mode, the inter-prediction parameter decoding control unit 3031 extracts the merge index merge_idx as a prediction parameter related to the merge prediction. The inter-prediction parameter decoding control unit 3031 outputs the extracted merge index merge_idx to the merge prediction parameter derivation unit 3036.

In a case that the merge flag merge_flag is 0, that is, indicates the AMVP prediction mode, the inter-prediction parameter decoding control unit 3031 uses the entropy decoding unit 301 to extract the AMVP prediction parameter from the coded data. Examples of the AMVP prediction parameter include the inter-prediction flag inter_pred_idc, the reference picture index refIdxLX, the prediction vector index mvp_LX_idx, and the difference vector mvdLX. The inter-prediction parameter decoding control unit 3031 outputs the prediction list utilization flag predFlagLX derived from the extracted inter-prediction flag inter_pred_idc and the reference picture index refIdxLX to the AMVP prediction parameter derivation unit 3032 and the prediction image generation unit 308 (FIG. 5), and stores the predFlagLX and refIdxLX in the prediction parameter memory 307 (FIG. 5). The inter-prediction parameter decoding control unit 3031 outputs the extracted prediction vector index mvp_LX_idx to the AMVP prediction parameter derivation unit 3032. The inter-prediction parameter decoding control unit 3031 outputs the extracted difference vector mvdLX to the addition unit 3035.

The inter-prediction parameter decoding unit 303 includes a matching prediction parameter derivation unit 3037, and the syntax ptn_match_mode indicating the type of the matching mode is supplied from the inter-prediction parameter decoding controller 3031. The matching prediction parameter derivation unit 3037 is described in detail later.

Merge Prediction Parameter Derivation Unit

Figure 7:
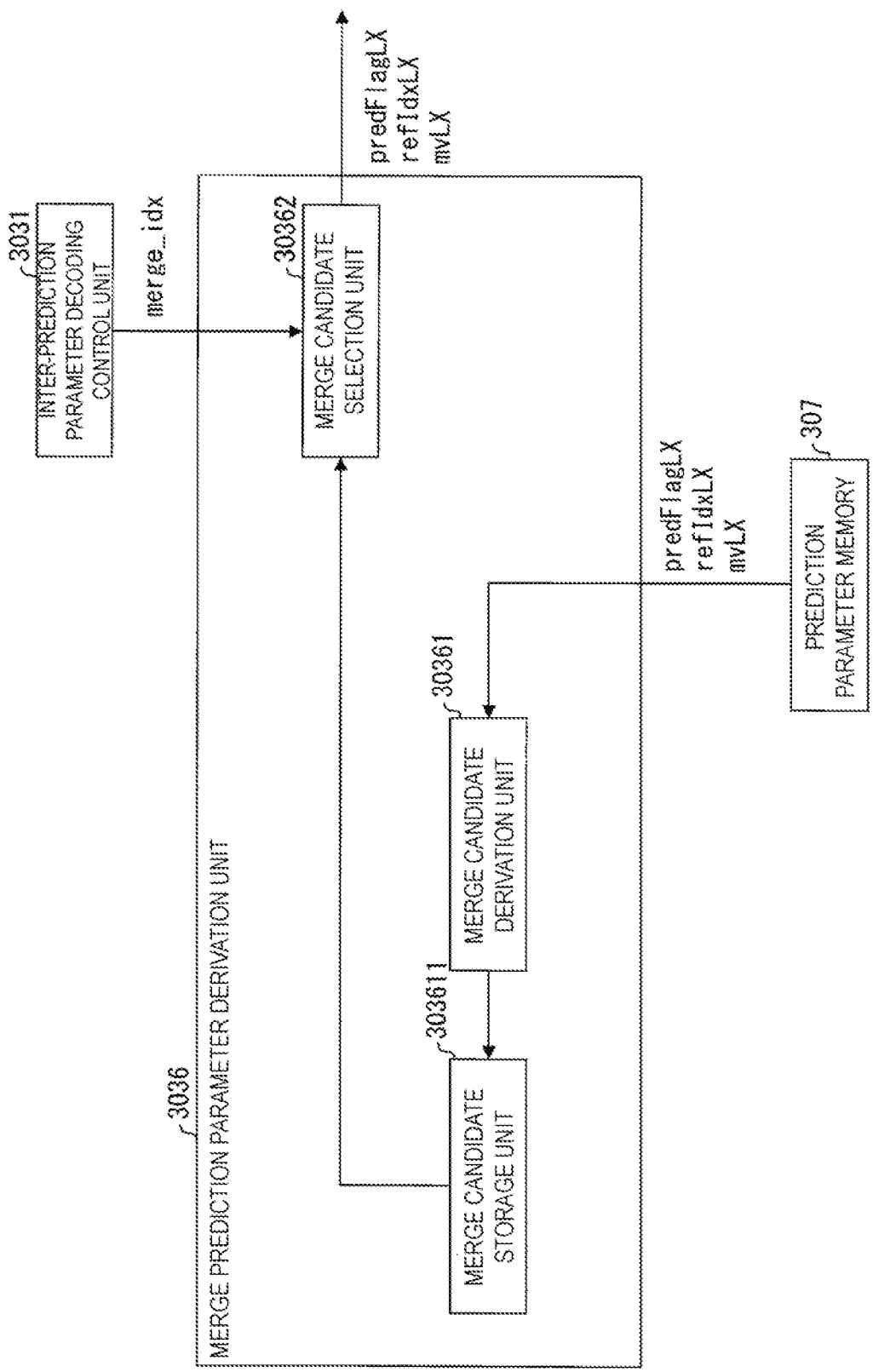
FIG. 7 is a schematic diagram illustrating a configuration of a merge prediction parameter derivation unit according to the present embodiment.

FIG. 7 is a schematic diagram illustrating a configuration of the merge prediction parameter derivation unit 3036 according to the present embodiment. The merge prediction parameter derivation unit 3036 includes a merge candidate derivation unit 30361 (prediction vector compute unit) and a merge candidate selection unit 30362. The merge candidate storage unit 303611 stores therein merge candidates input from the merge candidate derivation unit 30361. The merge candidate is configured to include the prediction list utilization flag predFlagLX, the motion vector mvLX, and the reference picture index refIdxLX. The merge candidate stored in the merge candidate storage unit 303611 is assigned with an index according to a prescribed rule.

The merge candidate derivation unit 30361 uses, without change, a motion vector and reference picture index refIdxLX of a neighboring block on which the decode processing has been already applied to derive the merge candidates. Affine prediction may be used as another way to derive the merge candidates. This method is described below in detail. The merge candidate derivation unit 30361 may use the affine prediction for spatial merge candidate derivation processing, temporal merging (inter-frame merge) candidate derivation processing, combined merge candidate derivation processing, and zero merge candidate derivation processing which are described below. The affine prediction is performed in units of sub-blocks, and the prediction parameter is stored in the prediction parameter memory 307 for each sub-block. Alternatively, the affine prediction may be performed in units of pixels.

The spatial merge candidate, the temporal merge candidate, the combined merge candidate, the zero merge candidate, a prediction parameter for around the target block, a prediction parameter for a reference image, an artificially generated prediction parameter, or the like is used as one of vector candidates for the initial vector derivation in PU level search (PU level search unit 303712) and sub-block level search (sub-block level search unit 303713) in matching prediction described later.

Matching Prediction Parameter Derivation Unit

The matching prediction parameter derivation unit 3037 is configured to derive a matching prediction parameter in a case that a flag ptn_match_flag specifying whether or not the matching mode decoded by the inter-prediction parameter decoding control unit 3031 is used is true. Here, examples of the matching prediction parameter include the motion vector mvLX.

Figure 8:
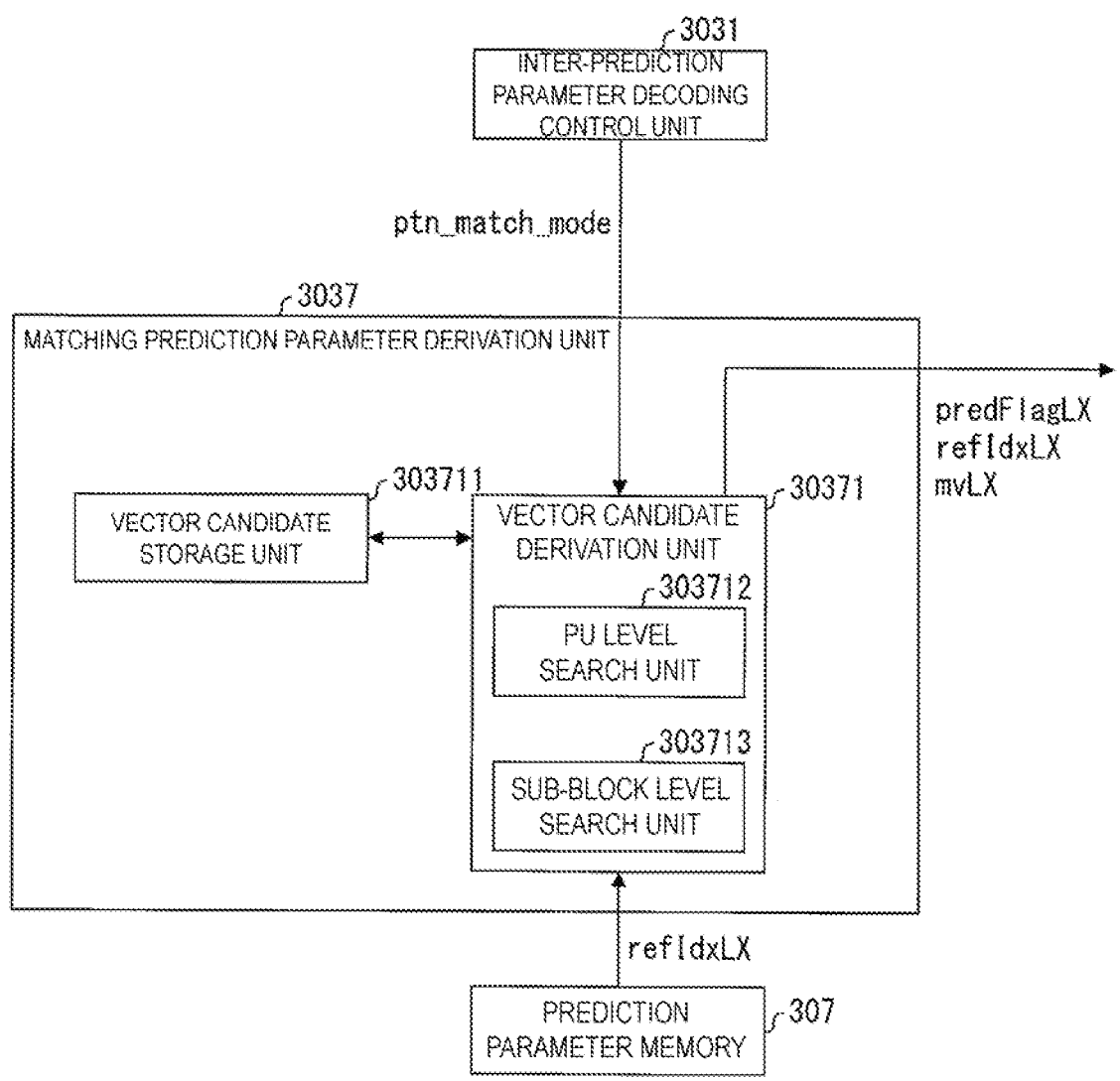
FIG. 8 is a schematic diagram illustrating a configuration of a matching prediction parameter derivation unit according to the present embodiment.

FIG. 8 is a schematic diagram illustrating a configuration of the matching prediction parameter derivation unit 3037 according to the present embodiment. The matching prediction parameter derivation unit 3037 include a vector candidate derivation unit 30371 and a vector candidate storage unit 303711 as illustrated in FIG. 8.

The vector candidate derivation unit 30371 performs any matching process of bilateral matching and template matching depending on a value of ptn_match_mode supplied from the inter-prediction parameter decoding control unit 3031 to derive a motion vector mvLX. The vector candidate derivation unit 30371 performs multiple steps of processing in order to derive the motion vector mvLX to derive multiple motion vector candidates. The derived motion vector candidates are stored in the vector candidate storage unit 303711 and can be referred to at steps subsequent thereto.

The vector candidate derivation unit 30371 includes the PU level search unit 303712 and the sub-block level search unit 303713 as illustrated in FIG. 8.

The PU level search unit 303712 is a component for performing motion vector search for each PU (PU level search). The sub-block level search unit 303713 is a component for performing motion vector search for each sub-block contained in the PU (sub-block level search).

Spatial Merge Candidate Derivation Processing

In the spatial merge candidate derivation processing, the merge candidate derivation unit 30361 reads out the prediction parameter (prediction list utilization flag predFlagLX, motion vector mvLX, reference picture index refIdxLX) stored in the prediction parameter memory 307 according to a prescribed rule to derive the read out prediction parameter as a merge candidate. The read out prediction parameter is a prediction parameter related to each of blocks in a predefined range from the decoding target block (e.g., all or some of blocks touching a below left end, upper left end, and upper right end of the decoding target block). The merge candidate derived by the merge candidate derivation unit 30361 is stored in the merge candidate storage 303611.

The prediction parameter for around the target block corresponding to the spatial merge candidate is used as one of the vector candidates for the initial vector derivation in the matching prediction described later. The motion vectors of the blocks neighboring to upper, left, upper right, and upper left portions of the PU and sub-block are called a left-neighboring vector, an upper-neighboring vector, an upper right-neighboring vector, and an upper left-neighboring vector, respectively.

Temporal Merge Candidate Derivation Processing

In the temporal merging derivation processing, the merge candidate derivation unit 30361 reads out, as merge candidates, prediction parameters (collocated vector at a below right portion) for a block in a reference image including coordinates on the lower right of the decoding target block from the prediction parameter memory 307. As a method of specifying the reference image, the reference picture index refIdxLX specified in the slice header may be used, or a minimum one of the reference picture indices refIdxLX of the block neighboring to the decoding target block may be used, for example. The merge candidates derived by the merge candidate derivation unit 30361 are stored in the merge candidate storage unit 303611. The collocated vector at a below right portion is used as one of the initial vector candidates in the matching prediction described later. The initial vector candidates use a motion vector (center collocated vector) for the block in the reference image, including center coordinates of the target block.

Combined Merge Candidate Derivation Processing

In the combined merging derivation processing, the merge candidate derivation unit 30361 uses vectors and reference picture indices of two different derived merge candidates which are already derived and stored in the merge candidate storage unit 303611 as vectors for L0 and L1, respectively, to combine, and thus derives a combined merge candidate. The merge candidate derived by the merge candidate derivation unit 30361 is stored in the merge candidate storage unit 303611.

Zero Merge Candidate Derivation Processing

In the zero merge candidate derivation processing, the merge candidate derivation unit 30361 derives a merge candidate including a reference picture index refIdxLX of 0 and both an X component and Y component of 0 of a motion vector mvLX. The merge candidate derived by the merge candidate derivation unit 30361 is stored in the merge candidate storage unit 303611.

The merge candidate selection unit 30362 selects, as an inter-prediction parameter for the target PU, a merge candidate assigned with an index corresponding to the merge index merge_idx input from the inter-prediction parameter decoding control unit 3031, among the merge candidates stored in the merge candidate storage unit 303611. The merge candidate selection unit 30362 stores the selected merge candidate in the prediction parameter memory 307 and outputs the candidate to the prediction image generation unit 308 (FIG. 5).

Figure 9:
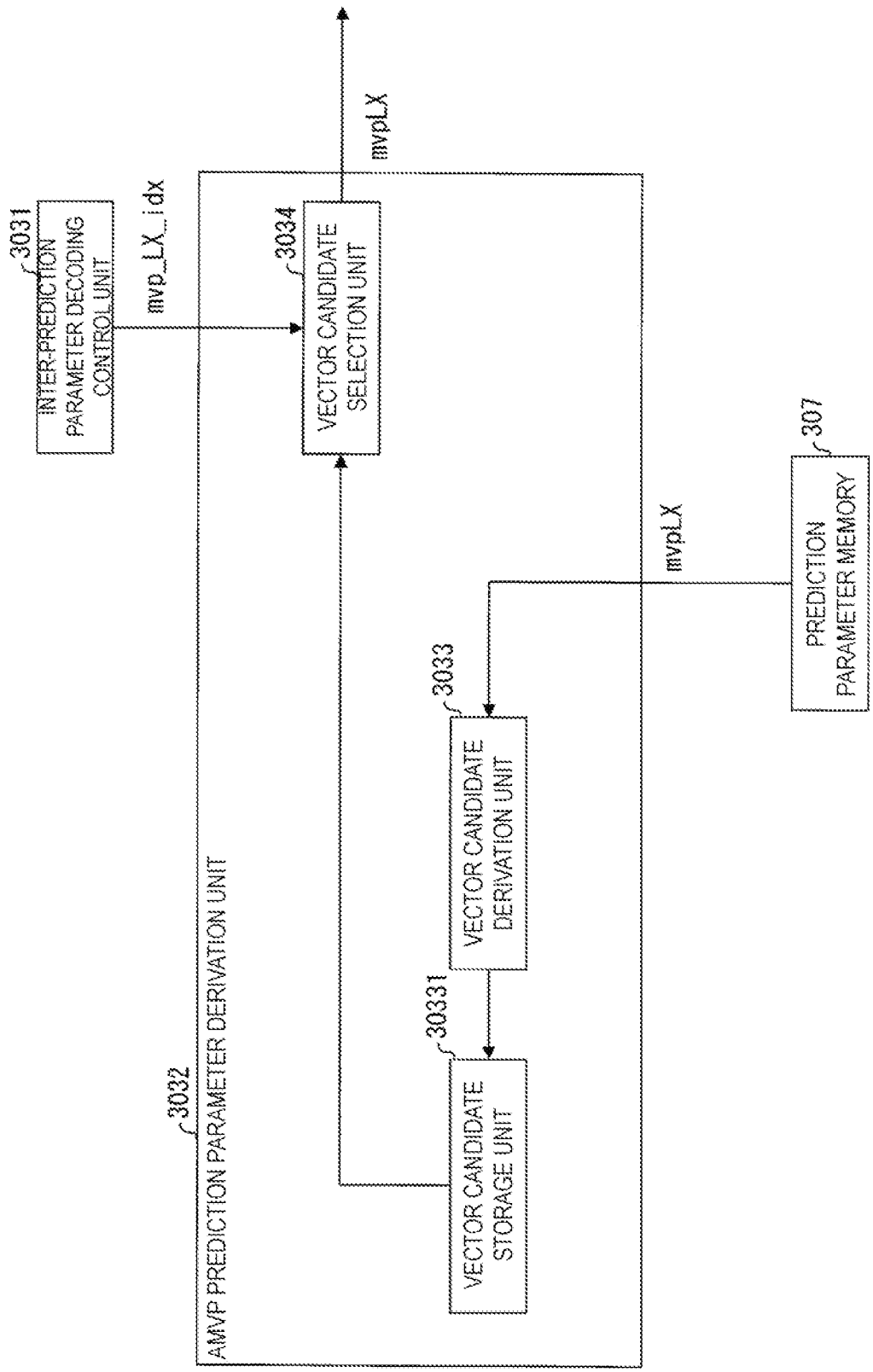
FIG. 9 is a schematic diagram illustrating a configuration of an AMVP prediction parameter derivation unit according to the present embodiment.

FIG. 9 is a schematic diagram illustrating a configuration of the AMVP prediction parameter derivation unit 3032 according to the present embodiment. The AMVP prediction parameter derivation unit 3032 includes a vector candidate derivation unit 3033 (vector compute unit) and a vector candidate selection unit 3034. The vector candidate derivation unit 3033 reads out the vector (motion vector or displacement vector) stored in the prediction parameter memory 307 as a prediction vector mvpLX, based on the reference picture index refIdx. The read out vector is a vector related to each of blocks in a predefined range from the decoding target block (e.g., all or some of blocks touching a below left end, upper left end, and upper right end of the decoding target block).

The vector candidate selection unit 3034 selects, as a prediction vector mvpLX, a vector candidate indicated by the prediction vector index mvp_LX_idx input from the inter-prediction parameter decoding control unit 3031, among the vector candidates read out by the vector candidate derivation unit 3033. The vector candidate selection unit 3034 outputs the selected prediction vector mvpLX to the addition unit 3035.

The vector candidate selection unit 3034 may be configured to perform a round process described below on the selected prediction vector mvpLX.

A vector candidate storage 30331 stores therein the vector candidate input from the vector candidates derivation unit 3033. The vector candidates are configured to include the prediction vector mvpLX. The vector candidates stored in the vector candidate storage unit 30331 is assigned with an index according to a prescribed rule.

The vector candidate derivation unit 3033 uses the affine prediction to derive the vector candidates. The vector candidate derivation unit 3033 may use the affine prediction for spatial vector candidate derivation processing, temporal vector (inter-frame vector) candidate derivation processing, combined vector candidate derivation processing, and zero vector candidate derivation processing which are described below. The affine prediction is performed in units of sub-blocks, and the prediction parameter is stored in the prediction parameter memory 307 for each sub-block. Alternatively, the affine prediction may be performed in units of pixels.

Figure 10:
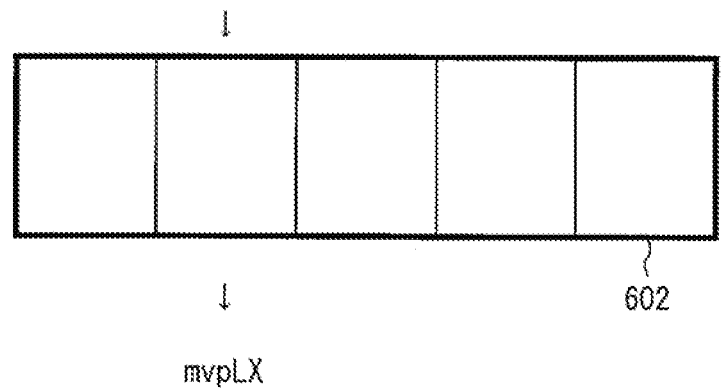
FIG. 10 is a conceptual diagram illustrating an example of a vector candidate.

FIG. 10 is a conceptual diagram illustrating an example of the vector candidates. A prediction vector list 602 illustrated in FIG. 10 is a list constituted by multiple vector candidates derived by the vector candidate derivation unit 3033. In the prediction vector list 602, each of five rectangles horizontally aligned represents a region (e.g., mvpListLX[ ]) storing a prediction vector. A downward arrow immediately under "mvp_LX_idx" located at the second rectangle from the left end, and mvpLX under the arrow indicate that the prediction vector index mvp_LX_idx is an index referring to the vector mvpLX in the prediction parameter memory 307. Specifically, mvpLX=mvpListLX[mvp_LX_idx].

The vector candidates are generated based on vectors related to blocks referred to by the vector candidate selection unit 3034. Each block referred to by the vector candidate selection unit 3034 may be a block on which the decode processing is completed, the block being in a predefined range from the decoding target block (e.g., neighboring block). The neighboring block includes a block spatially neighboring to the decoding target block such as a left block and an upper block, and a block temporally neighboring to the decoding target block such a block which is the same in a location as the decoding target block but different in a display time.

The addition unit 3035 adds the prediction vector mvpLX input from the AMVP prediction parameter derivation unit 3032 and the difference vector mvdLX input from the inter-prediction parameter decoding control unit 3031 to compute a motion vector mvLX. The addition unit 3035 outputs the computed motion vector mvLX to the prediction image generation unit 308 (FIG. 5).

Figure 11:
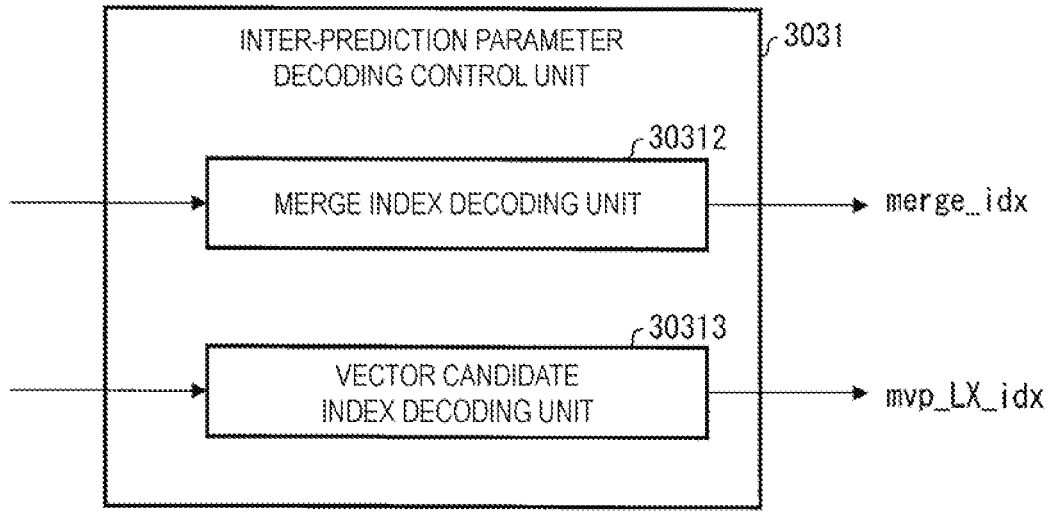
FIG. 11 is a schematic diagram illustrating a configuration of an inter-prediction parameter decoding control unit according to the present embodiment.

FIG. 11 is a schematic diagram illustrating a configuration of the inter-prediction parameter decoding control unit 3031 according to the present embodiment. The inter-prediction parameter decoding control unit 3031 is configured to include a merge index decoding unit 30312, a vector candidate index decoding unit 30313, and a not illustrated partition mode decoding unit, merge flag decoding unit, inter-prediction flag decoding unit, reference picture index decoding unit, vector difference decoding unit, and the like. The partition mode decoding unit, the merge flag decoding unit, the merge index decoding unit, the inter-prediction flag decoding unit, the reference picture index decoding unit, the vector candidate index decoding unit 30313, and the vector difference decoding unit decode respectively the partition mode part_mode, the merge flag merge_flag, the merge index merge_idx, the inter-prediction flag inter_pred_idc, the reference picture index refIdxLX, the prediction vector index mvp_LX_idx, and the difference vector mvdLX. Moreover, ptn_match_mode that is the syntax indicating the type of the matching mode may be decoded.

Inter-Prediction Image Generation Unit 309

Figure 12:
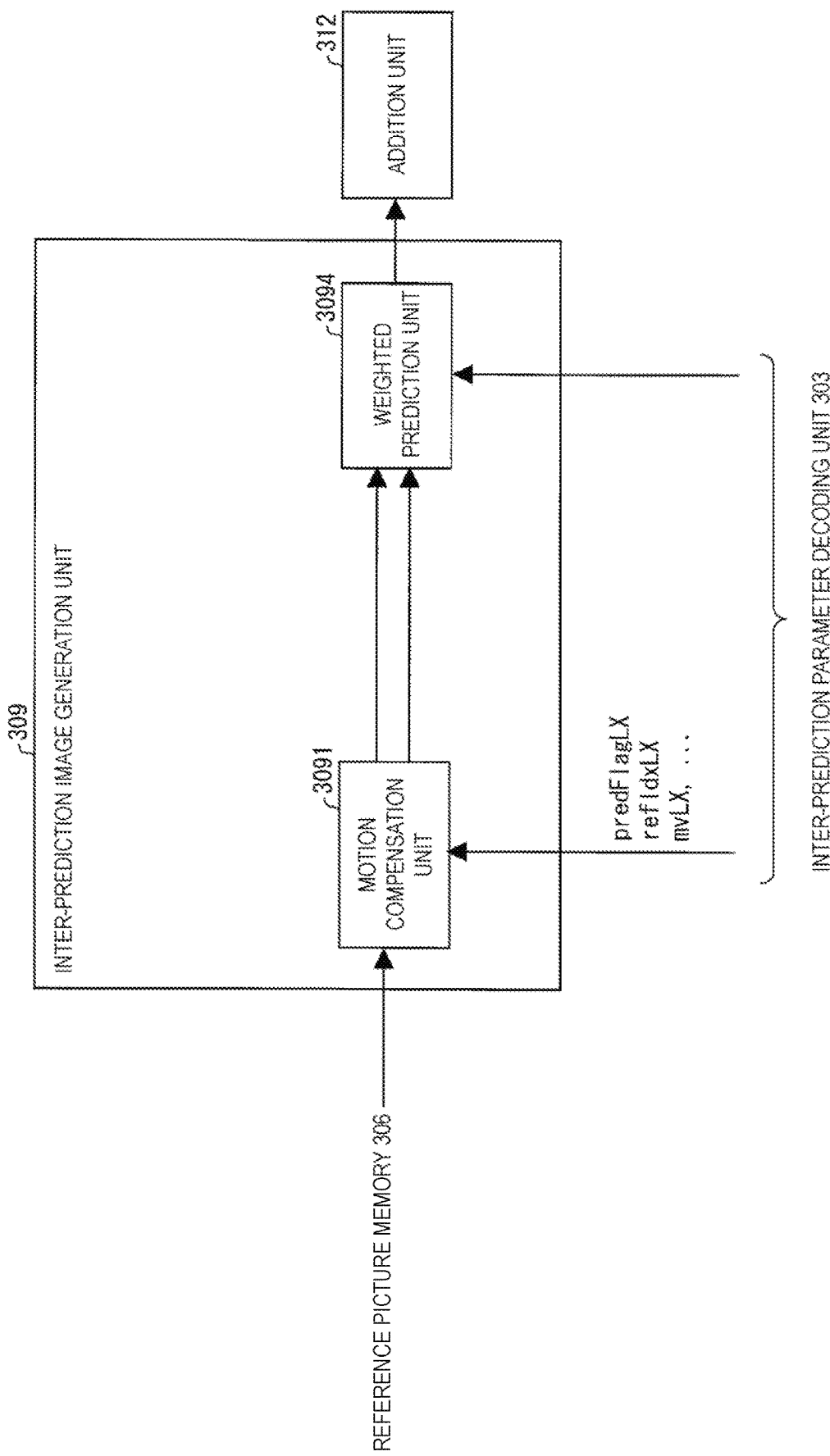
FIG. 12 is a schematic diagram illustrating a configuration of an inter-prediction image generation unit according to the present embodiment.

FIG. 12 is a schematic diagram illustrating a configuration of the inter-prediction image generation unit 309 according to the present embodiment. The inter-prediction image generation unit 309 is configured to include a motion compensation unit 3091 and a weighted prediction unit 3094.

Motion Compensation

The motion compensation unit 3091 reads out from the reference picture memory 306 a block which is displaced by a motion vector mvLX from a starting point as a location of the decoding target block for the reference picture specified by the reference picture index refIdxLX, based on the prediction list utilization flag predFlagLX, reference picture index refIdxLX, and motion vector mvLX that are input from the inter-prediction parameter decoding unit 303 to generate a motion-compensated image. Here, in a case that a precision of the motion vector mvLX is not an integer precision, a motion-compensated image is generated by filtering called a motion compensation filter for generating a pixel at fractional position. Hereinafter, an L0 prediction motion compensation image is called predSamplesL0 and an L1 prediction motion-compensated image is called predSamplesL1. These images are called predSamplesLX when not distinguished. Even in a case that the motion vector is an integer precision, the motion compensation unit 3091 may use filter coefficients in which, for example, only a coefficient in one position has a value and other coefficients are 0 such as {0, 0, 0, 8, 0, 0. 0, 0}, to apply the motion compensation filter and generate a motion-compensated image.

Weighted Prediction

The weighted prediction unit 3094 multiplies an input motion displacement image predSamplesLX by weight coefficients to generate a prediction picture block P (prediction image). In a case that one of reference list utilization flags (predFlagL0 or predFlagL1) is 1 (in a case of the uni-prediction) and the weighted prediction is not used, processing by the following equation is performed to fit the input motion displacement image predSamplesLX (LX is L0 or L1) to the number of pixel bits.

```
predSamples[x][y] = Clip3 (0, (1 << bitDepth) − 1, (predSamplesLX[x][y] +
offset1 >> shift1)
    where shift1 = 14 − bitDepth, offset1 = 1 << (shift1-1).
```

In a case that both of the reference list utilization flags (predFlagL0 or predFlagL1) are 1 (that is, in a case of the bi-prediction) and the weighted prediction is not used, processing by the following equation is performed to average the input motion displacement images predSamplesL0 and predSamplesL1 to be fit to the number of pixel bits.

```
predSamples[x][y] = Clip3 (0, (1 << bitDepth) − 1, (predSamplesL0 [x][y] +
predSamplesL1[x][y] + offset2) >> shift2)
    where shift2 = 15 − bitDepth, offset2 = 1 << (shift2-1).
```

Furthermore, in a case of the uni-prediction and that the weighted prediction is performed, the weighted prediction unit 3094 derives a weighted prediction coefficient w0 and an offset o0 from the coded data and performs processing by the following equation.

```
predSamples[x][y] = Clip3 (0, (1 << bitDepth) − 1, ((predSamplesLX[x][y] * w0 +
2log2WD − 1) >> log2WD) + o0)
``` where log 2WD represents a variable indicating a predetermined shift amount.

Further, in a case of the bi-prediction and that the weighted prediction is performed, the weighted prediction unit 3094 derives weighted prediction coefficients w0, w1, o0, and o1 from the coded data and performs processing by the following equation.

```
predSamples[x][y] = Clip3(0, (1 << bitDepth) − 1, (predSamplesL0[x][y] * w0 +
predSamplesL1[x][y] * w1 + ((o0 + o1 + 1) << log2WD)) >> (log2WD + 1))
```

Motion Vector Derivation Processing

Figure 16:
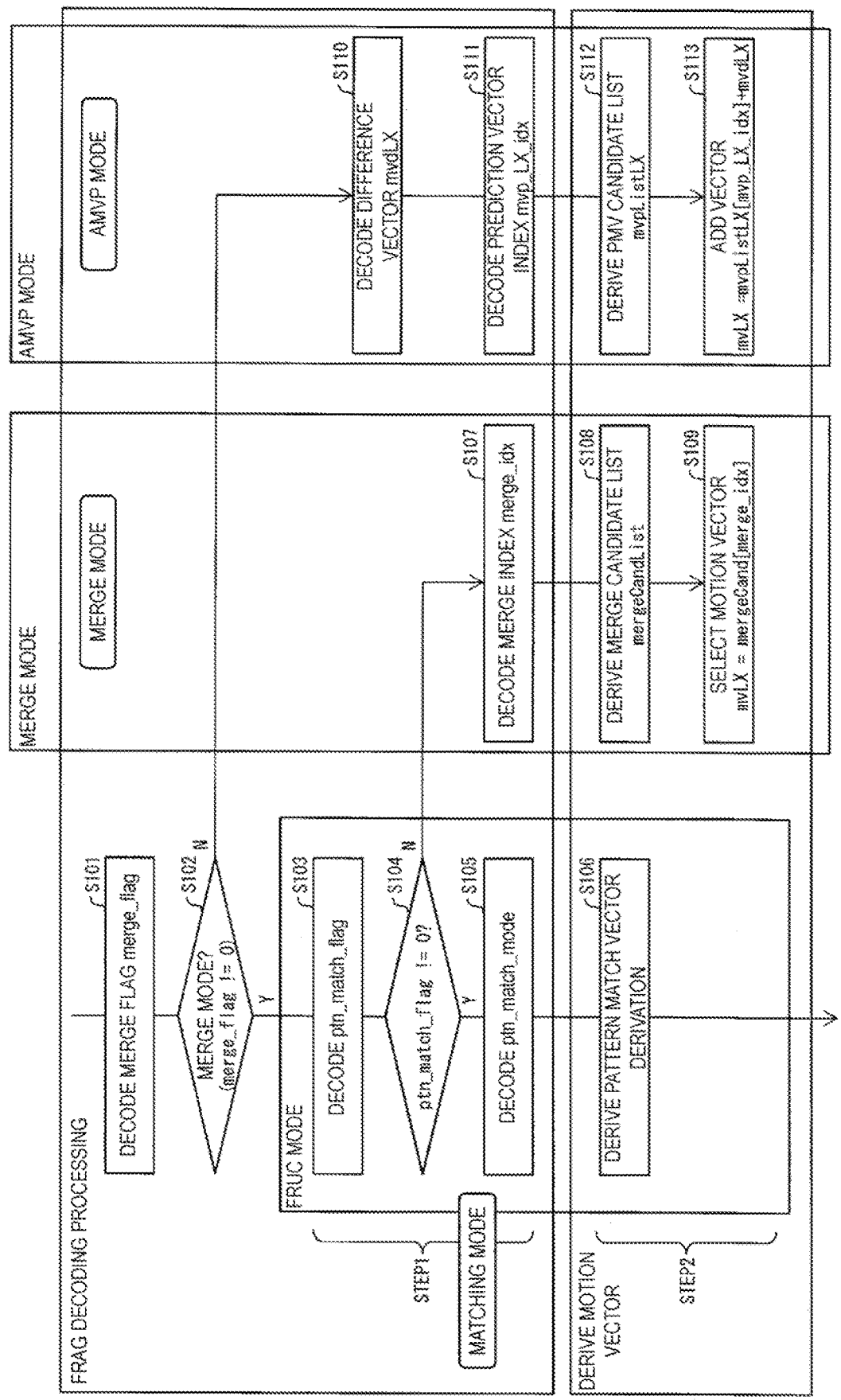
FIG. 16 is a flowchart illustrating a flow of motion vector derivation processing according to the present embodiment.

A description is given of the motion vector derivation processing by the inter-prediction parameter decoding unit 303 with referring to FIG. 16. FIG. 16 is a flowchart illustrating a flow of the motion vector derivation processing.

In the following description, each process is performed by the inter-prediction parameter decoding unit 303 unless otherwise specifically described.

First, the merge flag merge_flag is decoded at step S101, and merge_flag !=0 ? is determined at step S102.

In a case that merge_flag !=0 is true (Y at S102), a flag ptn_match_flag specifying whether or not the matching mode is used is decoded at step S103, and ptn_match_flag !=0 ? is determined at step S104.

In a case that ptn_match_flag !=0 is true (Y at S104), for example, in a case that ptn_match_flag is equal to 1, the matching mode is selected as a motion vector derivation method. Furthermore, as illustrated at S105, ptn_match_mode that is a syntax indicating a type of the matching mode may be decoded. Subsequently, the matching mode specified by ptn_match_mode is implemented at step S106. The process at step S106 is described in detail later with referring to another figure.

In a case that ptn_match_flag !=0 is false at step S104, the inter-prediction parameter decoding control unit 3031 decode the merge index merge_idx at S107. Subsequently, the merge prediction parameter derivation unit 3036 derives a merge candidate list mergeCandList at S108 and computes a motion vector mvLX at S109 in accordance with

```
mvLX = mergeCand[merge_idx].
```

On the other hand, in a case that merge_flag !=0 is false at step S102 (N at S102), the AMVP mode is selected. To be more specific, the inter-prediction parameter decoding control unit 3031 decodes the difference vector mvdLX at S110 and decodes the prediction vector index mvp_LX_idx at S111. Further, a PMV candidate list mvpListLX is derived at S112. Subsequently, the motion vector mvLX is computed at S113 in accordance with

```
mvLX = mvpListLX[mvp_LX_idx] + mvdLX.
```

Although not illustrated in the FIG. 16, even in the case that the AMVP mode is selected, the flag ptn_match_flag specifying whether or not the matching mode is used may be decoded, and if ptn_match_flag is equal to 1, the motion vector derivation in the matching mode may be performed. In this case also, ptn_match_mode that is the syntax indicating the type of the matching mode may be decoded.

Overview of Motion Vector Derivation Using Matching Process

Hereinafter, a description is given of an overview of the motion vector derivation processing using the matching process with referring to FIGS. 17A and 17B. The motion vector derivation processing using the matching process is performed by the vector candidate derivation unit 30371 which is included in the matching prediction parameter derivation unit 3037, for example.

If the motion vector derivation processing using the matching process is adopted, the motion vector difference mvdLX does not need to be coded or decoded for the target block, and therefore, a code amount of the coded data is reduced. Moreover, as compared with the case that the merge processing is performed in which the already decoded motion vector is used with no change, the motion vector can be properly selected with a higher probability, and therefore, the prediction precision can be expected to be improved.

Figure 17A:
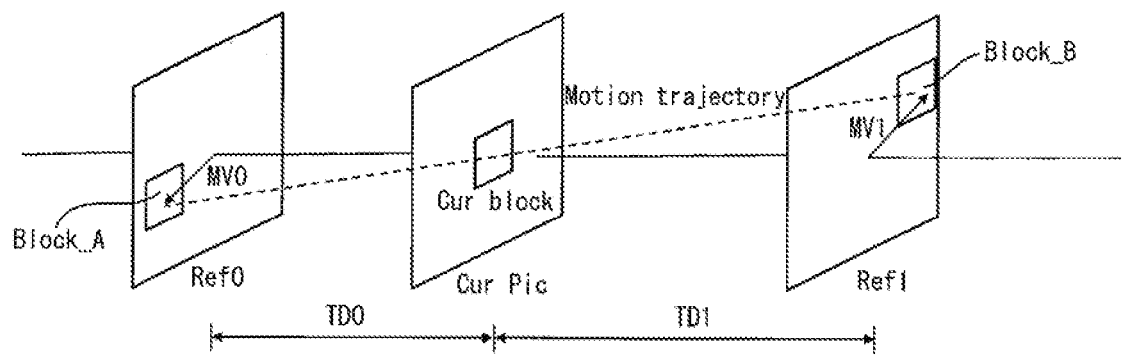
FIG. 17A illustrates Bilateral matching in a matching process according to the present embodiment.

FIG. 17A illustrates Bilateral matching in the above matching process.

As illustrated in FIG. 17A, in the bilateral matching, two reference pictures are referred to in order to derive a motion vector of the target block (Cur_block) in the target picture (Cur_Pic).

To be more specific, first, assuming that block coordinates of the target block Cur_block are (xCur, yCur), a block (called Block_A) and a block (called a Block_B) are configured, where the Block_A is a block in a reference picture (called a reference picture A) specified by a reference picture index Ref0 and has block coordinates (xPos, yPos) specified by (xPos, yPos)=(xCur+MV0_x, yCur+MV0_y), and the Block_B is a block in a reference picture (called a reference picture B) specified by a reference picture index Ref1 and has block coordinates (xPos, yPos) specified by (xPos, yPos) = (xCur − MV0_x * TD1/TD0, yCur − MV0_y * TD1/TD0).

In the above equation, TD0 and TD1 represent an inter-picture distance between the target picture Cur_Pic and the reference picture A, and an inter-picture distance between the target picture Cur_Pic and the reference picture B, respectively, as illustrated in FIG. 17A.

Next, (MV0_x, MV0_y) is determined such that a matching cost for the Block_A and Block_B is minimum. (MV0_x, MV0_y) derived in this way is the motion vector provided to the target block. For example, examples of the matching cost include a Sum of Absolute Differences (SAD), sum of absolute Hadamard transformed differences (SATD), and Sum of Square Differences (SSD) between the Block_A and the Block_B. Furthermore, a value obtained by adding a vector cost to SAD, SATD, and SSD may be used for the matching cost. Examples of the vector cost include a value obtained by multiplying a distance to the initial vector (city block distance) by a proper constant lambda. On the other hand, FIG. 17B illustrates Template matching in the above matching process.

Figure 17B:
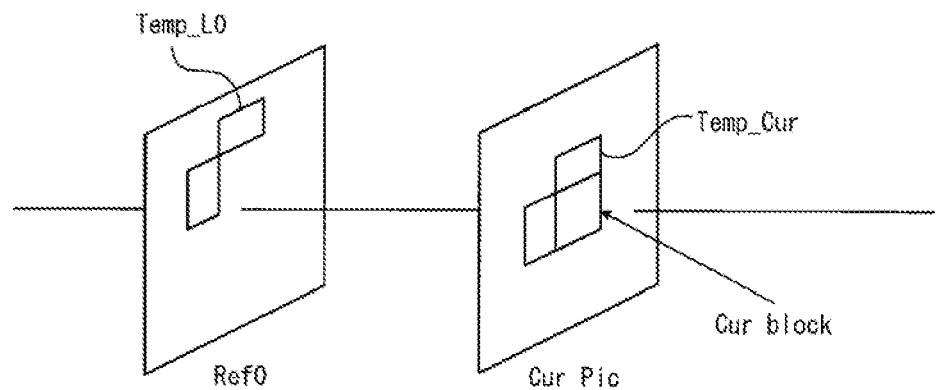
FIG. 17B illustrates Template matching in the matching process according to the present embodiment.

As illustrated in FIG. 17B, in the template matching, one reference picture is referred to in order to derive a motion vector of the target block (Cur_block) in the target picture (Cur_Pic).

To be more specific, first, a block (called Block_A) is specified, where the Block_A is a block in a reference picture (called a reference picture A) specified by a reference picture index Ref0 and has block coordinates (xPos, yPos) specified by (xPos, yPos) = (xCur + MV0_x, yCur + MV0_y).

In the above equation, (xCur, yCur) represent block coordinates of the target block Cur_block.

Next, a template region Temp_Cur neighboring to the target block Cur_block is configured in the target picture Cur_Pic and a template region Temp_L0 neighboring to the Block_A is configured in the reference picture A. In the example illustrated in FIG. 17B, the template region Temp_Cur is constituted by an area neighboring to an upper side of the target block Cur_block and an area neighboring to a left side of the target block Cur_block. The template region Temp_L0 is constituted by an area neighboring to an upper side of the Block_A and an area neighboring to a left side of the Block_A. The template region may include, besides the areas neighboring to the upper side and left side of each of the blocks (Cur_block and Block_A), other already decoded areas of Cur_Pic such as an upper left area or an upper right area.

Next, (MV0_x, MV0_y) is determined such that a difference between the template region Temp_Cur and the template region Temp_L0 (e.g., Sum of Absolute Difference) is minimum. (MV0_x, MV0_y) derived in this way is the motion vector provided to the target block.

Motion Vector Derivation Processing Using Matching Process

Hereinafter, a description is given of a flow of the motion vector derivation processing in the matching mode (pattern match vector derivation processing) with referring to FIG. 18.

Figure 18:
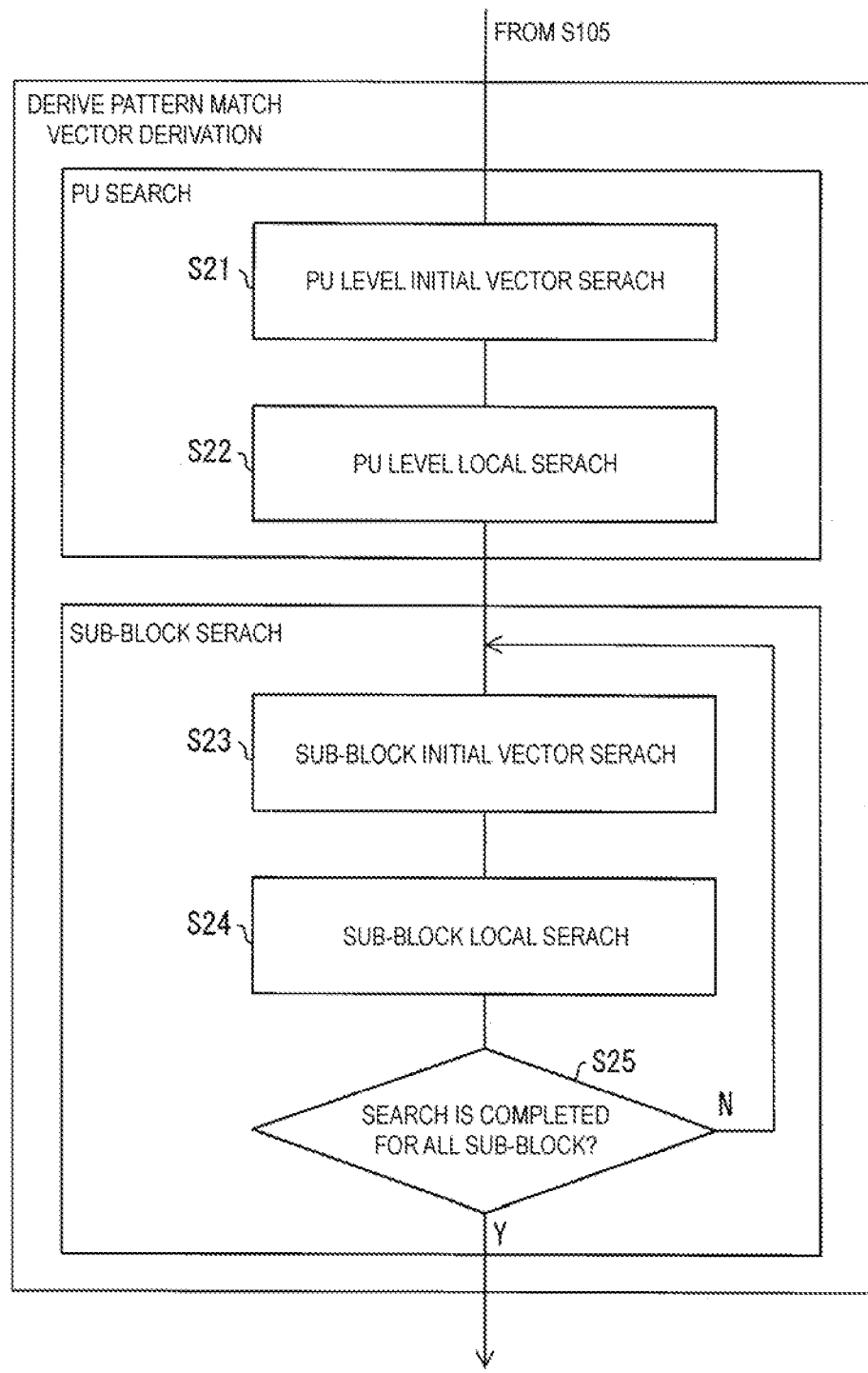
FIG. 18 is a flowchart illustrating a flow of another motion vector derivation processing according to the present embodiment.

FIG. 18 is a flowchart illustrating a flow of the motion vector derivation processing. FIG. 18 specifically illustrates a flow of a process at S106 (STEP 2) which is subsequent to step S105 described above (see FIG. 16).

In the following description, each process is performed by the vector candidate derivation unit 30371 (the PU level search unit 303712 or the sub-block level search unit 303713) unless otherwise specifically described.

At step S21 subsequent to step S105, the PU level search unit 303712 derives an initial vector of a target prediction unit (PU) (initial vector search). The initial vector is a motion vector as a search base, and a motion vector around the initial vector is searched for in the following local search. Specifically, the PU level search unit 303712 sets a vector of which the matching cost is minimum as an initial vector of the PU among the vector candidates (spatial merge candidate, temporal merge candidate, combined merge candidate, zero vector, ATMVP vector of the PU and the like). Next, at step S22, the PU level search unit 303712 performs search (local search) centering on the initial vector of the PU selected by the PU level search unit 303712 at step S21. The PU level search unit 303712 derives a matching cost of a vector candidate near the initial vector of the PU, and derives a vector with the minimum cost as the PU motion vector (PU selection vector). The local search in the PU level search may be step search or raster search. The local search is described in detail later. The ATMVP vector is a vector derived using an average (or weighted average, median) of the motion vector around the target block and a motion vector of the reference image.

Subsequently, at step S23, the sub-block level search unit 303713 derives an initial vector of the sub-block contained in the above target PU (initial vector search). Specifically, the sub-block level search unit 303713 sets, among the vector candidates (PU selection vector, zero vector, center collocated vector of the sub-block, collocated vector at a below right portion of the sub-block, ATMVP vector of the sub-block, upper-neighboring vector of the sub-block, left-neighboring vector of the sub-block and the like), a vector of which the matching cost is minimum as the initial vector of the sub-block. Next, at step S24, the sub-block level search unit 303713 performs the step search (local search) centering on the initial vector of the sub-block selected at S23. The sub-block level search unit 303713 derives a matching cost of a vector candidate near the initial vector of the sub-block, and derives a vector with the minimum cost as the motion vector of the sub-block. Next, at step S25, the sub-block level search unit 303713 determines whether or not the motion vector search is completed for the all sub-blocks (the sub-blocks contained in the PU of which motion vector is derived at step S22).

In a case that the motion vector search is not completed for the all sub-block (N at S25), the process returns to S23.

The vector candidate used to search for the initial vector of the sub-block is not limited to the above described vector.

Motion Search Algorithm

The PU level search unit 303712 (a first motion vector search unit) and the sub-block level search unit 303713 (a second motion vector search unit), after searching for an initial vector startMV, performs the local search for the motion vector. A description is given, based on FIGS. 19A to 19D, of a main motion search algorithm used for the step search (stepwise search) with which the PU level search unit 303712 and the sub-block level search unit 303713 perform the efficient and high-speed local search. The number of steps (stepIter, the maximum number of rounds) indicating how many times a method used for the motion search (stepMethod, step pattern configuration) is repeated (the number of iterations) is set to a predetermined value. As described later, the maximum number of rounds stepIter-SubPU for the sub-block level search unit 303713 may be less than the maximum number of rounds stepIterPU for the PU level search unit 303712.

The PU level search unit 303712 and the sub-block level search unit 303713 consider a search candidate point providing the smallest matching cost as an optimum search point among search candidate points of which the matching costs are estimated in the motion search, and select a motion vector bestMV of the search candidate point (a second process). Examples of functions used to derive the matching cost include a Sum of Absolute Differences (SAD), a sum of absolute Hadamard transformed differences (SATD), and a Sum of Square Differences (SSD).

The local search for the motion vector performed by the PU level search unit 303712 and the sub-block level search unit 303713 uses, without limitation, motion search algorithms such as diamond search (stepMethod=DIAMOND) and cross search (stepMethod=CROSS), raster search (raster type search, stepMethod=RASTER).

Both the PU level search unit 303712 and the sub-block level search unit 303713 may be configured to use the motion search algorithm described above to perform the local search for the motion vector. However, for the purpose of simple description, the following description describes, as an example, the case in which the PU level search unit 303712 uses the above motion search algorithm, and a description of a case that the sub-block level search unit 303713 uses the above motion search algorithm is omitted.

Step Search

First, as an example of the step search, the diamond search is described using FIGS. 19A to 19D. FIGS. 19A to 19D illustrate the motion search patterns when applying the diamond search. FIGS. 19A to 19D illustrate an example of a search range of 7 PUs (horizontal)×5 PUs (vertical). The example also illustrates a case of the diamond search in which the number of offset candidates (offsetCand) is eight as expressed below, the offset candidate being added to coordinates of a search start point in order to configure a search candidate point:

$$\text{offsetCand}[8] = \{(0, 2), (1, 1), (2, 0), (1, -1), (0, -2), (-1, -1), (-2, 0), (-1, 1)\}.$$

The PU level search unit 303712 adds each value (offsetCand[Idx]) of the offset candidates (offsetCand) to the coordinates (location) startMV of the search start point to select coordinates of eight search candidate points. The search candidate points selected in this way correspond to eight directions from a search start direction nDirectStart=0 to a search end direction nDirectEnd=7. The number of offset candidates (offsetCand) is generally eight in the diamond search, but another value, for example any value larger than eight, or smaller than eight may be adopted. However, a proper value is preferably selected because the larger the number of offset candidates, the more time and amount of calculation required for the processing of the motion search.

In FIGS. 19A to 19D, a non-filled rhombus represents a start point of the initial vector startMV at each time of the number of searches, a black rhombus represents a terminal point of an optimum vector bestMV at each search round, a black circle represents a search candidate point at each time of the number of searches, and a non-filled circle represents a searched point at each time of the number of searches.

In a case that the PU level search unit 303712 performs the motion search applying the step search, the PU level search unit 303712 initializes a search round numIter to 0 before starting the search.

The PU level search unit 303712 sets the matching cost at the search start point to a minimum cost minCost at each time and set an optimum candidate index bestIdx as an initial value (−1) when a search round starts.

$$minCost = mcost(startMV)$$

$$bestIdx = -1$$

where mcost(X) is a function to derive a matching cost with a search vector X.

The PU level search unit 303712 selects and estimates the search candidate points centering on the search start point (P0, here) at each search round (here, the 0-th search, numIter=0). Here, eight points arranged in a diamond shape are selected as the search candidate points (points 0 to 7 in FIG. 19A, here). To be more specific, the PU level search unit 303712, when starting the search, configures search vectors (with initial vector startMV=P0) each of which has an initial point as the search start point P0 and a terminal point as a respective search candidate point.

The PU level search unit 303712 estimates the matching cost for each of the search candidate points 0 to 7 illustrated in FIG. 19A. For Idx=nDirectStart. nDirectEnd (here, nDirectStart=0, nDirectEnd=7), the motion vector candidates candMV are sequentially derived by expression below to estimate the matching cost for each candMV.

$$candMV = startMV + offsetCand[Idx]$$

For example, in a case that the search candidate point (including the search start point P0) providing the smallest matching cost is the point 2 illustrated in FIG. 19A, that is, in a case that the matching cost candCost (candCost=mcost (candMV[Idx])) at the search candidate point candMV[Idx] with Idx=2 is less than the minimum cost minCost (candCost<minCost), the PU level search unit 303712 updates the optimum search candidate index bestIdx to Idx to update an optimum cost minCost and the optimum vector bestMV.

The above description can be represented by expressions as below.

$$bestIdx = Idx$$
$$minCost = candCost$$
$$bestMV = candMV[Idx]$$

A series of processes in which the search candidate points are configured centering on the search start point in each round, the matching cost of each of the configured search candidate points is derived and estimated, and the search candidate point providing the optimum matching cost is selected is called the "step round process" here. In the step search, this "step round process" is repeatedly performed. The number of search rounds numIter is incremented by 1 for each step round process.

In a case that, at a time when each step round process is completed or at a time when estimations of all the search candidate points are completed, the optimum vector bestMV is updated (here, bestIdx>=0) in this process and the number of search rounds numIter is less than the predetermined maximum number of rounds stepIter (here, numIter<stepIter), the PU level search unit 303712 performs the next step round process. The search candidate point selected at this time is used as the search start point for the next round. To be more specific, the PU level search unit 30372 selects the point 2 illustrated in FIG. 19A as a terminal point of the optimum vector bestMV for the prediction block PU in the next step round process.

$$startMV = bestMV(here, P(1))$$

The determination on whether or not the optimum vector bestMV is updated can be determined based on, in addition to whether or not the optimum vector bestMV is different from the search start point, whether or not bestIdx is updated to other value than the initial value (−1), or whether or not minCost is updated to other value than the initial cost at the start point, or the like. If a search start index nDirectStart and a search end index nDirectEnd which are used in the next round are determined according to expressions below depending on a location of the optimum vector bestMV (optimum candidate index Idx), the efficient search can be made without searching again for the already searched search point.

$$nStep = 2 - (bestIdx \,\&\, 1)$$
$$nDirectStart = bestIdx - nStep$$
$$nDirectEnd = bestIdx - nStep$$

Figures 19B, 19C:
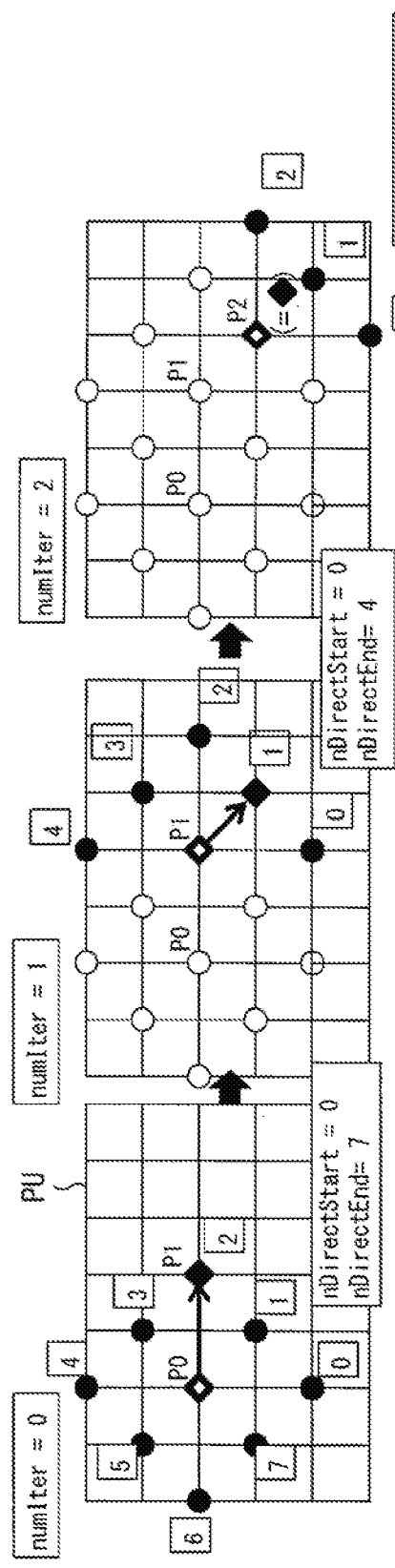

Next, as illustrated in FIG. 19B, in the first search (numIter=1), the PU level search unit 303712 sets the point 2 selected to be the terminal point of the optimum vector bestMV in FIG. 19A as a starting point of the initial vector startMV (search start point P1) in this search. The PU level search unit 303712 sets multiple points which are arranged in a diamond shape centering on the search start point P1 and still not selected as the search candidate point, as the search candidate points (points 0 to 4 in FIG. 19B). The PU level search unit 303712 sequentially selects the points which are still not selected as the search candidate point to estimate its matching cost. That is, the search candidate point indicated with Idx=nDirectStart. nDirectEnd (here, nDirectStart=0, nDirectEnd=4) is estimated. For example, in a case that the search candidate point (including the search start point P1) providing the smallest matching cost is the point 1 illustrated in FIG. 19B, that is, in a case that the matching cost candCost (candCost=mcost (candMV[Idx])) at the search candidate point candMV[Idx] with Idx=1 is less than the minimum cost minCost (candCost<minCost), the PU level search unit 303712 updates the optimum vector bestMV similarly to the previous round.

Because the optimum vector bestMV is updated in this process, the PU level search unit 303712 performs the next step round process. In the relevant next process also, the point 1 illustrated in FIG. 19B that is the optimum search candidate point in this round is selected as a starting point of the optimum vector bestMV for the prediction block PU.

Subsequently, as illustrated in FIG. 19C, in the second search (numIter=2), the PU level search unit 303712 sets the point 1 illustrated in FIG. 19B as a starting point of the initial vector startMV (search start point P2), and selects multiple points, which are arranged in a diamond shape centering on the search start point P2, still not selected as the search candidate points, and exist in the search range, as the search candidate points (points 0 to 2 in FIG. 19C) (i.e., nDirectStart=0, nDirectEnd=2).

In a case that in FIG. 19C, the search candidate point providing the smallest matching cost is more in the cost than the search start point P2 illustrated in FIG. 19C, the optimum vector bestMV is not updated.

Here, a series of step search processes (diamond search) ends.

The PU level search unit 303712 may newly perform another step search. FIG. 19D illustrates an example in which the PU level search unit 303712 performs the cross search (stepMethod=CROSS) one time in order to further search in detail around the search start point P2 in the next step round process.

In the cross search, the following values are used as the offset candidates (offsetCand).

$$offsetCand[4] = \{(0, 1), (1, 0), (0, -1), (-1, 0)\}$$

In the cross search, the PU level search unit 303712 selects, as the search candidate points, points which are located left, right, above, and below (in a cross shape) the search start point (the search start point P2 in FIG. 19C) as a center and not selected as the search candidate points in the diamond search above. For example, in a case that, among the search candidate points which are points 0 to 3 located left, right, above, and below the search start point P2, the point 1 illustrated in FIG. 19D is the search candidate point (including the search start point P2) providing the smallest matching cost, the PU level search unit 303712 selects the point 1 illustrated in FIG. 19D as a terminal point of the optimum vector bestMV for the prediction block PU.

In this way, the PU level search unit 303712 may be configured to use a certain step search (e.g., diamond search)

one or multiple times to select the search candidate point providing the smallest matching cost, and thereafter, use a certain step search (e.g., cross search) one or multiple times to select in further detail the motion vector.

The motion search patterns illustrated in FIGS. 19A to 19C are examples of the motion search using the diamond search, and the PU level search unit 303712 may use diamond search having other motion search patterns. For example, diamond search may be applied in which in the 0-th search, points at an equal distance from the search start point are selected as the search candidate points, and in the n-th search, a point at a distance $2^{n-1}$ from the search start point is searched for.

Raster Search

Subsequently, a description is given of the raster search. In the case that the PU level search unit 303712 performs the motion search applying the raster search, the PU level search unit 303712 exhaustively selects the search points in the search range at a certain interval and estimates the matching costs of these in an order of raster scan. Here, the raster scan is a search method in which starting from an upper left of the search range, pixels are scanned from left to right until a right end, and when arriving the right end, the row is changed to a row lower by one row, and again, pixels are scanned from a left end to a right end.

The PU level search unit 303712 selects the search vector which provides the smallest matching cost among the matching costs computed for the respective search vectors having the terminal points configured in the order of raster scan.

In the raster scan, the PU level search unit 303712 performs a process below on a block having a size of blkW×blkH. The PU level search unit 303712 first sets a Y-coordinate y and an X-coordinate x to initial values, and scans x from the initial value to an end value. When x arrives the end value, the PU level search unit 303712 returns x to the initial value. Next, the PU level search unit 303712 repeats a process of increasing y and scanning x from the initial value to the end value for the updated y. The above process expressed by a pseudo-code is a double loop in which a loop of x is inside a loop of y as below.

```
for (y = 0; y < blkH; y++) { // loop for y
    for (x = 0; x < blkW; x++) { // loop for x
        process in raster scan
    }
}
```

Expanded raster scan may be used instead of the raster scan. In the expanded raster scan, points in a block are scanned in a predetermined order of scan like the raster scan. For example, a spiral scan spirally scanning from the center toward a periphery is included.

Local Search Process

Figure 20:
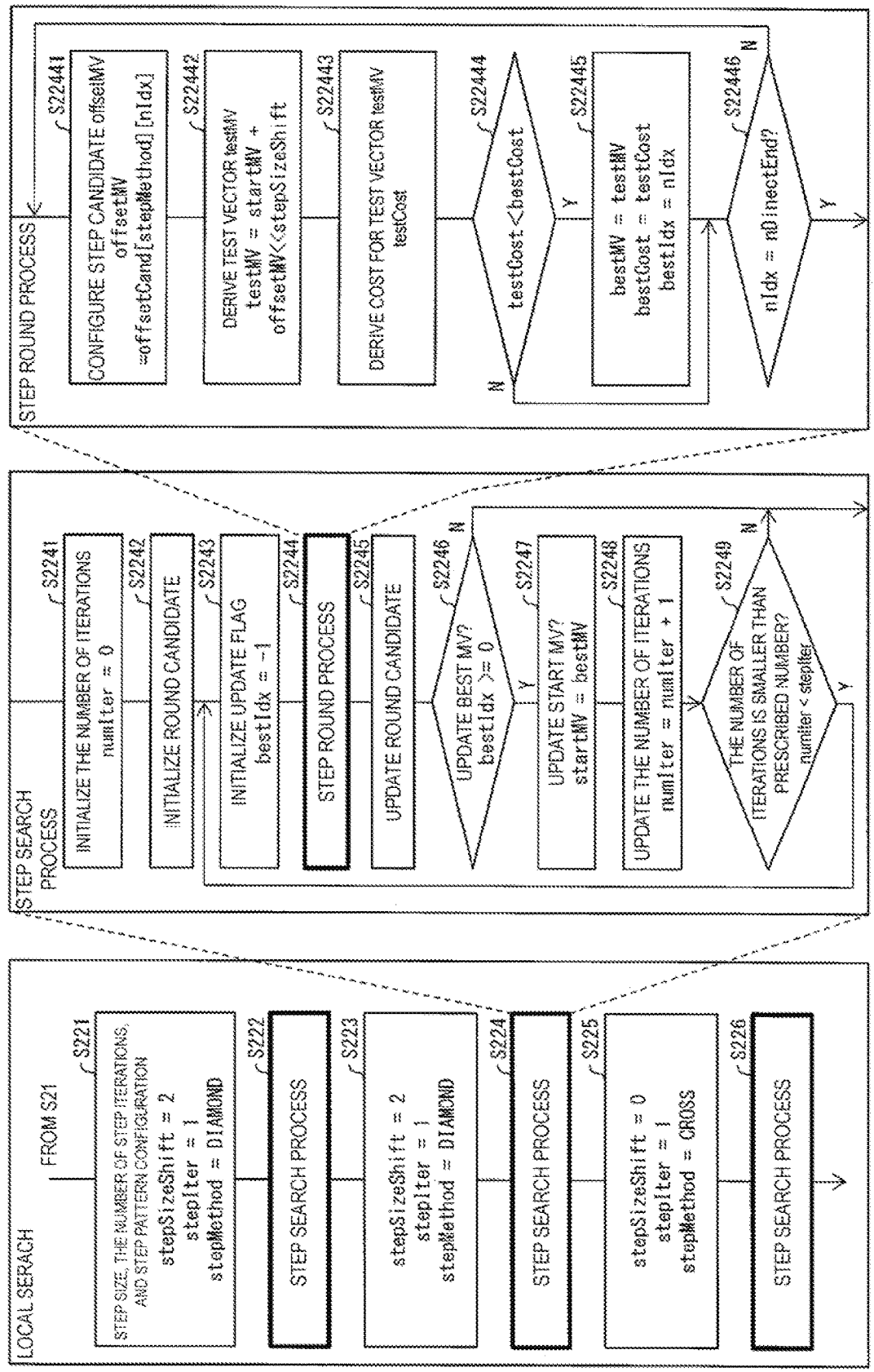
FIG. 20 is a flowchart illustrating an example of a flow of a local search process, an example of a flow of a step search process in the local search, and an example of a flow of a step round process in the step search according to the present embodiment.

Next, a description is given of the local search process performed by the PU level search unit 303712 and the sub-block level search unit 303713 using FIG. 20. FIG. 20 is a flowchart illustrating an example of a flow of a local search process, an example of a flow of a step search process in the local search, and an example of a flow of a step round process in the step search. The local search process by the PU level search unit 303712 is similar to the local search process by the sub-block level search unit 303713. Accordingly, in the following description, for the purpose of simple description, only the local search process by the PU level search unit 303712 is described and a description of the local search process by the sub-block level search unit 303713 is omitted.

Flow of Local Search Process

The PU level search unit 303712 acquires information on a step size (stepSizeShift), the number of step iterations (stepIter), and a step pattern configuration (stepMethod) from the inter-prediction parameter decoding control unit 3031 (S221), and performs the step search process specified by the information (S222). In the example illustrated in FIG. 20, at S222, the PU level search unit 303712 performs the diamond search in which the step size is 2 and the number of iterations is 1.

The PU level search unit 303712 acquires the information on the step size (stepSizeShift), the number of step iterations (stepIter), and the step pattern configuration (stepMethod) from the inter-prediction parameter decoding control unit 3031 (S223) for the step search next performed subsequently to the diamond search. In the example illustrated in FIG. 20, at S224, the PU level search unit 303712 performs the cross search in which the step size is 2 and the number of iterations is 1 (S224).

In the example illustrated in FIG. 20, the PU level search unit 303712 acquires the information on the step size (stepSizeShift), the number of step iterations (stepIter), and the step pattern configuration (stepMethod) from the inter-prediction parameter decoding control unit 3031 for the step search performed finally in the local search process (S225). The PU level search unit 303712 performs the cross search in which the step size is 0 and the number of iterations is 1 (S226) to select the point 1 illustrated in FIG. 19D as the optimum vector bestMV for the prediction block PU.

In a case that the sub-block level search unit 303713 performs the above local search, a search range is preferably smaller than the PU level search unit 303712. Because the search range depends on the maximum number of rounds stepIter, the maximum number of rounds may be limited. To be more specific, the maximum number of rounds stepIterSubPU for the sub-block level search unit 303713 is set to be less than the maximum number of rounds stepIterPU for the PU level search unit 303712.

stepIterSubPU<stepIterPU

Flow of Step Search Process

Subsequently, as an example of a flow of the step search process in the local search, a description is given of the diamond search by the PU level search unit 303712 at S224 in which the step size is 2 and the number of iterations is 1. The step search process at S224 is the diamond search, but is not limited thereto, and, for example, another step pattern configuration (stepMethod) such as the cross search may be used.

The PU level search unit 303712, after acquiring the information on the step size (stepSizeShift), the number of step iterations (stepIter, the maximum number of rounds), and the step pattern configuration (stepMethod) from the inter-prediction parameter decoding control unit 3031 (S223), before the step search process at S224, initializes the number of iterations (the number of rounds) numIter (numIter=0) (S2241), initializes a round candidate (S2242), sets bestIdx=−1, and initializes an update flag (S2243). In initializing the round candidate at S2242, configured are the search start direction nDirctStart and the search end direction nDirectEnd of the search candidate point at S2244, a constant nDirectMask used to update nDirctStart and nDirectEnd, and nDirectRound. Here, the configured may be nDirctStart=0, nDirectEnd=nDirectMask=

(stepMethod==DIAMOND)?7:3, nDirectRound=nDirectMask+1, for example.

Next, The PU level search unit 303712 performs the step round process (S2244). In the step round process at S2244, the PU level search unit 303712 derives the matching costs of the search candidate points corresponding to from the search start direction nDirectStart to the search end direction nDirectEnd, and selects the search candidate point having the low matching cost if any. When the step round process ends in the next round, the PU level search unit 303712 updates the round candidate for preparing the next round (S2245). Furthermore, the PU level search unit 303712 determines whether or not to update the optimum vector bestMV for the prediction block PU (52246). For example, in a case that the search candidate point having the low matching cost is found and the optimum vector bestMV is required to be updated (bestIdx>=0) (Y at 52246), the optimum vector bestMV is updated (S2247). In contrast, in a case the search candidate point having the low matching cost is not found (bestIdx=-1) (N at 52246), the process proceeds to S225 without updating the optimum vector bestMV to proceed to the next cross search process. In updating the round candidate at S2245, the search start direction nDirctStart and search end direction nDirectEnd which are used in the next round are updated. Here, the configured may be nStep=(stepMethod==DIAMOND)?2:1, nDirectStart=(nBestDirect−nStep+nDirectRounding) & nDirectMask, nDirectStart=(nBestDirect+nStep+nDirectRounding) & nDirectMask, for example.

The initial vector startMV is updated (that is, startMV=bestMV) at S2247, and the number of iterations is updated (52248).

In case that a value obtained by adding 1 to the number of iterations numIter is less than a predetermined the number of iterations stepIter (Y at S2249), the process returns to S2243, and then, the processing including the step round process is repeated. On the other hand, in the case that the value obtained by adding 1 to the number of iterations numIter is equal to a predetermined the number of iterations stepIter (N at S2249), the process proceeds to S225 to proceed to the next cross search process.

Flow of Step Round Process

Subsequently, as an example of a flow of the step round process in the step search process, a description is given of the step round process performed by the PU level search unit 303712 at S2244. Here, a description is given of a round candidate loop sequentially performed for nIdx ranging from nDirectStart to nDirectEnd.

In the case that the PU level search unit 303712 performs the step round process (S2244), first, a step candidate vector (search candidate point) offsetMV is set to offsetMV=offsetCand[nIdx] (S224441).

Next, the PU level search unit 303712 derives a test vector testMV by testMV=startMV+offsetMV<<stepSizeShift (S22442).

Then, the PU level search unit 303712 derives a matching cost testCost for the test vector testMV (S22443).

In a case that the derived matching cost testCost is less than the smallest matching cost bestCost (Y at S22445), the process proceeds to S22445 to update the optimum vector (bestMV=testMV), update the smallest matching cost bestCost (bestCost=testCost), and update the index bestIdx to nIdx. On the other hand, in a case that the derived matching cost testCost is equal to or more than the smallest matching cost bestCost (N at S22445), the optimum vector bestMV, the smallest matching cost bestCost, and the optimum index bestIdx are not updated.

The PU level search unit 303712 repeats the above process for the search candidate points with nIdx ranging from nDirectStart to nDirectEnd. To be more specifically, the PU level search unit 303712 returns to S22441 in a case that nIdx is less than nDirectEnd (N at S22446), and proceeds to S2245 in a case that nIdx is equal to nDirectEnd (Y at S22446) to update the round candidate.

Problem in Motion Vector Derivation Processing for PU and Sub-Block

Here, a description is given of a problem in the motion vector derivation processing using the pattern matching as illustrated in FIG. 18. The motion vector derivation processing as illustrated in FIG. 18 needs to generate a motion-compensated image (filtered image) for each vector candidate. Therefore, a problem arises that the process amount increases.

In order to solve the above problem, for example, the PU level search unit 303712 generates in advance a motion-compensated image (interpolated image) containing a pixel at a fractional position of an extended processing region which is larger than a processing region (block or sub-block) for the matching in the search with the initial vector of the target PU being a base point. The, the PU level search unit 303712 may adequately cut out a region (block or sub-block) corresponding to a certain vector candidate from the motion-compensated image of the extended processing region to generate a motion-compensated image for a case that each vector candidate is a motion vector. A size of the extended processing region may be a size obtained by adding the search range to the processing region. The number of motion-compensated images of the extended processing region may be multiple for each phase at a fractional position required for a precision of the local search. A process of generating the motion-compensated image of the extended processing region is larger in the process amount than a process of generating the motion-compensated image of one processing region, but smaller than a process for many (e.g., 28) processing regions.

Problem A1

However, in a case that the precision of the local search for the PU motion vector derivation is high, the number of interpolated images for the target PU or target sub-block generated in advance is increased. For example, in a case that the local search is in unit of half pixel (half pixel precision), extended interpolated images corresponding to three fractional phases (0.5, 0), (0, 0.5), and (0.5, 0.5) are required. On the other hand, in a case that the local search is in unit of ¼ pixel (¼ pixel precision), required are the extended interpolated images corresponding to 15 fractional phases (0.25, 0), (0.5, 0), (0.75, 0), (0, 0.25), (0.25, 0.25), (0.5, 0.25), (0.75, 0.25), (0, 0.5), (0.25, 0.5), (0.5, 0.5), (0.75, 0.5), (0, 0.75), (0.25, 0.75), (0.5, 0.75), and (0.75, 0.75). In this way, the higher the fractional pixel precision for search, the more the required process amount increases. Therefore, in order to effectively perform the search using the extended processing region, it is necessary to restrict the search precision in the matching mode to be lower, and decrease the process amount in generating the extended processing region. However, if the search precision is merely reduced, a problem may arise that a precision of the prediction image is reduced (Problem A2).

Problem B1

Consider a case that after the motion vector derivation using the matching for the block of PU (PU level search), the motion vector search using the matching for the sub-blocks constituting the PU (sub-block level search) is performed. In this case, even in a case that an extended processing region is generated with a starting point being the initial vector of a certain PU in the PU level search, if the initial vector of the sub-block is searched for in the sub-block level search, the resultant initial vector of the sub-block is a vector different from the initial vector of the PU. For this reason, the above interpolated image (extended interpolated image) with a starting point being the initial vector of the PU cannot be utilized in the local search for the sub-block.

The motion vector derivation processing according to the present embodiment described later is a process for solving the above problem. Specifically, the present embodiment described later describes, as examples, a process in which a limitation is put on the precision of the local search for the PU motion vector derivation, a process in which the initial vector search for deriving the motion vector for the sub-block is not performed, or a process in which the search of integer precision is performed for deriving the motion vector for the sub-block.

Exemplary Process of Putting Limitation on Precision of Local Search for PU Motion Vector Derivation A description is given below of a process in which a limitation is put on the precision of the local search for the PU motion vector derivation using FIG. 21 to FIG. 23.

Figure 21:
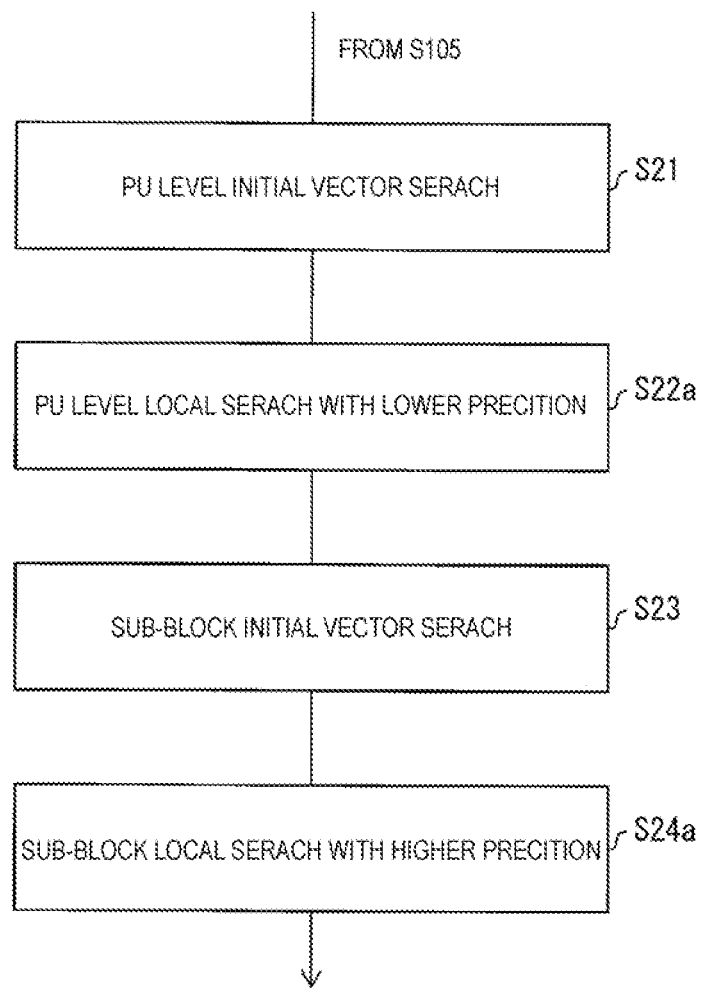
FIG. 21 is a flowchart illustrating a flow of a process in which a limitation is put on a precision of the local search for PU motion vector derivation according to the present embodiment.

FIG. 21 is a flowchart illustrating a flow of the process in which a limitation is put on the precision of the local search for the PU motion vector derivation.

In the following description, each process is performed by the vector candidate derivation unit 30371 (the PU level search unit 303712 or the sub-block level search unit 303713) unless otherwise specifically described.

PU Level Search: S21, S22a

At step S21 subsequent to step S105 (see FIG. 16), the PU level search unit 303712 searches for the initial vector of the target PU. Specifically, the PU level search unit 303712 sets a vector of which the matching cost is minimum among multiple vector candidates as the initial vector of the PU.

At step S22a subsequent to step S21, the PU level search unit 303712 uses the generated interpolated image to search for the target PU motion vector (PU level search). Here, search of 1/M pixel precision is performed. In this PU level search, in a case the extended interpolated image is used for the search, the following process may be performed.

The PU level search unit 303712 applies the motion compensation filter to the reference image with the initial vector of the target PU being a starting point to generate multiple interpolated images (extended interpolated images) containing a pixel at a fractional position corresponding to a predetermined search precision.

Figure 22:
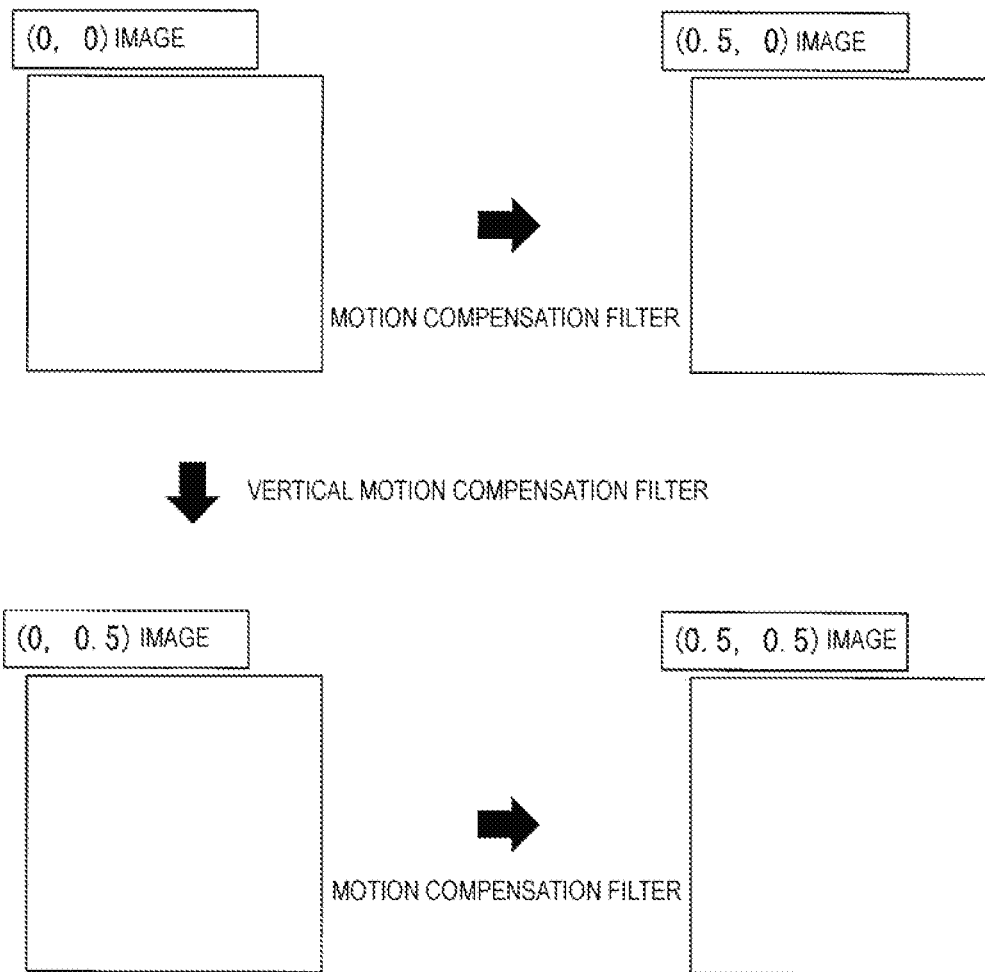
FIG. 22 is a diagram illustrating an example of an interpolated image generated by a PU level search unit according to the present embodiment.
Figure 23:
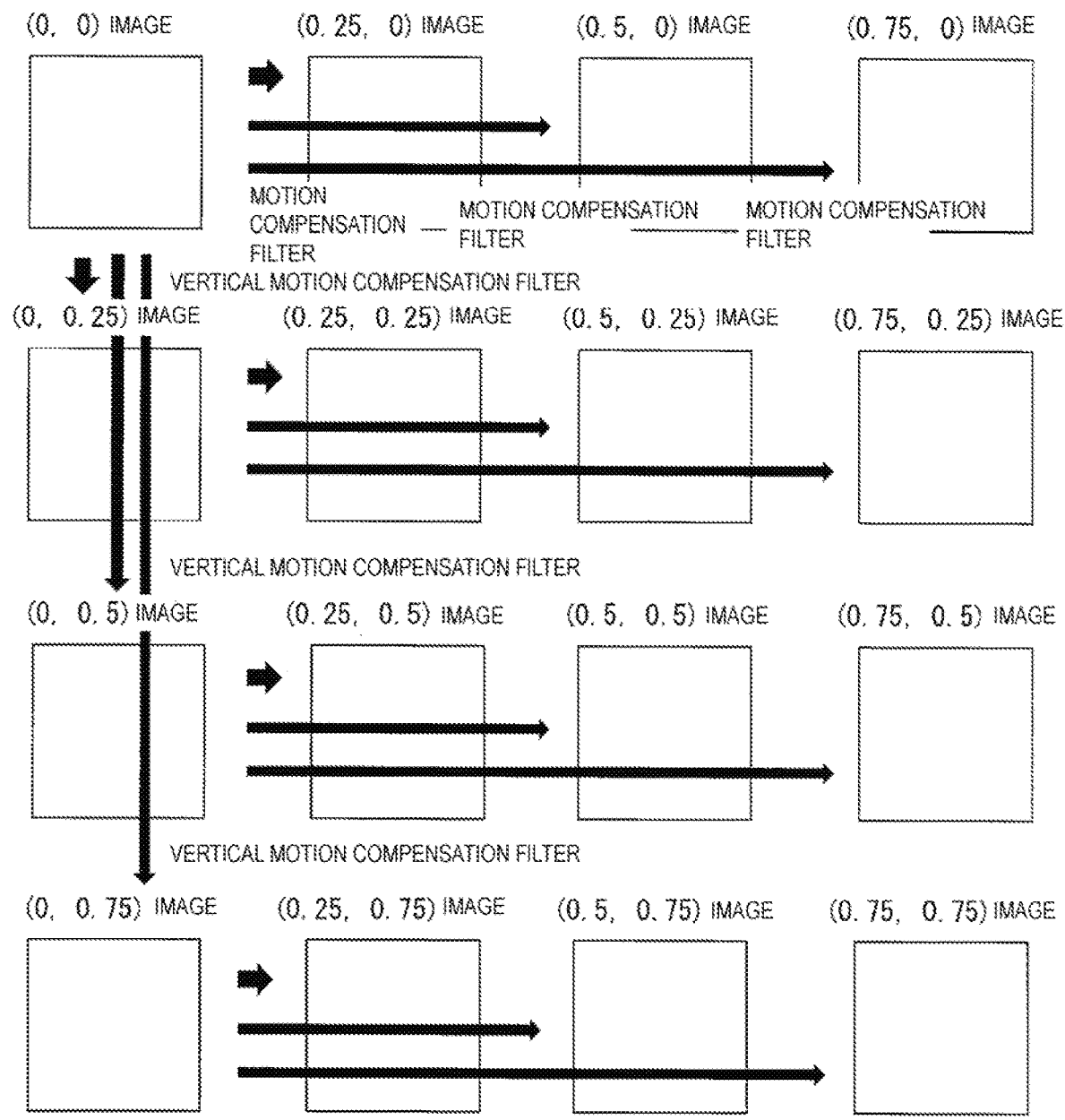
FIG. 23 is a diagram illustrating another example of an interpolated image generated by the PU level search unit according to the present embodiment.

Here, the interpolated image generated by the PU level search unit 303712 is described using FIGS. 22 and 23.

FIG. 22 is a diagram illustrating an example of the interpolated image generated by the PU level search unit 303712. The example illustrated in FIG. 22 describes an example in which the PU level search unit 303712 generates an extended interpolated image required for search of 1/M (M=2, here) pixel precision. Here, as one of the extended interpolated images, an integer interpolated image is derived which is generated using the initial vector of the target PU as a target PU motion vector. A (0, 0) image illustrated in FIG. 22 is an example of this integer interpolated image.

A vector rounded for reducing a precision of the initial vector may be used as a motion vector.

The PU level search unit 303712 applies a horizontal motion compensation filter to the (0, 0) image that is an integer interpolated image to create a (0.5, 0) image that is one of the extended interpolated images. The PU level search unit 303712 applies a vertical motion compensation filter to the (0, 0) image that is an integer interpolated image to create a (0, 0.5) image that is one of the extended interpolated images. The PU level search unit 303712 applies the horizontal motion compensation filter to the (0, 0.5) image to create a (0.5, 0.5) image that is one of the extended interpolated images. With these processing, the extended interpolated images corresponding to the phases (0, 0), (0.5, 0), (0, 0.5), and (0.5, 0.5) can be derived which are required for search of ½ pixel precision.

Next, another example of the interpolated image generated by the PU level search unit 303712 is illustrated using FIG. 23. FIG. 23 is a diagram illustrating another example of the interpolated image generated by the PU level search unit 303712. The example illustrated in FIG. 23 illustrates a process of generating the extended interpolated image in a case that the search precision is ¼ pel (M=4).

The PU level search unit 303712 reads out a block at the location of the initial vector of the target PU from the reference image to generate a (0,0) image as an integer interpolated image. The PU level search unit 303712 applies the vertical motion compensation filter to the (0, 0) image that is an integer interpolated image to generate a (0, 0.25) image that is one of the extended interpolated images. The PU level search unit 303712 applies the vertical motion compensation filter to generate a (0, 0.25) image to a (0, 0.75) image (three images) which are the extended interpolated images corresponding to the phases 0.25, 0.5, and 0.75 in a vertical direction. The PU level search unit 303712 applies the horizontal motion compensation filter to the images corresponding to the phases 0, 0.25, 0.5, and 0.75 in the vertical direction, that is, four images, the (0, 0) image which is an integer interpolated image and the (0, 0.25) image to the (0, 0.75) image which are extended interpolated images. Through the filtering process, the PU level search unit 303712 generates the extended interpolated images, a (0.25, 0) image to a (0.75, 0) image, a (0.25, 0.25) image to a (0.75, 0.25) image, a (0.25, 0.5) image to a (0.75, 0.5) image, and a (0.25, 0.75) image to a (0.75, 0.75) image (12 images) which correspond to the phases 0.25, 0.5, and 0.75 in the horizontal direction. To be more specific, the PU level search unit 303712 applies the vertical motion compensation filter or the horizontal compensation filter to generate 15 images. The PU level search unit 303712 resultingly generates 16 images required for the search of ¼ pixel precision as the extended interpolated images, including the (0,0) image that is an integer interpolated image.

Amount of Calculation for Generating Extended Interpolated Image

In the case of the precision of the local search of 1/M pel, the number of times of the vertical motion compensation filtering by the PU level search unit 303712 for generating the extended interpolated image is M−1, and the number of times of the horizontal compensation filtering is M(M−1). Therefore, a sum the numbers of times of the motion compensation filtering is M−1+M(M−1), that is, (M−1)(M+1). For example, in a case of the precision of the local search of ½ pel, the number of times of the vertical compensation filtering is equal to 1 and the number of times of the horizontal compensation filtering is equal to 2×1, and thus, a sum of the numbers of times is equal to 3. In a case of the precision of the local search of ¼ pel, the number of times of the vertical compensation filtering is equal to 3 and the number of times of the horizontal compensation filtering is equal to 4×3, and thus, a sum of the numbers of times is equal to 15. In a case of the precision of the local search of ⅛ pel, the number of times of the vertical compensation filtering is equal to 7 and the number of times of the horizontal compensation filtering is equal to 8×7, and thus, a sum of the numbers of times is equal to 63. In a case of the precision of the local search of 1/16 pel, the number of times of the vertical compensation filtering is equal to 15 and the number of times of the horizontal compensation filtering is equal to 16×15, and thus, a sum of the numbers of times is equal to 255.

Details of PU Level Search S22a

At step S22a subsequent to step S21, the PU level search unit 303712 uses the generated interpolated image to search for the target PU motion vector, for example.

Here, a description is given of an amount of calculation of the PU level search unit 303712 in a case that the PU level search unit 303712 performs the step search centering on the initial vector of the PU at step S22 described above (see FIG. 18) and in a case that the unit 303712 performs the search for the target PU motion vector by use of the generated interpolated image like at step S22a of this process.

For example, like at step S22, in a case that the diamond search in which the number of iterations is N is performed, the number of motion vector candidates is 8+5*(N−1), that is, 5N+3. In a case that the number of taps of the filter for generating the motion-compensated image is n and a size of the PU is W×H, the number of multiplications per a motion vector candidate is (n−1)*W*H*2. Therefore, a sum of the numbers of multiplications is (5N+3)*(n−1)*W*H*2. For example, in a case that the number of iterations is 8 and the number of taps is 2, a sum of the numbers of multiplications is 86*W*H.

On the other hand, like at step S22a, in a case that the search for the target PU motion vector is performed by use of the generated extended interpolated image, the total number of times of the motion compensation filtering is (M−1)(M+1) for the case of the precision of the local search of 1/M pel, as described above. In a case that the number of taps is n, the number of multiplications per a motion compensation filtering is (n−1)*W*H. Therefore, a sum of the numbers of multiplications is ((M−1)(M+1)(n−1)*W*H. For example, in a case that the precision of the local search is 1/4 pel, that is, M=4, and the number of taps is 2, a sum of the numbers of multiplications is 15*W*H. In this case, in the process of deriving the motion-compensated image of each search candidate vector by use of the extended interpolated image, an amount of arithmetic operation by the PU level search unit 303712 can be reduced to 15/86 (about 1/6), as compared with the process of deriving the motion-compensated image each time for each search candidate vector (the process at step S22 described above). In a case that the precision of the local search is 1/2 pel, that is, M=2, and the number of taps is 2, a sum of the numbers of multiplications is 3*W*H. In this case, an amount of arithmetic operation by the PU level search unit 303712 can be reduced to 3/86 (about 1/30), as compared with the process at step S22. For example, the precision of the local search at step S22a is set to 1/2 pel and the number of iterations is set up to 8.

Subsequently to step S22a, the process in step S23 is performed. The process in step S23 is already described above, and therefore, a description thereof is omitted here.

Subsequently, at step S24a, the sub-block level search unit 303713 sets the precision of the local search (1/N pixel precision) for the motion vector of the sub-block to a precision higher than the precision of the local search (1/M) for the PU motion vector. That is, N>M. For example, the precision of the local search at step 22a is set to 1/4 pel (M=4) from an integer pixel, and the precision of the local search at step S24a is set to 1/8 pel (N=8).

The local search at step 24a may be performed by use of the local search describe above and the like.

The above description can be restated as below.

That is, the vector candidate derivation unit 30371 (vector generation device) includes the PU level search unit 303712 (first motion vector search unit) configured to search for the motion vector for each prediction block using the matching process, and the sub-block level search unit 303713 (second motion vector search unit) configured to refer to the motion vector (PU selection vector) selected by the PU level search unit 303712 to search for the motion vector for each of multiple sub-blocks included in the PU.

The PU level search unit 303712 searches for the initial vector for the PU, and thereafter, performs the local search centering on the selected initial vector to search for the motion vector.

The sub-block level search unit 303713, in each of the sub-blocks constituting the PU, searches for the initial vector for the sub-block, and thereafter, performs the local search centering on the selected initial vector of the sub-block to search for the motion vector. The precision (1/M pixel precision) of the local search by the PU level search unit 303712 is lower than the precision (1/N pixel precision) of the local search by the sub-block level search unit 303713 (M<N). The precision of the local search by the PU level search unit 303712 is set to 1/4 pixel precision or less (M<=4). For example, {M, N}={2, 4} and {M, N}={4, 8} are preferable.

In the configuration to perform the search with increasing the precision for each round (or each iteration) in the local search by the PU level search unit 303712 and the local search by the sub-block level search unit 303713, a maximum precision (1/Mmax pixel precision) of the local search by the PU level search unit 303712 is smaller than a maximum precision (1/Nmax pixel precision) of the local search by the sub-block level search unit 303713 (Mmax<Nmax).

According to the above configuration, in the PU motion vector search requiring a relatively wider search range (the number of iterations in a large step search), the precision of the local search may be set to a limited precision, 1/M pixel precision, to allow an efficient search using the extended interpolated image, which reduce the process amount (to solve Problem A1). The following effect is provided to Problem A2 described above which is possibly brought about from Problem A1. By performing, at the sub-block level, the search of 1/N pixel precision which is higher precision of the PU level search, the precision of the prediction image can be kept. Since the search range (the maximum number of rounds) in the sub-block level search is smaller than the search range (the maximum number of rounds) in the PU level search as described above, the process amount can be lower to a certain degree even in a case that the extended interpolated image is not used.

According to the above configuration, the motion vector difference mvdLX does not need to be coded or decoded for the PU, and therefore, a code amount of the coded data is reduced. Moreover, as compared with the case that the merge processing is performed in which the already decoded motion vector is used with no change, the motion vector can be properly selected with a higher probability, and therefore, the prediction precision can be expected to be improved.

According to the above configuration, the precision of the local search for the PU motion vector by the PU level search unit 303712 is lower than the precision of the local search for the motion vector of the sub-block by the sub-block level search unit 303713. Therefore, the process amount for deriving the motion vector can be reduced, as compared with the configuration in which the precision of the local search for the PU motion vector by the PU level search unit 303712 is equal to the precision of the local search for the motion vector of the sub-block by the sub-block level search unit 303713. To be more specific, the process amount for generating prediction image can be reduced.

Example of Process of Deriving Motion Vector for Sub-Block without Initial Vector Search with Respect to Sub-Block The above configuration describes the example in which the extended interpolated image is utilized for the search in PU level search. Here, a description is further given of a configuration in which the extended interpolated image used in the PU level search can be used again also in the sub-block level search.

A description is given below of the motion vector derivation processing for the sub-block using lower precision local search which is used for this process with reference to FIG. 24.

In this process, in order to solve Problem B1 described above concerning the use of the extended interpolated image in the PU level search, the motion vector for the sub-block is derived without performing the initial vector search with respect to the sub-block. To be more specific, in this process, the motion vector selected in PU level search is used, as it is, as the initial vector used for the local search for the sub-block (center vector for search).

The PU level search unit 303712 searches for the initial vector for the prediction block in the PU, and thereafter, performs the local search (first local search) at the PU level with a first precision (1/M pixel precision) to search for the motion vector. The sub-block level search unit 303713 performs the local search (second local search) at the sub-block level with a second precision (1/N1 pixel precision). The sub-block level search unit 303713 further performs a third local search at the sub-block level with a third precision (1/N2 pixel precision) to search for the motion vector. The first precision and the second precision are lower than the third precision (N2>N1, N2>M).

Figure 24:
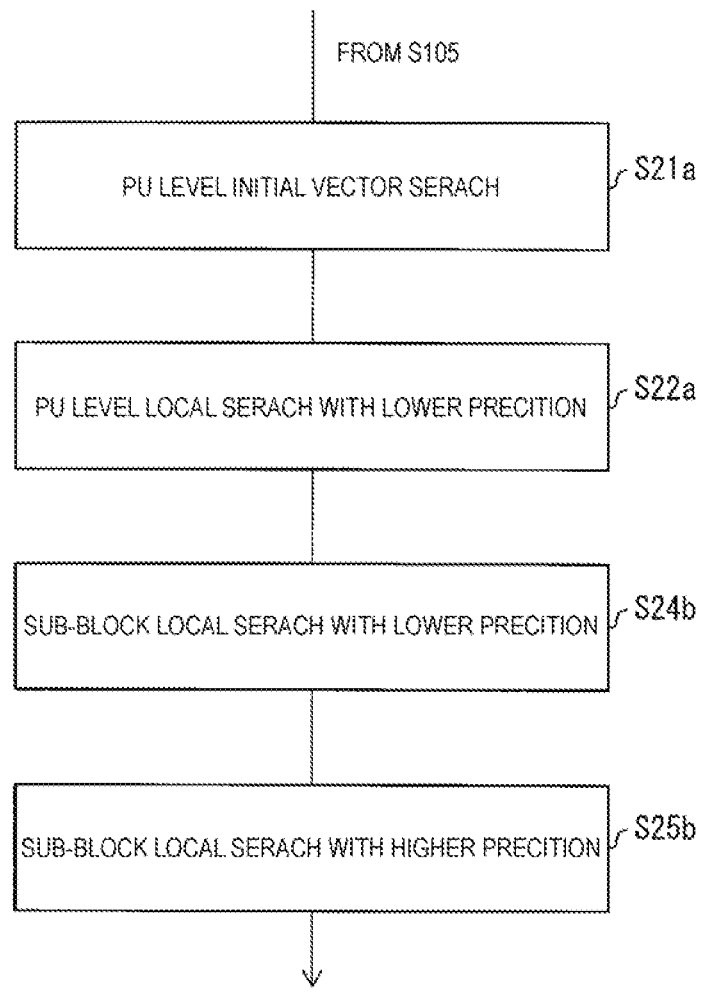
FIG. 24 is a flowchart illustrating a flow of a process of the motion vector derivation for a sub-block without performing initial vector search with respect to the sub-block according to the present embodiment.

A flow of this process is described using FIG. 24. FIG. 24 is a flowchart illustrating a flow of the process of the motion vector derivation for the sub-block without performing the initial vector search with respect to the sub-block. As illustrated in FIG. 24, subsequently to step S105 (see FIG. 16), processes in step S21a and step 22a are performed. At step 22a, the local search for the PU motion vector is performed with the first precision (1/M pixel precision) that is a lower precision. For example, the precision of the local search at step 22a is set to ½ pel and the number of iterations is set up to 8. The detailed description of step S21a and step 22a is made above, and therefore, is omitted here. At step S24b, the sub-block level search unit 303713 performs the local search for the motion vector of the sub-block with the second precision (1/N1 pixel precision) that is a lower precision. For example, the precision of the local search at step S24b is set to ½ pel and the number of iterations is set up to 6. In the local search at step S24b, it is preferable to use the interpolated image generated at step S21. At step S25b, the sub-block level search unit 303713 performs the local search for the motion vector of the sub-block with the third precision (1/N2 pixel precision) that is a higher precision. For example, the precision of the local search at step S25b is set to ⅛ pel and the number of iterations is set to 1. At step S25b, the sub-block level search unit 303713 may generate high precision interpolated images at four points with the starting point being the vector which is searched for at step 24b and of which the matching cost is minimum, and derive the matching cost of the vector candidate to search for the motion vector.

In the above configuration, following the PU level search, the sub-block level search is configured as two-step search (step 24b, step 25b), the motion vector selected in the PU level search is set as the initial vector in the first-step search of the sub-block level search (step 24b).

In the above configuration, the first precision (1/M, for example, M=4) used for the PU level search (step 22a) and the second precision (1/N1) used for the first-step search of the sub-block level search (second local search, step 24b) are set to limited precisions (e.g., N1=4), which enables the search in which the extended interpolated image common to the PU level search and the first-step (step 24b) of the sub-block level search is used. Therefore, the above configuration provides the effect that reduces the process amount (to solve Problem A1). Furthermore, the second-step search (the third local search) (step 25b) with the third precision (1/N2) is provided in the sub-block level search, and thus the effect is produced that prevents the precision of the prediction image from lowering caused by the limited search precision (to solve Problem A1). Here, the search precisions in the first- and second-step searches preferably satisfy N2>N1>=M. Since the search precision needs to be enough low, ¼ pixel precision or less, in order to use the extended interpolated image, the configuration with M<=N1<=4 is used.

The two-step search is used above in which the precision in the sub-block level search is differentiated, but three-step search with different precisions may be used. Similarly, in the above example, the search with one precision is adopted in the PU level search, but a configuration having multiple-step search may be used by increasing the precision for each round or the like. At this time, assuming that the maximum precision in the PU level search is in unit of 1/Mmax pixel, an initial precision in the sub-block level search is in unit of 1/N1 pixel, and the maximum precision in the sub-block level search is in unit pf 1/Nmax pixel, the sub-block level search unit 303713 sets Mmax=N1<=4 in order to use the extended interpolated image in the search with the maximum precision in the PU level search and the search with the initial precision in the sub-block level search.

According to the above configuration, the motion vector difference mvdLX does not need to be coded or decoded for the PU, and therefore, a code amount of the coded data is reduced. Moreover, as compared with the case that the merge processing is performed in which the already decoded motion vector is used with no change, the motion vector can be properly selected with a higher probability, and therefore, the prediction precision can be expected to be improved.

According to the above configuration, the first precision and the second precision are lower than the third precision. Therefore, the process amount for deriving the motion vector can be reduced, as compared with the configuration in which the first, second, and third precisions are equal to each other. To be more specific, the process amount for generating prediction image can be reduced.

Specific Example of Process of Deriving Motion Vector for Sub-Block without Initial Vector Search with Respect to Sub-Block A description is given below of a specific example in which the motion vector for the sub-block is derived without performing the initial vector search with respect to the sub-block. Here, a description is given of the specific examples of the PU level search (step 22a), the first subblock level search (step 24*b*), and the second sub-block level search (step 25*b*) which are described above.

In this process, the local search by the PU level search unit 303712 includes a first process of configuring multiple vector candidates (search vectors), an initial point of each of the candidate vectors being an initial vector, a second process of selecting a search vector providing the smallest matching cost among matching costs computed for the search vectors, and a third process of configuring a new search vector, an initial point of the new search vector being the search vector selected in the second process. The local search by the PU level search unit 303712 is a step type search in which the second process and the third process are repeated to search for the motion vector.

The third local search by the sub-block level search unit 303713 includes a fourth process of configuring multiple search vectors, an initial point of each of the search vectors being the motion vector selected in the third local search by the sub-block level search unit 303713 with the third precision, and a fifth process of selecting a search vector providing the smallest matching cost among matching costs computed for the search vectors. The third local search by the sub-block level search unit 303713 limits the number of search vector candidates in the third local search performed with the third precision. Specifically, the search with the third precision is a process satisfying any or all of conditions of a neighboring point (COND_NEIGH) below.

The number of search vector candidates is equal to 8 or less.
A raster type search in which a motion vector candidate to search for is determined in advance, or a search in which the maximum number of searches (stepIter) is limited to 1 in a step type.
The search vector candidate is a vector neighboring to the initial vector (center vector) of the search vector.

The neighboring point means that in a case that the precision of the third search is 1/N2 pixel precision, a distance (city block distance) between the center vector (initial vector) of the third search and the motion vector candidate is 1/N2 pixel. The distance here is a city block distance, that is, maximum values of an absolute difference between X-coordinates and an absolute difference between Y-coordinates.

Figure 25:
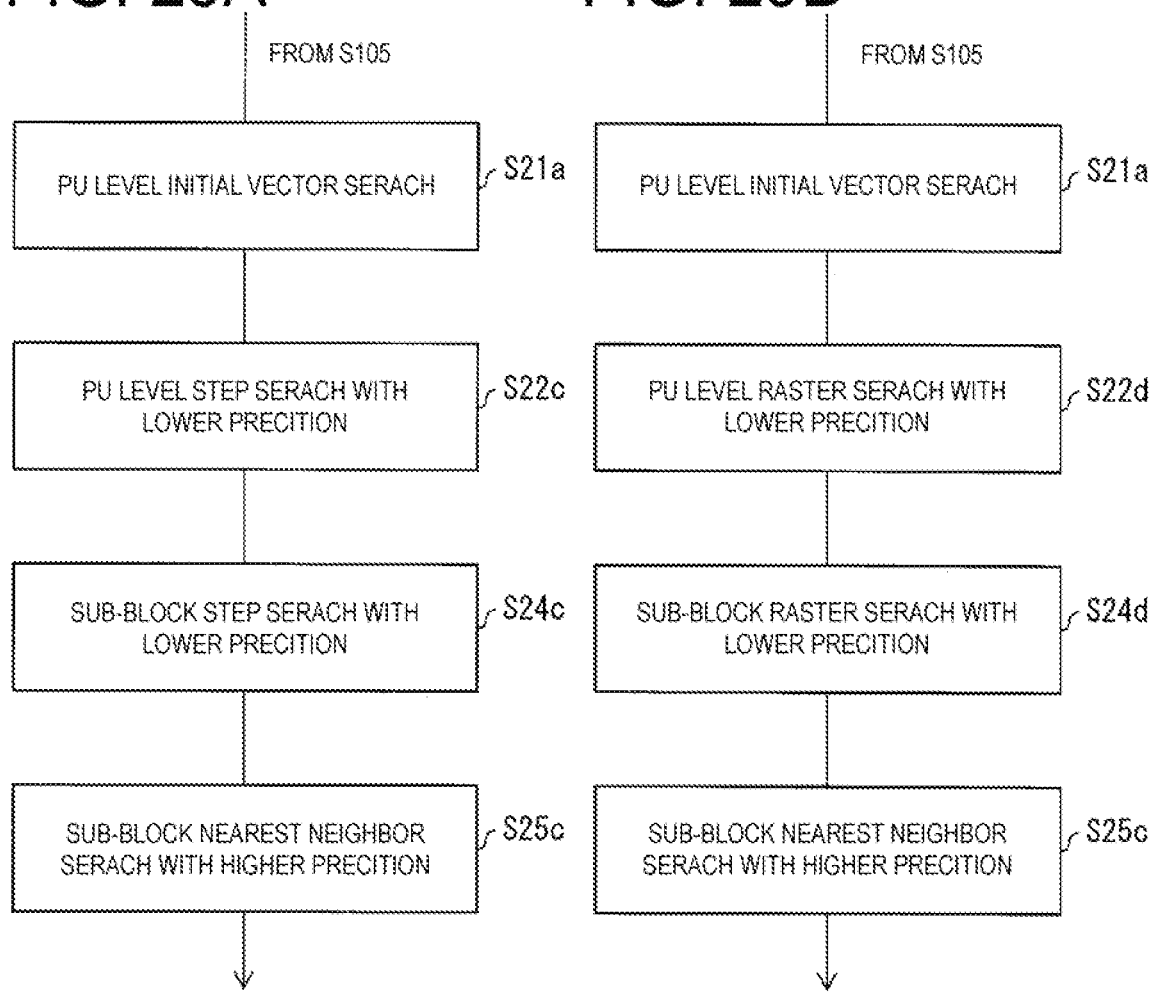
FIG. 25A illustrates a flowchart of a flow of a specific process of deriving a motion vector for a sub-block without performing the initial vector search with respect to the sub-block according to the present embodiment.
FIG. 25B illustrates a flowchart of a flow of another specific process of deriving a motion vector for a sub-block without performing the initial vector search with respect to the sub-block according to the present embodiment.

A flow of this process is described using FIG. 25A. FIG. 25A illustrates a flowchart of a flow of a specific process of deriving the motion vector for the sub-block without performing the initial vector search with respect to the sub-block. As illustrated in FIG. 25A, subsequently to step S105, the process in step S21*a* is performed. The process in step S21*a* is already described above, and therefore, a description thereof is omitted here. Next step S22*c* is a step specifically describing the local search at step S22*a* described above. At step S22*c*, the PU level search unit 303712 performs the local search for the PU motion vector using the step search with the lower precision (1/M pixel precision). Next step S24*c* is a step specifically describing the local search at step S24*b* described above. At step S24*c*, the sub-block level search unit 303713 performs the local search for the motion vector of the sub-block using the step search with the lower precision (1/N1 pixel precision). Next step S25*c* is a step specifically describing the local search at step S25*b* described above. At step S25*c*, the sub-block level search unit 303713 performs the local search for the motion vector of the sub-block using a nearest neighbor search (proximity search) with the higher precision (1/N2 pixel precision).

Next, a description is given of a specific another example in which the motion vector for the sub-block is derived without performing the initial vector search with respect to the sub-block.

In this process, a local research by the PU level search unit 303712 may be a raster type search which includes a process of sequentially estimating the search vector providing the smallest matching cost among the matching costs computed for the search vectors configured in an order of raster scan. In general, the step search which searches centering on the initial vector (center vector) and determines whether to stop the search for each round has a characteristic that the number of candidate vectors used for the search is smaller, as compared to with the raster search (expanded raster search) which uniformly searches in a predetermined scan order. However, the step search is more complexed in configuration of the scan order than the raster search, and thus, more complexed in its implementation. Here, in the search using the extended interpolated image, even in a case that the number of search vectors increases, the process amount less increases. Therefore, in the PU level search in this process using the limited search precision (1/M pixel precision) suitable for the use of the extended interpolated image, an effect is provided that complexity of implementation is reduced by use of the raster search instead of the step search.

The third local search by the sub-block level search unit 303713 includes a fourth process of configuring multiple search vectors, an initial point of each of the search vectors being the motion vector selected in the second local search by the sub-block level search unit 303713 with the third precision, and a fifth process of selecting a search vector providing the smallest matching cost among matching costs computed for the search vectors.

The third local search by the sub-block level search unit 303713 limits the number of search vector candidates with the third precision. Specifically, the search with the third precision is a process satisfying any or all of conditions below.

The number of search vector candidates is equal to 8 or less.
A raster type search in which a motion vector candidate to search for is determined in advance, or a search in which the maximum number of searches is limited to 1 in a step type.
The search vector candidate is a vector neighboring to the initial vector (center vector) of the search vector.

The neighboring point means that in a case that the precision of the third search is 1/N2 pixel precision, a distance (city block distance) between the center vector (initial vector) of the third search and the motion vector candidate is 1/N2 pixel. The distance here is a city block distance, that is, maximum values of an absolute difference between X-coordinates and an absolute difference between Y-coordinates.

A flow of this process is described using FIG. 25B. FIG. 25B illustrates a flowchart of a flow of another specific process of deriving the motion vector for the sub-block without performing the initial vector search with respect to the sub-block. As illustrated in FIG. 25B, subsequently to step S105, the process of a PU level initial vector search (step S21*a*) is performed. The process in step S21*a* is already described above, and therefore, a description thereof is omitted here. Next step S22*d* is a step specifically describing the local search (PU level local search) at step S22*a* described above. At step S22*d*, the PU level search unit 303712 performs the local search for the PU motion vector using the raster search with the lower precision (1/M pixel precision). Next step S24d is a step specifically describing the local search (the first sub-block level search) at step S24b described above. At step S24d, the sub-block level search unit 303713 performs the local search using the raster search with the lower precision (1/N1 pixel precision). Subsequently, step S25c (the second sub-block level search) is performed with the higher precision (1/N2 pixel precision). The process in step S25c is already described above, and therefore, a description thereof is omitted here.

As described above, in the search using the extended interpolated image, even in the case that the number of search vectors increases, the process amount less increases. Therefore, also in the first sub-block level search in this process using the limited search precision (1/N1 pixel precision), an effect is provided that complexity of implementation is reduced by use of the raster search instead of the step search.

Process of Deriving Motion Vector for Sub-Block by Using Initial Vector Search with Integer Pixel Precision A description is given below of a process of deriving the motion vector for the sub-block by using the initial vector search with a limited precision with reference to FIG. 26.

In this process, the PU level search unit 303712 searches for the initial vector for the PU, and thereafter, performs the local search to search for the motion vector. The sub-block level search unit 303713 searches for the initial vector for the sub-block, and thereafter, performs the local search to search for the motion vector. The initial vector search by the sub-block level search unit 303713 is performed with a limited precision (in unit of 1/N0 pixel).

In a case that the initial vector selected by the sub-block level search unit 303713 is equal to the initial vector selected by the PU level search unit 303712, the sub-block level search unit 303713 performs the first local search with the first precision (1/N1 pixel precision), and thereafter, performs the second local search with the second precision (1/N2 pixel precision) higher than the first precision to search for the motion vector. To be more specific, a relationship N2>N1 is preferably maintained. In order to reuse the extended interpolated image generated in the PU level search in also the sub-block level search, a relationship N0=N1 may be preferably satisfied.

In a case that the initial vector selected by the sub-block level search unit 303713 is not equal to the initial vector selected by the PU level search unit 303712, the sub-block level search unit 303713 performs the first local search with the third precision (1/N3 pixel precision), and thereafter, performs the second local search with the fourth precision (1/N4 pixel precision) to search for the motion vector. In a case that the search is performed without using the extended interpolated image generated in the PU level search, N3<=M is maintained, particularly, the third precision is preferably an integer pixel precision (N3=1) or a half pixel precision (N3=2). The second precision (1/N2 pixel precision) and the fourth fractional precision (1/N4) may be high, but since the process amount largely increases if the search is repeatedly performed in the case of no extended interpolated image, the second local search may satisfy any or all of the conditions of the neighboring point COND_NEIGH described above. The first precision to the fourth precision may be not necessarily a fixed precision, and the precision may be increased every round (iteration) in a stepwise manner. In this case also, the maximum precision of each local search may meet the above limitation.

Figure 26:
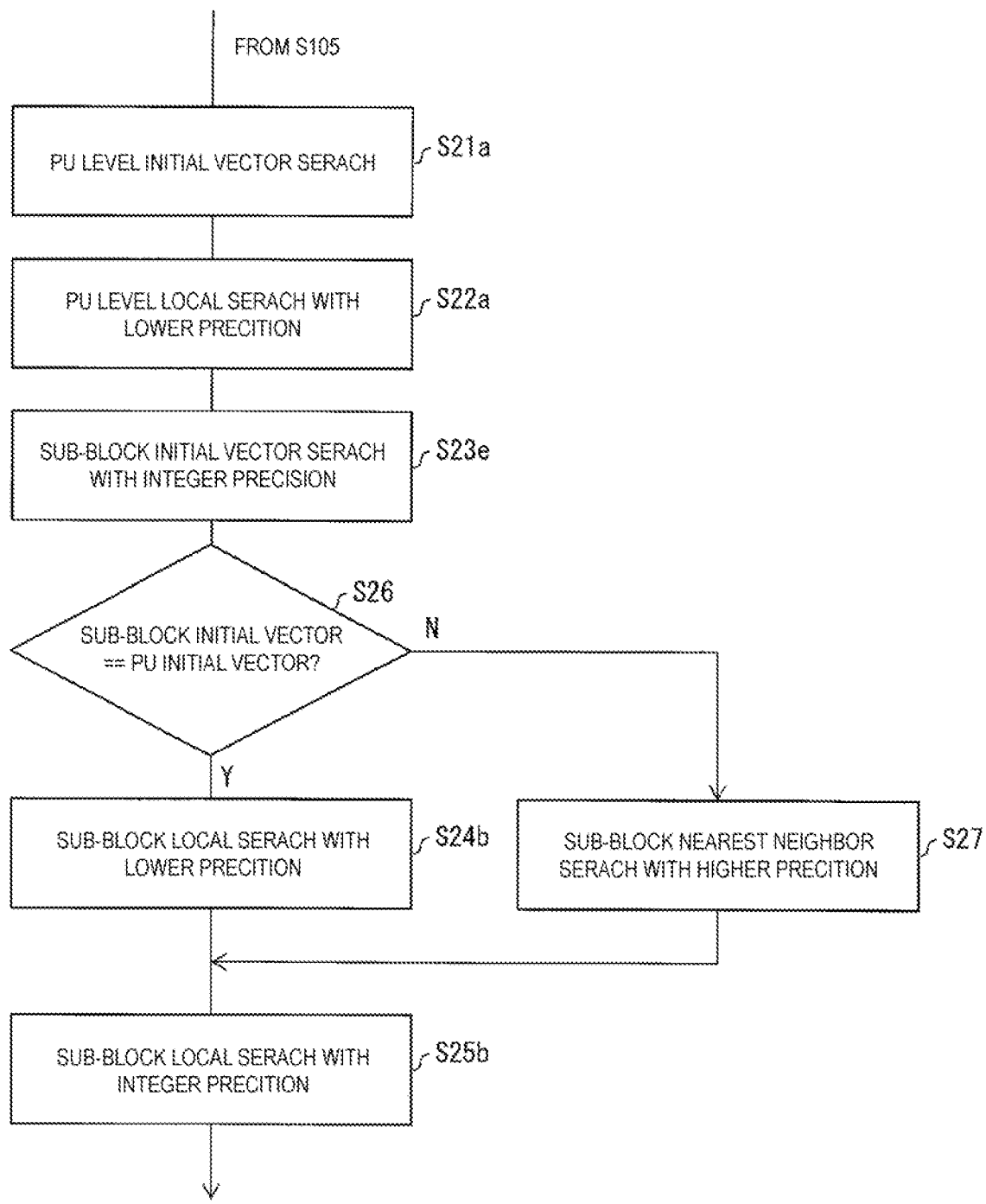
FIG. 26 is a flowchart illustrating a flow of a process of deriving a motion vector for a sub-block with using the initial vector search with an integer pixel precision according to the present embodiment.

A flow of this process is described using FIG. 26. FIG. 26 is a flowchart illustrating a flow of a process of deriving the motion vector for the sub-block by using the initial vector search with a limited precision (in unit of 1/N0 pixel). As illustrated in FIG. 26, subsequently to step S105, processes in step S21a and step S22a are performed. The processes in step S21a and step S22a are already described above, and therefore, a description thereof is omitted here. Subsequently, at step S23e, the sub-block level search unit 303713 performs the initial vector search with 1/N0 pixel precision. Subsequently, at step S26, the sub-block level search unit 303713 determines whether or not the initial vector selected by the sub-block level search unit 303713 is equal to the initial vector (PU selection vector) selected by the PU level search unit 303712. In a case that the initial vector selected by the sub-block level search unit 303713 is equal to the initial vector (PU selection vector) selected by the PU level search unit 303712 (Y at S26), the processes of the sub-block level search (S24b and S25b) is performed. The processes in S24b and S25b are already described above, and therefore, a description thereof is omitted here.

In a case that the initial vector selected by the sub-block level search unit 303713 is not equal to the initial vector selected by the PU level search unit 303712 (N at S26), the sub-block level search unit 303713 performs the local search for the motion vector of the sub-block with 1/N3 pixel precision at S27, and the process proceeds to S25b. In consideration of the process amount in generating the interpolated image as described above, the above integer pixel precision may be ½ pel precision.

According to the above configuration, the search for the initial vector is performed in the sub-block level. In a case that this initial vector in the sub-block level is equal to the motion vector derived in the PU level, the range of the local search for the sub-block is a range with a starting point being the motion vector derived in the PU level. For this reason, the local search can be performed by using the extended interpolated image generated in the PU level without change to efficiently derive the motion-compensated image of the vector candidate, and estimating the matching cost of the vector candidate. Accordingly, the effect as described above is provided. In contrast, in a case that the initial vector in the sub-block level is not equal to the motion vector derived in the PU level (or, a predetermined range is exceeded), the extended interpolated image generated in the PU level needs to be done. However, in this case, if the precision N3 of the local search in the case that the motion vectors are not equal is, for example, equal to or less than the precision M of the initial vector search of the PU, the process amount for generating the motion-compensated image is limited. Therefore, according to the above configuration, while maintaining the effect of improvement in the precision of the prediction image caused by searching for the initial vector in the sub-block level, the effect of decreasing in the process amount caused by searching for the initial vector in the sub-block level is provided.

According to the above configuration, the motion vector difference mvdLX does not need to be coded or decoded for the PU, and therefore, a code amount of the coded data is reduced. Moreover, as compared with the case that the merge processing is performed in which the already decoded motion vector is used with no change, the motion vector can be properly selected with a higher probability, and therefore, the prediction precision can be expected to be improved.

In addition, according to the above configuration, the initial vector search by the sub-block level search unit 303713 is performed in unit of integer pixel. Therefore, the process amount for deriving the motion vector can be reduced. To be more specific, the process amount for generating prediction image can be reduced.

(Configuration of Image Coding Device)

Figure 13:
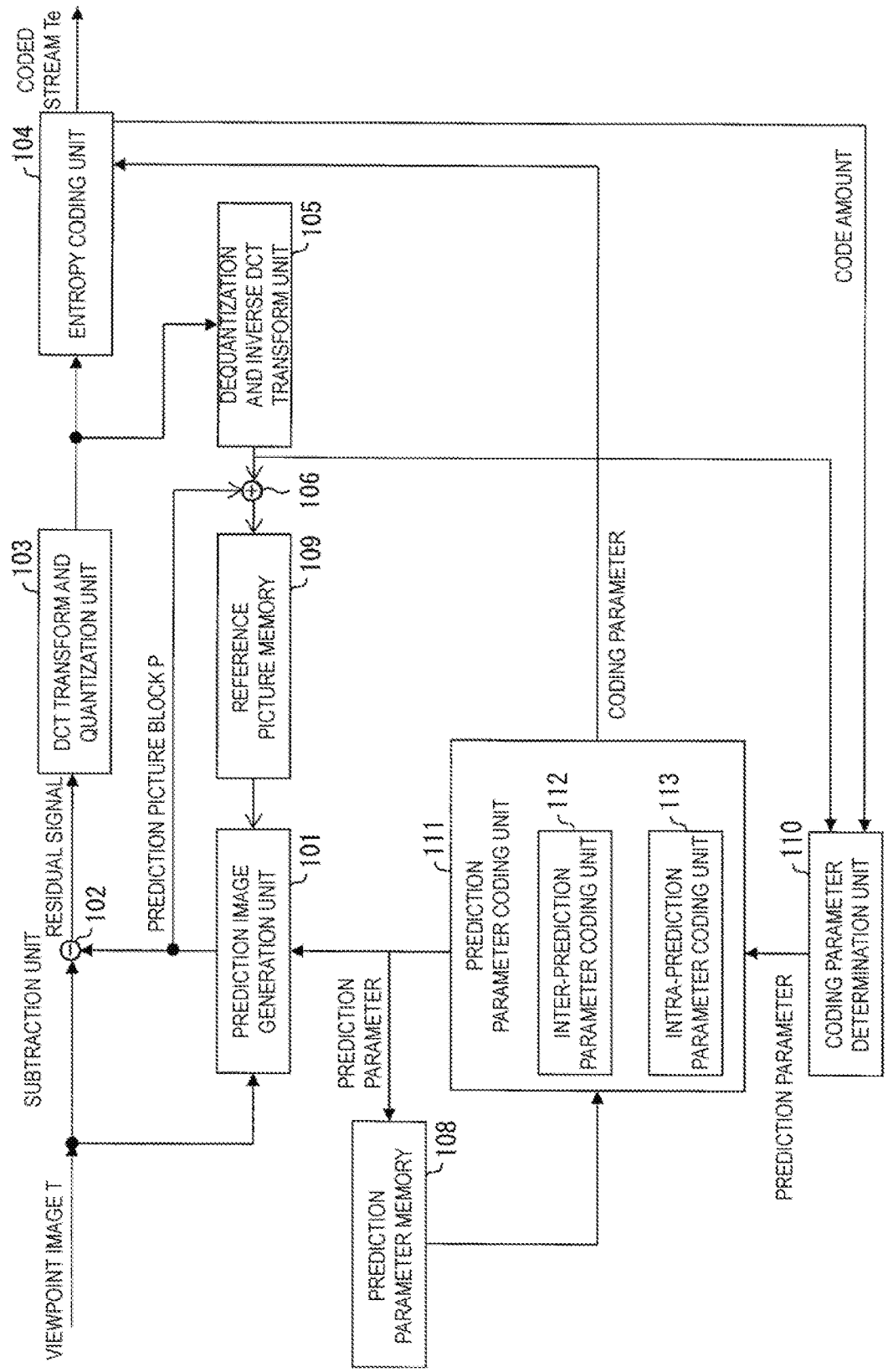
FIG. 13 is a block diagram illustrating a configuration of an image coding device according to the present embodiment.

Next, a configuration of the image coding device 11 according to the present embodiment will be described. FIG. 13 is a block diagram illustrating the configuration of the image coding device 11 according to the present embodiment. The image coding device 11 is configured to include a prediction image generation unit 101, a subtraction unit 102, a DCT and quantization unit 103, an entropy coding unit 104, a dequantization and inverse DCT unit 105, an addition unit 106, a prediction parameter memory (prediction parameter storage unit, frame memory) 108, a reference picture memory (reference image storage unit, frame memory) 109, a coding parameter determination unit 110, a prediction parameter coding unit 111, and a residual storage unit 313 (residual recording unit). The prediction parameter coding unit 111 is configured to include an inter-prediction parameter coding unit 112 and an intra-prediction parameter coding unit 113.

The prediction image generation unit 101 generates a prediction picture block P of a picture for each block, the picture being of a layer image T input from outside for each viewpoint, the block being an area obtained by partitioning the picture. Here, the prediction image generation unit 101 reads out a reference picture block, based on a prediction parameter input from the prediction parameter coding unit 111 from the reference picture memory 109. The prediction parameter input from the prediction parameter coding unit 111 is a motion vector or a displacement vector, for example. The prediction image generation unit 101 reads out a reference picture block of a block at a location indicated by a motion vector or displacement vector predicted with a starting point being a coding target block. The prediction image generation unit 101 generates the prediction picture block P for the read out reference picture block by use of one prediction scheme of multiple prediction schemes. The prediction image generation unit 101 outputs the generated prediction picture block P to the subtraction unit 102. The prediction image generation unit 101 operates in the same way as the prediction image generation unit 308 described already, and therefore, a detailed description of generating the prediction picture block P is omitted.

The prediction image generation unit 101, in selecting the prediction scheme, selects a prediction scheme which minimizes an error value based on a difference between a signal value for each pixel in the block included in the image and a signal value for each of corresponding pixels in the prediction picture block P, for example. The method of selecting the prediction scheme is not limited to the above.

Multiple prediction schemes include the intra-prediction, the motion prediction, and the merge prediction. The motion prediction is the prediction between display times among the inter-predictions described above. The merge prediction is prediction using the reference picture block and prediction parameter the same as for a block which is already coded and in a predefined range from the coding target block.

The prediction image generation unit 101, in a case of selecting the intra-prediction, outputs a prediction mode IntrapredMode indicating the intra-prediction mode which has been used in generating the prediction picture block P to the prediction parameter coding unit 111.

The prediction image generation unit 101, in a case of selecting the motion prediction, stores the motion vector mvLX which has been used in generating the prediction picture block P in the prediction parameter memory 108, and outputs the motion vector to the inter-prediction parameter coding unit 112. The motion vector mvLX indicates a vector from a location of the coding target block to a location of the reference picture block in generating the prediction picture block P. Information indicating the motion vector mvLX includes information indicating the reference picture (e.g., reference picture index refIdxLX, picture order count POC), and may indicate the prediction parameter. The prediction image generation unit 101 outputs the prediction mode predMode indicating the inter-prediction mode to the prediction parameter coding unit 111.

The prediction image generation unit 101, in a case of selecting the merge prediction, outputs the merge index merge_idx indicating the selected reference picture block to the inter-prediction parameter coding unit 112. The prediction image generation unit 101 outputs the prediction mode predMode indicating the merge prediction mode to the prediction parameter coding unit 111.

The subtraction unit 102 subtracts for each pixel the signal value of the prediction picture block P input from the prediction image generation unit 101 from the signal value of the corresponding block of the layer image input from outside to generate a residual signal. The subtraction unit 102 outputs the generated residual signal to the DCT and quantization unit 103 and the coding parameter determination unit 110.

The DCT and quantization unit 103 performs DCT on the residual signal input from the subtraction unit 102 to compute DCT coefficients. The DCT and quantization unit 103 quantizes the computed DCT coefficients to find quantized coefficients. The DCT and quantization unit 103 outputs the found quantized coefficients to the entropy coding unit 104 and the dequantization and inverse DCT unit 105.

To the entropy coding unit 104, input are the quantized coefficients from the DCT and quantization unit 103 and coding parameters from the coding parameter determination unit 110. Examples of the input coding parameters include the codes such as the reference picture index refIdxLX, the prediction vector index mvp_LX_idx, the difference vector mvdLX, the prediction mode predMode, and the merge index merge_idx.

The entropy coding unit 104 performs entropy coding on the input quantized coefficients and coding parameters to generate a coded stream Te, and outputs, to outside, the generated coded stream Te.

The dequantization and inverse DCT unit 105 dequantizes the quantized coefficients input from the DCT and quantization unit 103 to find DCT coefficients. The dequantization and inverse DCT unit 105 performs inverse DCT on the found DCT coefficients to compute a decoded residual signal. The dequantization and inverse DCT unit 105 outputs the computed decoded residual signal to the addition unit 106.

The addition unit 106 adds for each pixel a signal value of the prediction picture block P input from the prediction image generation unit 101 and a signal value of the decoded residual signal input from the dequantization and inverse DCT unit 105 to generate a reference picture block. The addition unit 106 store the generated reference picture block in the reference picture memory 109.

The prediction parameter memory 108 stores the prediction parameter generated by the prediction parameter coding unit 111 in a predefined location for each coding target picture and block.

The reference picture memory 109 stores the reference picture block generated by the addition unit 106 in a predefined location for each coding target picture and block.

The coding parameter determination unit 110 selects one set from among multiple sets coding parameters. The coding parameters are the prediction parameters described above or parameters to be predicted that are generated in association with the prediction parameters. The prediction image generation unit 101 uses each of these sets of coding parameters to generate the prediction picture block P.

The coding parameter determination unit 110 computes a cost value indicating a size of an amount of information and a coding error for each of multiple sets. The cost value is a sum of a code amount and a value obtained by multiplying a square error by a coefficient λ, for example. The code amount is an amount of information of the coded stream Te obtained by performing entropy coding on the quantization error and the coding parameters. The square error is a sum of squares of residual error values of the residual signals computed by the subtraction unit 102 for respective pixels. The coefficient λ is a preconfigured real number greater than zero. The coding parameter determination unit 110 selects a set of coding parameters for which the computed cost value is minimum. This allows the entropy coding unit 104 to output, to outside, the selected set of coding parameters as the coded stream Te and not to output the not selected set of coding parameters.

The prediction parameter coding unit 111 derives a prediction parameter used for generating the prediction picture, based on the parameter input from the prediction image generation unit 101 and codes the derived prediction parameter to generate a set of coding parameters. The prediction parameter coding unit 111 outputs the generated set of coding parameters to the entropy coding unit 104.

The prediction parameter coding unit 111 stores the prediction parameter corresponding to the set selected by the coding parameter determination unit 110 among the generated set of coding parameters in the prediction parameter memory 108.

In a case that the prediction mode predMode input from the prediction image generation unit 101 specifies the inter-prediction mode, the prediction parameter coding unit 111 makes the inter-prediction parameter coding unit 112 operate. In a case that the prediction mode predMode specifies the intra-prediction mode, the prediction parameter coding unit 111 makes the intra-prediction parameter coding unit 113 operate.

The inter-prediction parameter coding unit 112 derives an inter-prediction parameter, based on the prediction parameter input from the coding parameter determination unit 110. The inter-prediction parameter coding unit 112 has, as a configuration for deriving the inter-prediction parameter, a configuration the same as the configuration in which the inter-prediction parameter decoding unit 303 (see FIG. 5, or the like) derives the inter-prediction parameter. The configuration of the inter-prediction parameter coding unit 112 is described below.

The intra-prediction parameter coding unit 113 defines, as a set of inter-prediction parameters, the intra-prediction mode IntraPredMode which is specified by the prediction mode predMode input from the coding parameter determination unit 110.

(Configuration of Inter-Prediction Parameter Coding Unit)

Next, a description is given of the configuration of the inter-prediction parameter coding unit 112. The inter-prediction parameter coding unit 112 is means corresponding to the inter-prediction parameter decoding unit 303.

Figure 14:
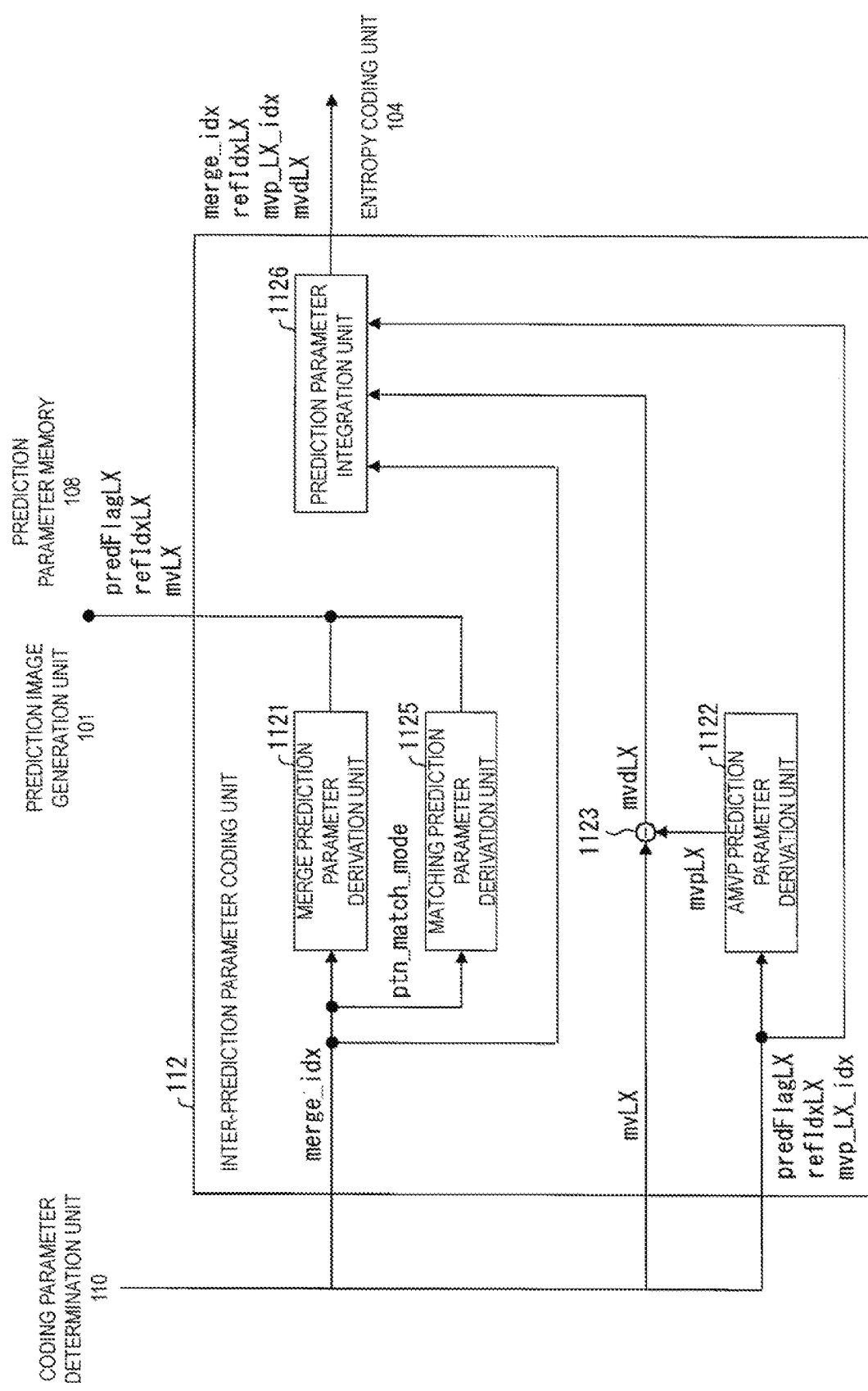
FIG. 14 is a schematic diagram illustrating a configuration of an inter-prediction parameter coding unit according to the present embodiment.

FIG. 14 is a schematic diagram illustrating the configuration of the inter-prediction parameter coding unit 112 according to the present embodiment.

The inter-prediction parameter coding unit 112 is configured to include a merge prediction parameter derivation unit 1121, an AMVP prediction parameter derivation unit 1122, a subtraction unit 1123, a merge prediction parameter derivation unit 1125, and a prediction parameter integration unit 1126.

The merge prediction parameter derivation unit 1121 has a configuration similar to the merge prediction parameter derivation unit 3036 described above (see FIG. 7) and the AMVP prediction parameter derivation unit 1122 has a configuration similar to the AMVP prediction parameter derivation unit 3032 described above (see FIG. 9).

In a case that prediction mode predMode input from the prediction image generation unit 101 specifies the merge prediction mode, the merge index merge_idx is input from the coding parameter determination unit 110 to the merge prediction parameter derivation unit 1121. The merge index merge_idx is output to the prediction parameter integration unit 1126. The merge prediction parameter derivation unit 1121 reads out a reference picture index refIdxLX and motion vector mvLX of a reference block indicated by the merge index merge_idx among the merge candidates from the prediction parameter memory 108. The merge candidate is a reference block in a predefined range from the coding target block to be coded (e.g., a reference block touching a below left end, upper left end, or upper right end of coding target block), is a reference block on which the coding processing is completed.

In a case that the prediction mode predMode input from the prediction image generation unit 101 specifies a matching prediction mode, a syntax ptn_match_mode indicating the type of the matching mode is input from the coding parameter determination unit 110 to the matching prediction parameter derivation unit 1125. The matching prediction parameter derivation unit 1125 reads out the reference picture index refIdxLX of the reference block indicated by ptn_match_mode among the matching candidates from the memory 108. The matching candidate is a reference block in a predefined range from the coding target block to be coded (e.g., a reference block touching a below left end, upper left end, or upper right end of coding target block), on which reference block the coding processing is completed. The matching prediction parameter derivation unit 1125 may be configured to derive the motion vector similarly to the matching prediction parameter derivation unit 3037 in the image decoding device 31 described above.

The AMVP prediction parameter derivation unit 1122 has a configuration similar to the AMVP prediction parameter derivation unit 3032 described above (see FIG. 9).

To be more specific, in a case that the prediction mode predMode input from the prediction image generation unit 101 specifies the inter-prediction mode, the motion vector mvLX is input from the coding parameter determination unit 110 to the AMVP prediction parameter derivation unit 1122. The AMVP prediction parameter derivation unit 1122 derives a prediction vector mvpLX, based on the input motion vector mvLX. The AMVP prediction parameter derivation unit 1122 outputs the derived prediction vector mvpLX to the subtraction unit 1123. The reference picture index refIdx and the prediction vector index mvp_LX_idx are output to the prediction parameter integration unit 1126.

The subtraction unit 1123 subtracts the prediction vector mvpLX input from the AMVP prediction parameter derivation unit 1122 from the motion vector mvLX input from the coding parameter determination unit 110 to generate a difference vector mvdLX. The difference vector mvdLX is output to the prediction parameter integration unit 1126.

In a case that prediction mode predMode input from the prediction image generation unit 101 specifies the merge prediction mode, the prediction parameter integration unit 1126 outputs the merge index merge_idx input from the coding parameter determination unit 110 to the entropy coding unit 104.

In a case that the prediction mode predMode input from the prediction image generation unit 101 specifies the inter-prediction mode, the prediction parameter integration unit 1126 performs the processing below.

The prediction parameter integration unit 1126 integrates the reference picture index refIdxLX and prediction vector index mvp_LX_idx input from the coding parameter determination unit 110 and the difference vector mvdLX input from the subtraction unit 1123. The prediction parameter integration unit 1126 outputs the integrated code to the entropy coding unit 104.

The inter-prediction parameter coding control unit 112 instructs the entropy coding unit 104 to decode the code (syntax element) associated with the inter-prediction. The code (syntax element) included in the coded data may include an inter-prediction parameter coding control unit (not illustrated) which codes, for example, the partition mode part_mode, the merge flag merge_flag, the merge index merge_idx, the inter-prediction flag inter_pred_idc, the reference picture index refIdxLX, the prediction vector index mvp_LX_idx, and the difference vector mvdLX.

In this case, an inter-prediction parameter coding control unit 1031 is configured to include a merge index coding unit (corresponding to the merge index decoding unit 30312 in FIG. 11), a vector candidate index coding unit (corresponding to the vector candidate index decoding unit 30313 in FIG. 11), and a partition mode coding unit, a merge flag coding unit, an inter-prediction flag coding unit, a reference picture index coding unit, a vector difference coding unit and the like. The partition mode coding unit, the merge flag coding unit, the merge index coding unit, the inter-prediction flag coding unit, the reference picture index coding unit, the vector candidate index coding unit, and the vector difference coding unit code respectively the partition mode part_mode, the merge flag merge_flag, the merge index merge_idx, the inter-prediction flag inter_pred_idc, the reference picture index refIdxLX, the prediction vector index mvp_LX_idx, and the difference vector mvdLX.

A part of the image coding device 11 and the image decoding device 31 in the embodiment described above, for example, the entropy decoding unit 301, the prediction parameter decoding unit 302, the prediction image generation unit 101, the DCT and quantization unit 103, the entropy coding unit 104, the dequantization and inverse DCT unit 105, the coding parameter determination unit 110, the prediction parameter coding unit 111, the entropy decoding unit 301, the prediction parameter decoding unit 302, the prediction image generation unit 308, and the dequantization and inverse DCT unit 311 may be implemented by a computer. In this case, this configuration may be realized by recording a program for realizing such control functions on a computer-readable recording medium and causing a computer system to read the program recorded on the recording medium for execution. Note that it is assumed that the "computer system" herein refers to a computer system built into any of the image coding devices 11 to 11h, the image decoding devices 31 to 31h, and the computer system includes an OS and hardware components such as a peripheral device. Furthermore, the "computer-readable recording medium" refers to a portable medium such as a flexible disk, a magneto-optical disk, a ROM, and a CD-ROM, and a storage device such as a hard disk built into the computer system. Moreover, the "computer-readable recording medium" may include a medium that dynamically retains the program for a short period of time, such as a communication line that is used to transmit the program over a network such as the Internet or over a communication line such as a telephone line, and a medium that retains, in that case, the program for a fixed period of time, such as a volatile memory within the computer system which functions as a server or a client. Furthermore, the program may be configured to realize some of the functions described above, and also may be configured to be capable of realizing the functions described above in combination with a program already recorded in the computer system.

The image coding device 11 and image decoding device 31 in the present embodiment described above may be partially or completely realized as an integrated circuit such as a Large Scale Integration (LSI) circuit. The functional blocks of the image coding device 11 and the image decoding device 31 may be individually realized as processors, or may be partially or completely integrated into a processor. The circuit integration technique is not limited to LSI, and the integrated circuits for the functional blocks may be realized as dedicated circuits or a multi-purpose processor. Furthermore, in a case where with advances in semiconductor technology, a circuit integration technology with which an LSI is replaced appears, an integrated circuit based on the technology may be used.

The embodiment of the disclosure has been described in detail above referring to the drawings, but the specific configuration is not limited to the above embodiment and various amendments can be made to a design that fall within the scope that does not depart from the gist of the disclosure.

Application Example

The image coding device 11 and the image decoding device 31 described above can be used in a state of being equipped on various devices for transmitting, receiving, recording, and reproducing a video. The video may be a natural video imaged by a camera or the like, or an artificial video (including CG and GUI) generated by using a computer or the like.

Figure 27A:
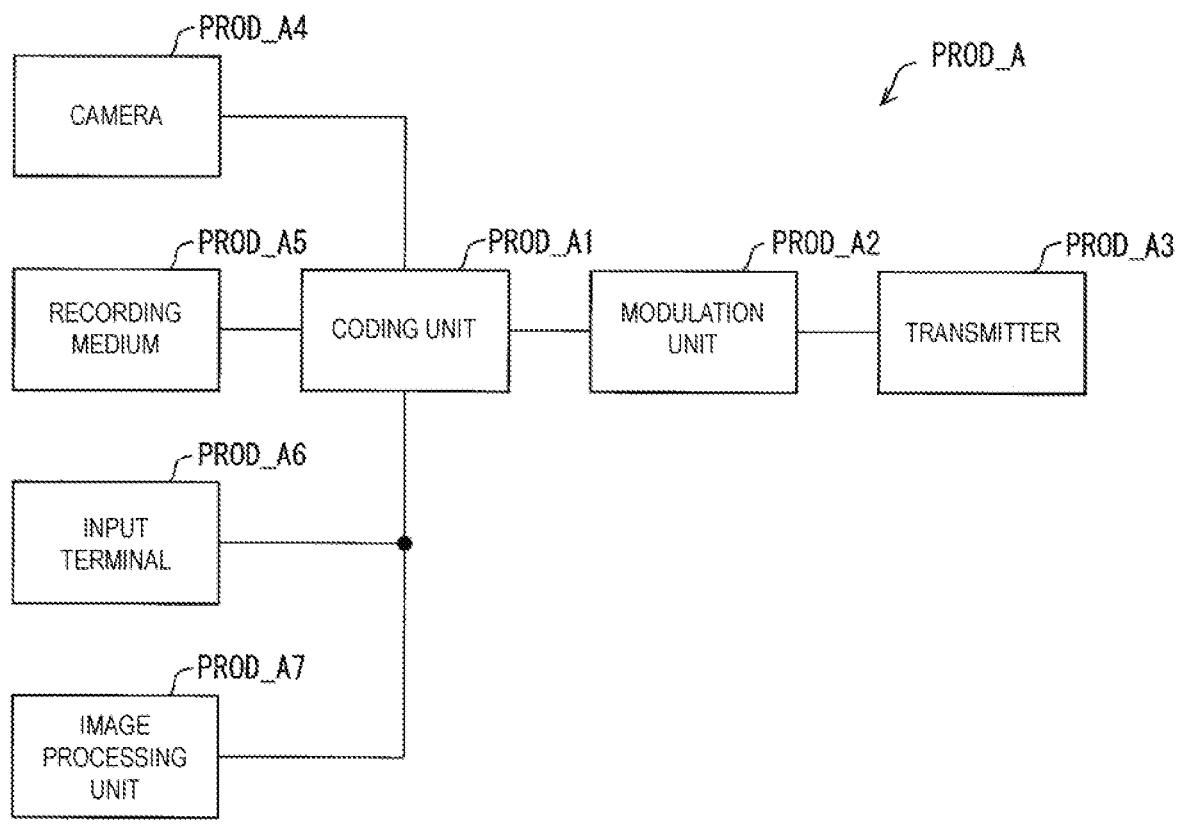
FIGS. 27A and 27B are diagrams illustrating configurations of a transmission device equipped with the above image coding device and a reception device equipped with the above image decoding device.
Figure 27B:
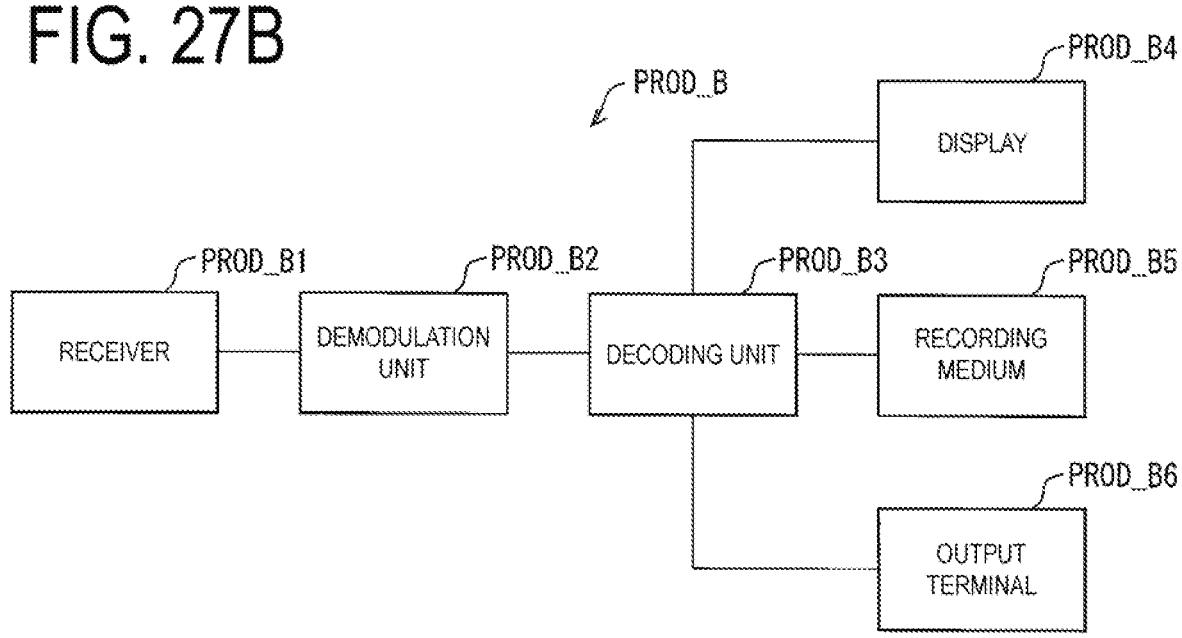

First, a description is given of that the image coding device 11 and the image decoding device 31 described above can be used to receive and transmit the video with reference to FIGS. 27A and 27B.

FIG. 27A is a block diagram illustrating a configuration of a transmission device PROD_A equipped with the image coding device 11. As illustrated in FIG. 27A, the transmission device PROD_A includes a coding unit PROD_A1 that codes a video to acquire coded data, a modulation unit PROD_A2 that modulates a carrier wave by using the coded data acquired by the coding unit PROD_A1 to acquire a modulated signal, and a transmitter PROD_A3 that transmits the modulated signal acquired by the modulation unit PROD_A2. The image coding device 11 described above is used as the coding unit PROD_A1.

The transmission device PROD_A may further include, as resources for supplying a video input to the coding unit PROD_A1, a camera PROD_A4 that images a video, a recording medium PROD_A5 that records a video therein, an input terminal PROD_A6 that inputs a video from outside, and an image processing unit A7 that generates or processes an image. FIG. 27A illustrates the configuration in which the transmission device PROD_A includes all of the above components, but some of these may be omitted.

The recording medium PROD_A5 may recode the video not coded, or the video coded using a coding scheme for recording different from the coding scheme for transmission.

In the latter case, a decoding unit (not illustrated) which decodes the coded data read out from the recording medium PROD_A5 in accordance with the coding scheme for recording may be provided between the recording medium PROD_A5 and the coding unit PROD_A1.

FIG. 27B is a block diagram illustrating a configuration of a reception device PROD_B equipped with the image decoding device 31. As illustrated in FIG. 27B, the reception device PROD_B includes a receiver PROD_B1 that receives a modulated signal, a demodulation unit PROD_B2 that demodulate the modulated signal received by the receiver PROD_B1 to acquire coded data, and a decoding unit PROD_B3 that decodes the coded data acquired by the demodulation unit PROD_B2 to acquire a video. The image decoding device 31 described above is used as the decoding unit PROD_B3.

The reception device PROD_B may further include, as supply destinations of the video output by the decoding unit PROD_B3, a display PROD_B4 that displays the video, a recording medium PROD_B5 that records the video, and an output terminal PROD_B6 that outputs the video to outside. FIG. 27B illustrates the configuration in which the reception device PROD_B includes all of the above components, but some of these may be omitted.

The recording medium PROD_B5 may be configured to recode the video not coded, or the video coded using a coding scheme for recording different from the coding scheme for transmission. In the latter case, a coding unit (not illustrated) which codes the video acquired from the decoding unit PROD_B3 in accordance with the coding scheme for recording may be provided between the decoding unit PROD_B3 and the recording medium PROD_B5.

A transmission medium for transmitting the modulated signal may be wireless or wired. A transmission aspect of transmitting the modulated signal may be a broadcast (here, referred to a transmission aspect of which transmission destination is not specified in advance), or a communication (here, referred to a transmission aspect of which transmission destination is specified in advance). To be more specific, transmission of the modulated signal may be achieved by any of a radio broadcast, a cable broadcast, a radio communication, and a cable communication.

For example, a broadcast station (such as broadcast facilities)/receiving station (such as a TV set) of digital terrestrial broadcasting is an example of the transmission device PROD_A/reception device PROD_B transmitting and/or receiving the modulated signal on the radio broadcast. A broadcast station (such as broadcast facilities)/receiving station (such as a TV set) of a cable television broadcasting is an example of the transmission device PROD_A/reception device PROD_B transmitting and/or receiving the modulated signal on the cable broadcast.

A server (such as a workstation)/client (such as a TV set, a personal computer, a smartphone) including a Video On Demand (VOD) service or video-sharing service using the Internet is an example of the transmission device PROD_A/reception device PROD_B transmitting and/or receiving the modulated signal on the communication (in general, a wireless or wired transmission medium is used in LAN, and a wired transmission medium is used in WAN). Here, the personal computer includes a desktop PC, laptop PC, and a tablet PC. The smartphone also includes a multifunctional mobile phone terminal.

The video-sharing service client has a function to decode coded data downloaded from the server to display on a display, and a function to code a video imaged by a camera to upload to the sever. To be more specific, the video-sharing service client functions as both the transmission device PROD_A and the reception device PROD_B.

Figure 28A:
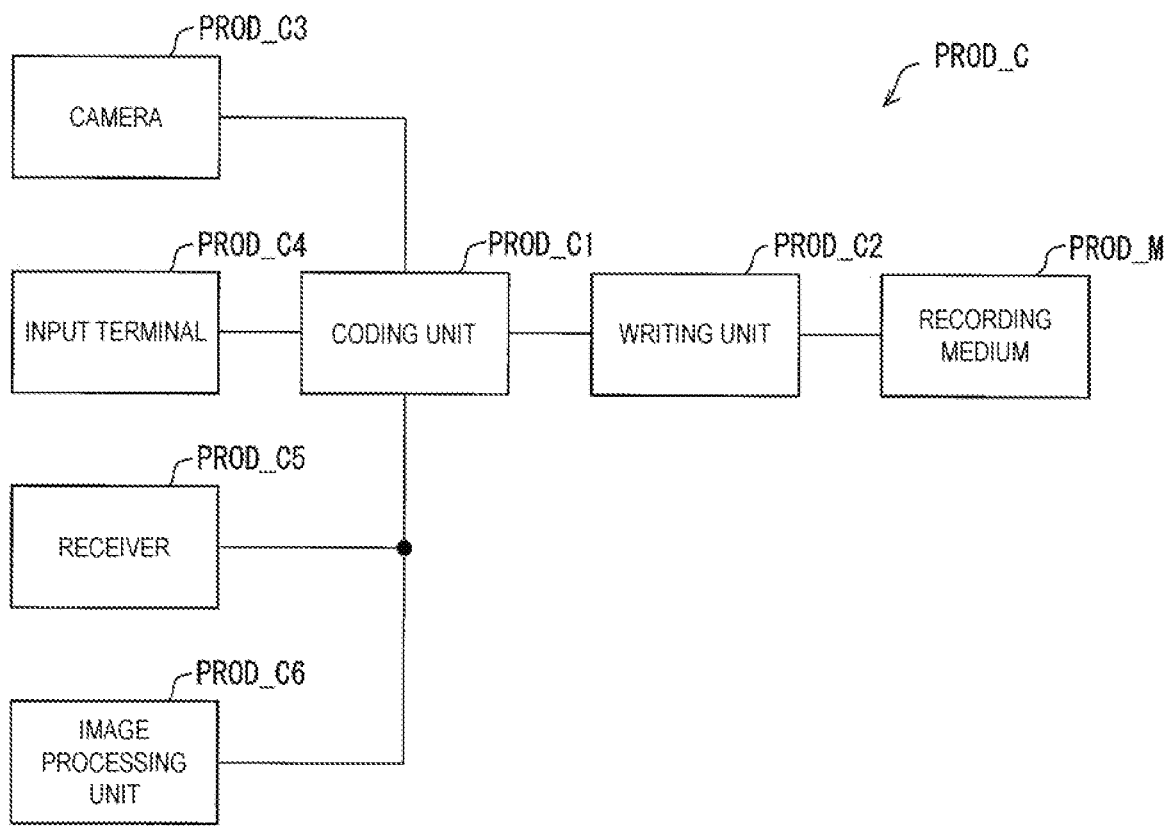
FIGS. 28A and 28B are diagrams illustrating configurations of a recording device equipped with the above image coding device and a reproducing device equipped with the above image decoding device.
Figure 28B:
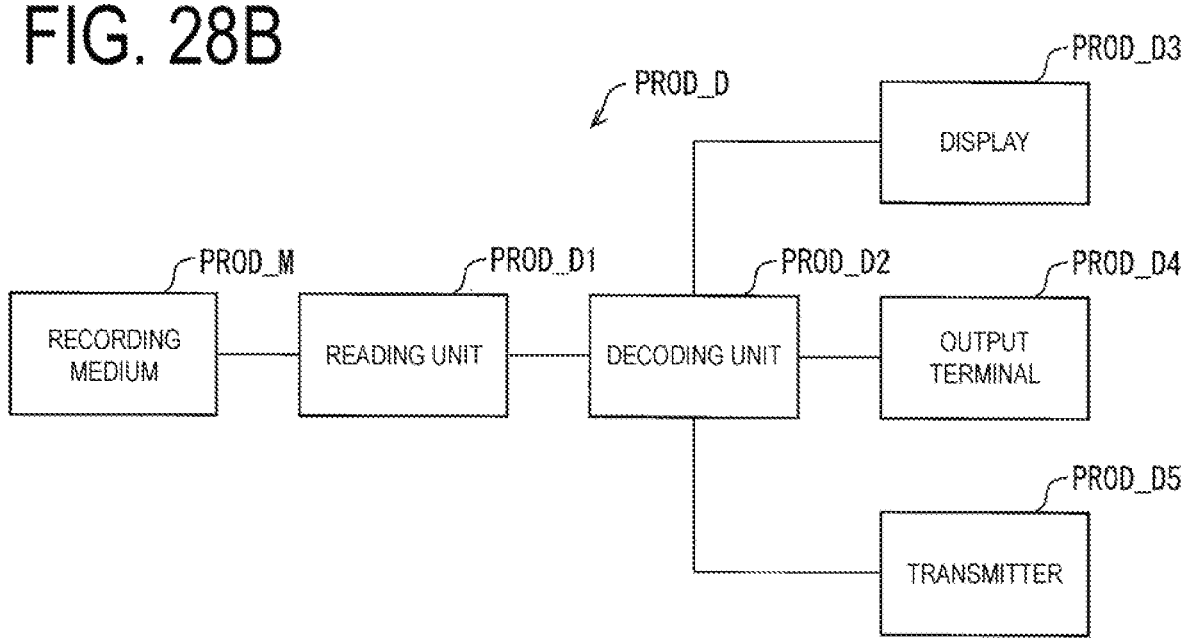

Next, a description is given of that the image coding device 11 and the image decoding device 31 described above can be used to record and reproduce the video with reference to FIGS. 28A and 28B.

FIG. 28A is a block diagram illustrating a configuration of a recording device PROD_C equipped with the image coding device 11 described above. As illustrated in FIG. 28A, the recording device PROD_C includes a coding unit PROD_C1 that codes a video to acquire coded data, and a writing unit PROD_C2 that writes the coded data acquired by the coding unit PROD_C1 into a recording medium PROD_M. The image coding device 11 described above is used as the coding unit PROD_C1.

The recording medium PROD_M may be (1) of a type that is built in the recording device PROD_C such as a Hard Disk Drive (HDD) and a Solid State Drive (SSD), (2) of a type that is connected with the recording device PROD_C such as an SD memory card and a Universal Serial Bus (USB) flash memory, or (3) of a type that is loaded into a drive device (not illustrated) built in the recording device PROD_C such as a Digital Versatile Disc (DVD) and a Blu-ray Disc (registered trademark) (BD).

The recording device PROD_C may further include, as resources for supplying a video input to the coding unit PROD_C1, a camera PROD_C3 that images a video, an input terminal PROD_C4 that inputs a video from outside, a receiver PROD_C5 that receives a video, and an image processing unit C6 that generates or processes an image. FIG. 28A illustrates the configuration in which the recording device PROD_C includes all of the above components, but some of these may be omitted.

The receiver PROD_C5 may receive the video not coded, or the coded data coded using a coding scheme for transmission different from the coding scheme for recording. In the latter case, a decoding unit for transmission (not illustrated) which decodes the coded data coded using the coding scheme for transmission may be provided between the receiver PROD_C5 and the coding unit PROD_C1.

Examples of the recording device PROD_C like this include a DVD recorder, a BD recorder, and a Hard Disk Drive (HDD) recorder (in this case, the input terminal PROD_C4 or the receiver PROD_C5 is mainly the resource for supplying the video). A camcorder (in this case, the camera PROD_C3 is mainly the resource for supplying the video), a personal computer (in this case, the receiver PROD_C5 or the image processing unit C6 is mainly the resource for supplying the video), and a smartphone (in this case, the camera PROD_C3 or the receiver PROD_C5 is mainly the resource for supplying the video) are also included in the examples of the recording device PROD_C like this.

FIG. 28B is a block diagram illustrating a configuration of a reproducing device PROD_D equipped with the image decoding device 31. As illustrated in FIG. 28B, the reproducing device PROD_D includes a reading unit PROD_D1 that reads out coded data written into the recording medium PROD_M, and a decoding unit PROD_D2 that decodes the coded data read out by the reading unit PROD_D1 to acquire a video. The image decoding device 31 described above is used as the decoding unit PROD_D2.

The recording medium PROD_M may be (1) of a type that is built in the reproducing device PROD_D such as an HDD and an SSD, (2) of a type that is connected with the reproducing device PROD_D such as an SD memory card and a USB flash memory, or (3) of a type that is loaded into a drive device (not illustrated) built in the reproducing device PROD_D such as a DVD and a BD.

The reproducing device PROD_D may further include, as supply destinations of the video output by the decoding unit PROD_D2, a display PROD_D3 that displays the video, an output terminal PROD_D4 that outputs the video from outside, and a transmitter PROD_D5 that transmits the video. FIG. 28B illustrates the configuration in which the reproducing device PROD_D includes all of the above components, but some of these may be omitted.

The transmitter PROD_D5 may transmit the video not coded, or the coded data coded using a coding scheme for transmission different from the coding scheme for recording. In the latter case, a coding unit (not illustrated) which codes the video using the coding scheme for transmission may be provided between the decoding unit PROD_D2 and the transmitter PROD_D5.

Examples of the reproducing device PROD_D like this include a DVD player, a BD player, and an HDD player (in this case, the output terminal PROD_D4 connected with a TV set or the like is mainly the supply destination of the video). A TV set (in this case, the display PROD_D3 is mainly the supply destination of the video), a digital signage (also referred to as an electronic signage or an electronic bulletin board, and the display PROD_D3 or the transmitter PROD_D5 is mainly the supply destination of the video), a desktop PC (in this case, the output terminal PROD_D4 or the transmitter PROD_D5 is mainly the supply destination of the video), a laptop or tablet PC (in this case, the display PROD_D3 or the transmitter PROD_D5 is mainly the supply destination of the video), and a smartphone (in this case, the display PROD_D3 or the transmitter PROD_D5 is mainly the supply destination of the video) are also included in the examples of the reproducing device PROD_D like this.

(Hardware Implementation and Software Implementation)

The blocks in the image decoding device 31 and the image coding device 11 described above may be implemented by hardware using a logic circuit formed on an integrated circuit (IC chip), or by software using a Central Processing Unit (CPU).

In the latter case, the above-described devices include a CPU to execute commands of a program for achieving the functions, a Read Only Memory (ROM) to store the program, a Random Access Memory (RAM) to load the program, and a storage device (storage medium) such as a memory to store the program and various types of data. The object of the disclosure can be attained by that software realizing the functions described above that is a program code of a control program for the above respective devices (executable program, intermediate code program, source program) is recoded in a recording medium in a computer-readable manner, the recording medium is supplied to the above respective devices, and the computer (or the CPU or MPU) reads out the program code recorded in the recording medium for execution.

Examples of the above-described recording medium to use include tapes such as a magnetic tape and a cassette tape, disks or discs including a magnetic disk such as a floppy (registered trademark) disk/hard disk or an optical disc such as a Compact Disc Read-Only Memory (CD-ROM)/Magneto-Optical (MO) disc/Mini Disc (MD)/Digital Versatile Disc (DVD)/CD Recordable (CD-R)/Blu-ray Disc (registered trademark), cards such as an IC card (including a memory card)/optical card, semiconductor memories such as a mask ROM/Erasable Programmable Read-Only Memory (EPROM)/Electrically Erasable and Programmable Read-Only Memory (EEPROM: registered trademark)/flash ROM, or logic circuits such as a Programmable logic device (PLD) and a Field Programmable Gate Array (FPGA).

The above-described devices may be configured to be connectable with a communication network to be supplied with the above-described program code through the communication network. This communication network is not specifically limited so long as the program code can be transmitted. For example, the Internet, an intranet, an extranet, a Local Area Network (LAN), an Integrated Services Digital Network (ISDN), a Value-Added Network (VAN), a Community Antenna television/Cable Television (CATV) communication network, a Virtual Private Network, a telephone network, a mobile communication network, a satellite communication network and the like are available. Transmission media constituting this communication network are not limited to a specific configuration or type so long as the program code can be transmitted. For example, a wired medium such as Institute of Electrical and Electronic Engineers (IEEE) 1394, a USB, a power-line carrier, a cable TV line, a telephone line, and an Asymmetric Digital Subscriber Line (ADSL), or a wireless medium such as an infrared-ray including Infrared Data Association (IrDA) and a remote control unit, Bluetooth (registered trademark), IEEE 802.11 wireless communication, High Data Rate (HDR), Near Field Communication (NFC), Digital Living Network Alliance (registered trademark) (DLNA), a mobile telephone network, a satellite circuit, and a digital terrestrial network are also available. The disclosure may also be implemented in a form of a computer data signal embedded in a carrier wave in which the above-described program code is embodied by electronic transmission.

The disclosure is not limited to the above described embodiments, and can be variously modified within a scope of the claims. To be more specific, embodiments made by combining technical means which are adequately modified within the scope of the claims are also included in the scope of the disclosure.

CROSS-REFERENCE OF RELATED APPLICATION

This application is a continuation of U.S. patent application Ser. No. 18/202,910, filed on May 27, 2023, which is a continuation of U.S. patent application Ser. No. 17/473,576, filed on Sep. 13, 2021, which is a continuation of U.S. patent application Ser. No. 16/076,278, filed on Aug. 7, 2018, which is the National Stage of International Application No. PCT/JP2017/003637, filed on Feb. 1, 2017, which claims priority based on JP 2016-022248 filed in Japan on Feb. 8, 2016, the contents of which are entirely incorporated herein by reference.

INDUSTRIAL APPLICABILITY

The disclosure can be preferably applied to an image decoding device that decodes coded data in which an image data is coded and an image coding device that generates coded data in which an image data is coded. An embodiment of the disclosure can be also preferably applied to a data structure of the coded data which is generated by the image coding device and referred to by the image decoding device.

REFERENCE NUMERALS LIST

11 Image coding device (video coding device, prediction image generation device)
31 Image decoding device (video decoding device, prediction image generation device)
1125 Matching prediction parameter derivation unit (vector generation device)
30371 Vector candidate derivation unit (motion vector generation device)
303712 PU level search unit (first motion vector search unit)
303713 Sub-block level search unit (second motion vector search unit)

What is claimed is:

1. A motion vector generation device to derive a motion vector for a subblock, the motion vector generation device comprising:
   a merge prediction parameter derivation circuitry that derives a merge candidate list including a prediction list utilization flag, a first motion vector and a reference picture index;
   a matching prediction parameter derivation circuitry that derives a second motion vector for the sub-block and a sum of absolute difference between a first block and a second block by using the first motion vector; and
   a prediction image generation circuitry that derives prediction samples based on the second motion vector,
   wherein
      a minimum cost is modified based on the sum of absolute difference, in a case that the sum of absolute difference is less than the minimum cost.

2. A video decoding device to derive a motion vector for a subblock, the video decoding device comprising:
   a merge prediction parameter derivation circuitry that derives a merge candidate list including a prediction list utilization flag, a first motion vector and a reference picture index;
   a matching prediction parameter derivation circuitry that derives a second motion vector for the sub-block and a sum of absolute difference between a first block and a second block by using the first motion vector; and
   a prediction image generation circuitry that derives prediction samples based on the second motion vector,
   wherein
      a minimum cost is modified based on the sum of absolute difference, in a case that the sum of absolute difference is less than the minimum cost.

3. A video coding device to derive a motion vector for a subblock, the video coding device comprising:
   a merge prediction parameter derivation circuitry that derives a merge candidate list including a prediction list utilization flag, a first motion vector and a reference picture index;
   a matching prediction parameter derivation circuitry that derives a second motion vector for the sub-block and a sum of absolute difference between a first block and a second block by using the first motion vector; and
   a prediction image generation circuitry that derives prediction samples based on the second motion vector,
   wherein
      a minimum cost is modified based on the sum of absolute difference, in a case that the sum of absolute difference is less than the minimum cost.

* * * * *